(12) United States Patent
Hanf et al.

(10) Patent No.: US 6,438,462 B1
(45) Date of Patent: Aug. 20, 2002

(54) SEMICONDUCTOR CIRCUIT FOR AN ELECTRONIC UNIT

(75) Inventors: Peter Hanf, Goeppingen; Juergen Minuth, Eislingen; Juergen Setzer, Illingen; Max Reeb, Uhingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/161,593

(22) Filed: Sep. 28, 1998

Related U.S. Application Data

(63) Continuation of application No. PCT/EP96/05087, filed on Nov. 19, 1996.

(30) Foreign Application Priority Data

Mar. 26, 1996 (DE) .......................................... 196 11 942

(51) Int. Cl.[7] .......................... G06F 1/26; G06F 11/30; G08B 23/00; H02H 7/00
(52) U.S. Cl. ...................... 700/297; 340/693.4; 361/18; 361/100; 713/340
(58) Field of Search ............... 322/28, 311; 340/693.4; 361/18, 100; 713/340; 700/297

(56) References Cited

U.S. PATENT DOCUMENTS

| | | | | |
|---|---|---|---|---|
| 4,551,841 A | * | 11/1985 | Fujita et al. ................ | 714/22 |
| 5,166,871 A | * | 11/1992 | Carroll et al. .............. | 323/282 |
| 5,175,845 A | * | 12/1992 | Little ........................ | 713/323 |
| 5,298,851 A | * | 3/1994 | DeNardis .................... | 322/28 |
| 5,497,119 A | * | 3/1996 | Tedrow et al. .............. | 327/540 |
| 5,600,782 A | * | 2/1997 | Thomson ..................... | 714/4 |
| 5,664,203 A | * | 9/1997 | Hong et al. .................. | 307/66 |
| 5,712,589 A | * | 1/1998 | Afek et al. .................. | 327/538 |
| 5,802,268 A | * | 9/1998 | Fisher et al. ................ | 714/25 |
| 5,954,813 A | * | 9/1999 | Mann et al. ................. | 712/43 |
| 6,055,464 A | * | 4/2000 | Nagano ....................... | 700/295 |

FOREIGN PATENT DOCUMENTS

| | | |
|---|---|---|
| DE | 38 01 478 C1 | 4/1989 |
| GB | 2 288 522 A | 6/1995 |
| JP | 11-508431 | 7/1999 |
| WO | WO 90/09713 | 8/1990 |
| WO | WO97/33354 | 12/1997 |

OTHER PUBLICATIONS

Japanese Office Action.

* cited by examiner

*Primary Examiner*—Leo Picard
*Assistant Examiner*—Elliot Frank
(74) *Attorney, Agent, or Firm*—Crowell & Moring LLP

(57) ABSTRACT

A semiconductor circuit for an electronic unit having at least one microcontroller comprises at least one voltage regulator for providing, from a first supply voltage, at least one second supply voltage for the microcontroller and for circuits of the unit which cooperate with the microcontroller. The circuit further comprises, in monolithic form, a transceiver unit having transmitting and receiving device for coupling a microcontroller to the two-wire bus. This monolithic construction may additionally comprise watchdog functions, various wake-up functions and an interface via which a serial data exchange with the at least one microcontroller is possible. Furthermore, it may have an apparatus for determining, throughout the network, bus subscribers having reference-ground potential faults and for quantifying such faults.

20 Claims, 37 Drawing Sheets

SEMICONDUCTOR CIRCUIT FOR AN ELECTRONIC UNIT

CROSS-REFERENCE TO RELATED APPLICATIONS

This application is a continuation of International Application No. PCT/EP96/05087 filed on Nov. 19, 1996.

BACKGROUND AND SUMMARY OF THE INVENTION

The invention relates to a semiconductor circuit for an electronic unit.

Control technologies which rely on a two-wire bus as a communications medium are becoming increasingly important both in the industrial sector and in mobile applications, such as vehicles. Bus networks according to the CAN standard (CAN=Controller Area Network) are an example of this. In this case, a multiplicity of electronic units communicate with one another via only two conductor cores.

Without exception, such units perform their control task by means of a microcontroller. Particular bus protocol chips or protocol functionalities are provided for communication via the bus, and may be monolithically co-integrated in microcontrollers which are specialized for such applications, and function as a communicative transmitting/receiving link between bus and controller. They reduce the burden of tasks defined by the communications protocol on the microcontroller of the relevant unit and, in this way, considerably increase its availability and throughput for the actual control application.

Both the microcontroller and the bus protocol function require an operating voltage which must be kept within narrow limits, and as a rule is derived from a superordinate potential by means of a voltage regulator included in the control unit. If corresponding control units are used, for example, in means of transport, such voltage regulators must be particularly operationally reliable within wide temperature ranges and, above all, resistant to overvoltages and to interfering radio-frequency irradiation. Not all realization technologies for semiconductor circuits are equally suited to resistance to be optimized accordingly in practical operation. Particular so-called high-voltage technologies have been developed which take account precisely of the extreme loading situations in the case of voltage regulators, and which concern overload protection of the semiconductor chip against static and dynamic current, voltage and thermal stress. Correspondingly produced products have a high MTBF and an accordingly low failure rate.

It is also known to assign so-called watchdog circuits to microcontrollers or, for reasons of reducing costs and saving structural space, to co-integrate corresponding circuit functions as a subfunction of a microcontroller, using the production technology of the respective microcontroller. As a rule, these circuits are provided with means for generating and broadcasting a temporally defined reset signal to the microcontroller after the build-up of its operating voltage. However, problems arise when current-supplied areas are present on the chip of the microcontroller at different voltage levels and one of these areas may be subjected to high interference signal loading from the supply end. Corresponding solutions therefore demand very effective external protective measures for a corresponding semiconductor chip.

Moreover, discrete auxiliary modules for microprocessors are known which have means for monitoring at least one operating voltage, in order to generate a reset for the microcontroller for the purpose of a reliable program stop when the operating voltage leaves a predetermined tolerance window. They are predominantly produced using low-voltage technology in the range of 0.8 to 1.5 $\mu v$.

German patent document DE 196 11 945.6, which was filed at the same time as the priority application DE 196 11 942.1, discloses a device for the bus-networked operation of an electronic unit with a microcontroller that takes account, inter alia, of the requirement of minimizing the total current consumption of a CAN during times of relative operational inactivity thereof.

The device comprises a specific semiconductor circuit having the bus function, of a communications transceiver and also a voltage regulator which can be electrically switched on and off. Both parts interact with one another such that the semiconductor circuit, in a specific operating state, outputs to the voltage regulator a signal which causes it to switch off, thereby also switching off the supply current generated at the output side to the electronics. In this state, only the semiconductor circuit and the regulator then draw very small quiescent currents from a superordinate supply potential; the microcontroller is deenergized. The semiconductor circuit which performs the transceiver function also includes additional functions therein for detecting bus faults and wake-up requests for reinitialization the microcontroller, as well as analog and digital functional components mixed.

Within the scope of that invention, it is proposed, inter alia, to integrate these functional components, together with the microcontroller and the bus protocol function monolithically on a single chip, thereby providing an electronic control unit that would essentially comprise, for example, three semiconductor modules. The latter include the (1) voltage regulator, the (2) single-body composite of microcontroller and bus protocol function, extended by the functional scope of the semiconductor circuit—to be understood conceptually as "Bus Application (BA) Controller"—, and also (3) an input/output interface which is connected downstream of the microcontroller in the direction of the application and serves to receive application-specific sensor signals and to drive requisite actuators, etc. The implementation and integration of such a semiconductor circuit is possible, but proves to be cost-intensive in relation to the range of applications that can be covered by such a special module.

An alternative to this would consist in integrating elements (1) to (3) to form a single "hyperchip". However, such a fully integrated "hyperchip" based on a microcontroller is no less restricted in its applicability.

Thus, different hyperchip variants are necessary for different unit requirements. However, type spreading means that economies of scale for the desired cost reduction factor are limited. Furthermore, such a hyperchip is a customized module with consequent ties to a particular manufacturer. This may be a disadvantage, under certain circumstances, if there are second and trisource imperatives. Moreover, corresponding customized solutions render any standardization difficult, thereby diminishing the cost advantage. EMC problems are to be expected both in the case of the hyperchip and of the BA controller since interference from the bus can easily reach as far as the micro-controller. Necessary EMC protection measures may vary considerably from hyperchip to hyperchip or BA controller to BA controller, for different applications. Thus, apart from their costs, they must be implemented differently in different applications, so that the design rules repeatedly have to be observed anew. This inevitably opens up possibilities of faults as well. Furthermore, not every microcontroller technology that is of interest now or in the future is equally suited to incorporate circuit components which, in practice, either have to withstand residual interference voltage loading (which may be of the order of magnitude of the operating voltage of the microcontroller), or stress the chip material with spot power densities which, in the event of an fault, may reach a point near to thermal breakdown. These ambient conditions which result in such stresses are a familiar occurrence e.g. in industrial control technology and in means of transport.

The abovementioned problems increase exponentially as the system shrink dimension grows with advancing μC technology. The spot power losses of, for example, drivers that may prevail on-chip are also becoming increasingly smaller. It may be assumed that the system shrink dimension of monolithic LS technologies will soon have reached 0.25 μm. However, interface functions using 0.25 μm technology are too sensitive to be connected directly with an industrial or vehicle environment, which is exposed to the risk, for example, of jump start, load dump and static overvoltage and to be operated with sufficient availability therein. Consequently, a structural-space and cost advantage that is achieved on the one hand forces additional means for the realization of protective functions, which additional means take up structural space and give rise to costs.

The object of the present invention, therefore, is to provide a semiconductor circuit for an electronic unit which avoids the above-mentioned disadvantages and problems and, in particular, enables a realization of modern two-wire-bus-controlled electronic units which is optimal in terms of space and cost.

The invention departs from prior approaches, and solves not only the problems of structural space, spreading and costs but also the additional problems of protecting the microcontroller against damaging ambient effects, and the need for numerous board connections on the microcontroller.

According to the invention, the voltage regulator and the semiconductor circuit driving the voltage regulator, with an interface function between two-wire bus and bus protocol module of the microcontroller are not co-integrated on the chip of the microcontroller using the low-voltage technology of the microcontroller. Rather, only the semiconductor circuit and auxiliary and expansion functions are co-integrated on the chip of the voltage regulator using the technology of the voltage regulator.

This technique obviates the need for the protective functions which were required just because the voltage regulator is provided on-chip with the microcontroller, in order to protect the latter against operational interfering effects on the voltage regulator (example: overheating, jump-start or load-dump punch-through by the regulator to the substrate).

To optimize costs, it is possible, in this way, freely to select microcontrollers having different bus protocol capability (for different specific applications), in order to cooperate with this functionality that is required equally in the vast majority of applications. For physical reasons, the technologies used for voltage regulators have substantially larger system dimensions than the low-voltage technologies for analog and digital application in A/D microcontrollers. For this reason, the robustness, which can be reproduced without difficulty in the voltage regulator, with regard to overvoltages, transients, radio-frequency irradiation, etc. is imported into the circuit function which fulfils the transceiver function between bus (functioning as "antenna" for interfering effects) and microcontroller, and consequently at the same time protects against all conceivable interference from the bus and from the power supply of the corresponding unit. In effect, this means that the high insulation requirements between the DC voltage-coupled two-wire bus and the highly sensitive low-voltage logic can be satisfied ideally in this way, while largely dispensing with cost-intensive protective means that take up structural space. The high demand for this function in a multiplicity of control units having performances that can be designed to be extremely varied overcomes the spreading problem, and makes it possible to achieve the cost advantages of very large-scale mass production. The end result is that a technical and structural optimization (in terms of complexity and costs) is thus achieved for the control unit as a whole by means of a well-restrained integration level, physically oriented to application practice, in comparison with modern LSI realization efforts.

Further advantages of the semiconductor circuit according to the invention are as follows:

The circuit is programmable.

The circuit contains programming means which permit one-time programming of at least one function of the circuit.

The circuit comprises a non-volatile memory area, designed as an EEPROM structure, for example.

The circuit comprises a non-volatile memory area and is programmable by data which determine at least one (characteristic) function of the circuit being able to be stored in the said memory area.

The circuit comprises an interface for the serial exchange of data and/or control signals between the circuit and at least the microcontroller which cooperates with the transceiver function thereof.

The driving and/or programming of at least one (characteristic) circuit function is possible via this interface.

The circuit means for providing at least one second supply voltage from linearly operating voltage regulator.

The circuit means for providing at least one second supply voltage from switched-mode voltage regulator.

The circuit means for providing at least one second supply voltage from a voltage regulator which is capable of a plurality of operating modes.

The voltage regulator which is capable of a plurality of operating modes can be operated both as a linear regulator and as a switched-mode regulator.

The circuit comprises means which allow the operating mode of the voltage regulator to be selected and/or changed in dependence on corresponding driving of the said voltage regulator.

The voltage regulator which can be operated as a switched-mode regulator is one which has an inductive energy store, the circuit being able to cooperate with at least the said energy store and a storage capacitor.

The switched-mode voltage regulator is a Buck-type step-down controller.

The voltage regulator comprises a freewheeling valve, which is current-conductive during the switch-off phases of the current flow for the purpose of magnetizing/charging the inductive energy store between one of the two terminals of the same and the reference-ground potential of the voltage regulation/ground potential.

The freewheeling valve is a diode path.

Freewheeling valve is a controlled electronic switch; in particular, a MOSFET transistor.

At least one of the electrodes of the freewheeling valve is routed to at least one particular terminal of the circuit and the said current conductivity can be realized by external circuitry of this at least one particular terminal.

The first current path electrode of the freewheeling valve is routed to a terminal of the circuit directly adjacent to the regulator output of the circuit and/or the second current path electrode is routed to a terminal directly adjacent to at least one ground terminal of the circuit.

The means for providing at least one second supply voltage can be activated and deactivated by a control signal with the aim of switching on and switching off, respectively, this supply voltage.

The means for the purpose of providing at least one second supply voltage configure two voltage regulators, namely a first voltage regulator for the purpose of providing a second supply voltage for the at least one microcontroller and a second voltage regulator for the purpose of providing a third supply voltage for the circuits of the control unit which cooperate with the said microcontroller/microcontrollers, these voltage regulators being configured in such a way that they can be activated and deactivated by means of a control signal.

The said means furthermore comprise control means, which cause the second and third supply voltages to be built up and/or reduced non-simultaneously in a defined manner, in dependence on a control signal.

The said control means are configured, or have an effect, such that in the case of activation, the second supply voltage for the at least one micro-controller can be built up before the third supply voltage for the circuits which cooperate with the said microcontroller/microcontrollers.

The said control means are configured, or have an effect, such that in the case of deactivation, the second supply voltage for the at least one micro-controller can be reduced after the third supply voltage for the circuits which cooperate with the said microcontroller/microcontrollers.

The two voltage regulators are independent of one another, and in this respect, only thermally coupled to one another and the circuit comprises means which have the effect that in the event of the substrate being heated, due to overloading, up to a critical temperature $T_{LIM}$, the second voltage regulator is always deactivated before this temperature is reached and the first voltage regulator is deactivated only after this temperature is reached.

The at least one voltage regulator can be driven and/or programmed in order to be set to a specific output voltage from a plurality of selectable output voltages.

The operating mode of the voltage regulator which is capable of a plurality of operating modes can be selected and/or set by driving and/or programming.

The means for providing at least one second, fixed supply voltage, can be operated both by a regulating transistor, which is included in the said means, that is to say is circuit-internal, and in connection with a regulating transistor, which is external to the circuit, and, for this purpose, the circuit has a terminal for driving the control electrode of an external regulating transistor which cooperates with the circuit.

The operability of the means for providing at least one second, fixed supply voltage by a circuit-internal regulating transistor or by a circuit-external regulating transistor can be selected and/or set by driving and/or programming.

The circuit has at least one external terminal for the said driving or programming.

The programming of the means for providing at least one second supply voltage is possible by connecting up the at least one external terminal to a reference-ground potential, in particular to ground potential or a potential near to ground, or a potential that differs significantly from the reference-ground potential, or a supply potential.

The drivability of at least one function is provided by the interface.

The transceiver function is configured, both with regard to its transmitting and receiving means and with regard to a control means that it comprises, in such a way that it can optionally transmit and receive differentially in a two-wire manner or in a single-wire manner on at least one bus core with respect to a fixed reference-ground potential.

The transceiver function is configured, with regard to its transmitting and receiving means, in such a way that the slew rate thereof can be influenced, in particular can be adapted to the bus bit period and/or baud rate of the communication.

The circuit has a control path, via which the influencing of the slew rate by the microcontroller which cooperates with the transceiver function is possible.

The receiving means comprise a control interface, through which runs the abovementioned control path for the influencing of the slew rate.

The receiving means comprise means for detecting faults in the signal transmission in the bus network and for generating an indicative fault signal.

The receiving means comprise means for detecting faults in the bus network which are configured in such a way that they enable faults to be detected, and an fault signal to be output in the event of an fault, in a bus core-specific manner.

The means for detecting faults in the bus network comprise adjustable selection means which enable at least one indicative fault signal to be output; these means can be set to a preselectable number of successive bit signal faults as criterion for the outputting of the fault signal.

The receiving means comprise first selection means for faults which can be detected on the first bus core and second selection means for faults which can be detected on the second bus core, the first and second selection means being able to be set independently of one another to first and second numbers of successive bit signal faults as criteria for generating fault signals respectively assigned to the first and second bus cores.

The circuit has a control path, via which the setting of the abovementioned selection means by the microcontroller which cooperates with the transceiver function is possible.

The receiving means comprise a control interface, through which runs the abovementioned control path for setting up the selection means.

The control interface provided for influencing the slew rate and the control interface provided for setting the selection means are combined in one circuit structure.

The receiving means comprise at least one fault store, which can be set by an aforementioned fault signal.

The at least one fault store is part of the non-volatile memory area in accordance with claim 4.

The circuit comprises potential influencing means, which are connected to the transceiver function and serve to influence at least one signal level which is dominant in the case of transmission and/or discriminant in the case of reception.

The circuit comprises means for providing a further, circuit-internal supply voltage or a circuit-internal supply current for supplying the potential influencing means.

The circuit has a terminal for external monitoring and/or capacitive filtering of the circuit-internal supply voltage or of the circuit-internal supply current.

The circuit has a control path, via which the at least one microcontroller is capable of communication with the transceiver function and via which the potential influencing means can be driven.

The circuit comprises a control interface, through which runs the control path to the potential influencing means.

The control interface is part of, or is identical to, the interface.

The potential influencing means are configured in such a way that in the event of transmission, at least one of the two signal levels which determine the dominant bus level window can be shifted monotonically at least incrementally and/or decrementally.

In the context of the capability of influencing the two signal levels which are dominant in the case of transmission, both can be set or altered independently of one another.

The two signal levels which are dominant in the case of transmission can be set or shifted in such a way that the interval separating both levels is essentially maintained in the process.

The circuit has a signal-dedicated terminal as reference-ground potential busbar at least of the receiving means of the transceiver function.

The circuit has a current-dedicated terminal as reference-ground potential busbar at least of the means for providing at least one second, fixed supply voltage.

The circuit comprises a particular terminal as reference-ground potential busbar at least of the means for setting or alteration in the event of transmission of at least one of the two dominant signal levels which determine the bus level window.

The circuit has a particular terminal, via which the potential influencing means can be operatively connected to a reference-ground potential in the external environment of the unit carrying the circuit.

The circuit has, in the path of the said operative connection, means for protection against overvoltage and/or incorrect polarity and/or radio-frequency signal inputting.

The circuit is provided with an operating state, in which the means for providing the at least second supply voltage are switched on, the receiving means are activated and the transmitting means are deactivated and, in this respect, have no influence on the bus.

The circuit is provided with at least one operating state, in which the transmitting means of the transceiver function have no influence on the bus and in which the means for providing the at least second supply voltage are deactivated or switched off.

The circuit comprises, connected to the bus, wake-up identification means and control means, by means of which it can activate the means for providing the at least second supply voltage for the purpose of leaving this at least one operating state.

The circuit comprises control means which enable the microcontroller, which cooperates with the transceiver function, to put the circuit (back) into the abovementioned operating state.

The transceiver function is configured, with regard to its transmitting and receiving means, in such a way that the latter are tolerant to all possible fault states in and on the busline network, provided that all the bus subscribers behave compatibly with regard to the bus line network.

The circuit furthermore comprises, means for realizing a watchdog function at least for resetting the microcontroller which cooperates with the transceiver function for the purpose of monitoring a variable which is significant for the proper functioning or program execution of the said microcontroller.

The means for realizing a watchdog function comprise at least one timer and the circuit has at least one terminal for connecting up the watchdog function to at least one time-determining element.

The means for realizing a watchdog function are directly connected to the means for providing at least one second, fixed supply voltage.

The means for realizing a watchdog function and the means for providing at least one second supply voltage are connected to one another via a control path which proceeds from the interface.

The means for realizing a watchdog function are configured in such a way that they can additionally monitor, and reset, at least one further microcontroller of the control unit in respect of its proper functioning and program execution.

The circuit comprises means for generating and communicating—after at least the supply voltage which feeds the at least one microcontroller is built up—a reset signal to the at least one microcontroller.

The circuit comprises means for outputting at least one inhibit signal in connection with the generation and transmission of at least one reset signal to the at least one microcontroller.

The circuit comprises means for monitoring at least one voltage from the first supply voltage (feeding voltage of the circuit) the at least one second supply voltage with regard to at least one limit value, and also means for outputting an interrupt signal or reset signal to at least the microcontroller, which cooperates with the transceiver function, when this limit value is undershot or exceeded.

The circuit has at least one particular input, via which a wake-up signal can be applied to the wake-up identification means, which are connected to the bus, in the operating mode; the circuit is furthermore configured in such a way that its behavior in response to a wake-up signal at this at least one particular input is identical to its behavior when a wake-up signal is received via the bus.

The circuit comprises autonomous means which are independent of the transceiver function, for detecting at least one wake-up signal in time periods at least of reduced or else increased activity of the at least one microcontroller.

The autonomous means have a plurality of inputs for receiving wake-up signals.

The autonomous means can be fed from the first supply voltage and can be operated independently of the means for providing at least one second, fixed supply voltage.

The autonomous means comprise at least one timer for the timing control of their function.

The autonomous means can be driven from the at least one timer of the watchdog function for the purpose of timing control of their function.

The autonomous means comprise at least one storage cell for storage of a detected wake-up event.

The autonomous means are capable of communicating with at least one microcontroller and are constructed such that they can be directly connected to such a microcontroller.

The autonomous means are capable of communicating via the interface, with the at least one microcontroller.

The autonomous means have at least one high-side and/or low-side switch for the at least periodic voltage supply of at least one wake-up sensor.

The autonomous means have at least one high-side and/or low-side current source for the at least periodic current supply of at least one wake-up sensor.

In a circuit the at least one high-side and/or low-side switch or current source can be controlled by the at least one timer at least indirectly in such a way that its or their switched-on duration $t_w$ is shorter than the repetition time $t_s$ of its or their switching on.

In a circuit the watchdog function and the autonomous means are configured with regard to one another in such a way that the at least one high-side and/or low-side switch or current source can be switched on for a predetermined switched-on duration $t_w$ at a repetition rate $f_s = 1/t_s$ which is temporally interlinked with the repetition rate of a control signal which can be output by the watchdog function to the at least one microcontroller.

The switched-on duration $t_w$ and/or the repetition time or repetition rate $t_s$ or $f_s = 1/t_s$ and/or an interlinking factor are/is programmable.

The circuit comprises discrimination means which initiate the storage of a wake-up event when the wake-up event has been detected for the N-th time, where N =INTEGER $((t_d/t_s)+1)$.

The number N is programmable and/or selectable from a set of predefined values.

The autonomous means are programmable, with regard to the truth condition of at least one of the plurality of wake-up inputs, from a fixed set of possible truth conditions and, in this respect, are flexible with regard to their circuit function.

The one-time programming of a circuit according to the invention may be initiated via the serial interface.

The circuit is programmable (configuration programming) with regard to at least one of the functions which are included in addition to the means for providing the at least second supply voltage, and/or the limit value(s) of the said function(s) and/or the time response(s) of the said function(s) and/or the truth condition(s) of the said function(s) or can be set to predefined values.

The programming of the configuration of the circuit can be stored as a closed data record in a non-volatile memory area.

The circuit comprises means which allow the abovementioned data record to be able to be read into the circuit—after the installation of the latter into the control unit—from another control unit having an already programmed circuit and the characteristic function of the circuit to be able to be cloned in this respect.

The non-volatile memory area of the circuit can be is read out and/or overwritten by the microcontroller, which cooperates with the circuit, via an interface.

The circuit has two terminals for the connection of two external terminating elements for the two bus cores and also internal bus fault detection means and internal backup terminating and changeover means, in order to alter the bus termination in the event of an fault.

The transceiver function of the circuit comprises adjustable bit period filters for optimizing the interference suppression to the communications baud rate.

The bit period filters are digitally adjustable.

Potential influencing means realize an adjustable offset voltage source, which is looped into that supply terminal of the transmitting means which is near to the reference-ground potential.

At least parts of analog action of the receiving means are connected in parallel with the constant-voltage-supplied transmitting means in terms of power supplying, with the result that the said offset voltage source is effective at the receiving end as well.

The potential influencing means realize a first adjustable offset voltage source, which is looped into the supply terminal, near to the reference-ground potential, of a switching output stage of the transmitting means which drives the bus core BUS_L, and a second adjustable offset voltage source, which is looped into a supply terminal, which is opposite in terms of potential, of a switching output stage which drives the bus core BUS_H.

The potential influencing means additionally realize a third adjustable offset voltage source, the latter and the previously mentioned second offset voltage source being referred or connected to supply potentials of different magnitudes.

The second and third offset voltage sources can be activated alternatively.

The offset voltage source ($Q_{SL}$) referred to the reference-ground potential and the effective offset voltage source remote from the reference-ground potential can be activated alternately only in chronological succession.

The circuit comprises means which allow activation of the second and third offset voltage sources in dependence on the transmission signal.

The potential influencing means comprise means for autonomous alteration of the setting of at least one offset voltage source over time.

Such an alteration is possible in dependence on the data signal at the transmitting end.

A clock signal, which can be drawn from the at least one microcontroller can be fed to the means for autonomous alteration of the setting of at least one offset voltage source.

The potential influencing means comprise regulating means which allow the influencing to be performed in accordance with a value specification, which can be received from the at least one microcontroller, in dependence on a potential which can be tapped on a bus core.

The potential influencing means comprise— independently of the transmitting means—backup means which are connected or can be connected to at least one bus core and allow connection, keyed by the transmission signal, to the bus core of a regulated potential.

The potential influencing means furthermore comprise measuring means, which afford the acquisition of an fault quantity, caused by the backup means, for the purpose of compensation by regulating connection or computational allowance in the desired value specification for the regulation by the at least one microcontroller.

The potential influencing means comprise— independently of the transmitting means—backup means which are connected or can be connected to at least one bus core and via which a connection which is keyed by the transmission signal is possible to the bus core by of an unregulated potential in accordance with a digital value which can be predetermined by the at least one microcontroller.

For the purpose of activating one of the backup means, the latter can be fed the transmission signal from the relevant core output stage via a changeover switch, which, if appropriate, disconnects the core output stage from the bus core.

The regulating means comprise a sampler, which is operatively connected to a bus core, and a holding element or a holding regulator.

The sampler is one which has two diode paths, the second diode path being provided for the compensation of temperature influences and/or of an fault voltage, caused by the sampling current flow, along the first diode path.

The potential influencing means are configured in such a way that they allow the influencing of at least one recessively discriminant signal level by the influencing of at least one threshold voltage in the receiver.

The receiving means have means for specifying two threshold values, which means are referred to a reference-ground potential busbar. Here, reference-ground potential busbar is operatively connected or can optionally be operatively connected to one of at least two alternative reference-ground potential terminals of the circuit.

The influencing is possible by means of an adjustable offset voltage source which lies in the supply current path, near to the reference-ground potential, of at least parts of analog action of the receiving means.

The reference-ground potential busbar of the threshold value specification means can be connected to the supply reference point, near to the reference-ground potential, at least of the parts of analog action of the receiving means.

The receiving means of the circuit have level discrimination means referred to a supply reference point. Here, this supply reference point is operatively connected to a reference-ground potential terminal or can optionally be operatively connected to at least two alternative reference-ground potential terminals of the circuit.

The potential influencing means comprise digital/analog conversion means and/or analog/digital conversion means.

The potential influencing means comprise digital/analog conversion means which can generate at least all the reference values, control and switching signals for potential influencing that is to be performed, where applicable, during transmitting and/or receiving operation of the transceiver function.

An offset voltage source referred to a higher supply potential is replaced in the circuit by a supply voltage source which is referred to a lower supply potential and can correspondingly be varied with offset capability.

The circuit is an integral part of an electronic control unit in which it is wired up or can be driven for only single-wire reception and only single-wire transmission (with only one line driver at the transmitting end).

The circuit is part of an electronic control unit provided for use in a means of transport.

The circuit is part of an electronic control unit provided for use in construction machines or hoists.

The circuit is part of an electronic control unit provided for use in automation technology.

The circuit is part of an electronic control unit provided for use in electrical installation technology or buildings technology.

The circuit is part of an electronic control unit provided for use in heating technology or air-conditioning technology.

The circuit is part of an electronic control unit provided for use in alarm technology, safety technology or access control technology.

The transceiver function of the circuit is designed for communication according to the CAN standard and for connection to a CAN bus line network.

The circuit is fabricated using homogeneous high-voltage technology.

All in all, then, the circuit can also comprise, in addition to at least one voltage regulator for the power supply of a control unit and a signal transceiver for communication via a two-wire bus, watchdog functions, various wake-up functions and an interface for serial data transmission between the circuit and at least the microcontroller which cooperates in a bus-communicative manner with the circuit. Via the interface, it is possible to exchange the cooperative control signals and/or data. Also provided are the capability of programming all the essential functions and/or their limit values and/or time responses, and also the capability of storing corresponding programming data in an optionally included non-volatile memory of the EEPROM type, for example.

The circuit can be produced cost-effectively using a homogeneous high-voltage technology, so that it is highly robust and resistant to possible interfering and overloading effects in the industrial and vehicle environment. Thus, it is especially suited to use in means of transport or industrial environments.

Exemplary embodiments of the invention are illustrated in the drawing and explained in more detail in the description below.

While the following description of the figures is based by way of example—on an implementation for a CAN bus and, therefore, also uses designations introduced in this field, the invention nevertheless also encompasses other two-wire buses. It can therefore be used just as advantageously in correspondingly equipped control units—for example according to the J1850 Standard. This general applicability is taken into account in the drawing both by a mutual designation of the bus lines by BUS_H and BUS_L and a specific designation for the CAN application CAN_H and CAN_L. The description of the complex functionality is deliberately handled such that it retraces, for a person skilled in the art, the path on which the concrete solution in this case was found.

Other objects, advantages and novel features of the present invention will become apparent from the following detailed description of the invention when considered in conjunction with the accompanying drawings.

DETAILED DESCRIPTION OF THE DRAWINGS

The invention is based on the insight that there are now scarcely any electronic control units with bus capability which do not require or contain a voltage regulator for supplying at least the circuit components which effect the capability of bus communication.

Figure 2:
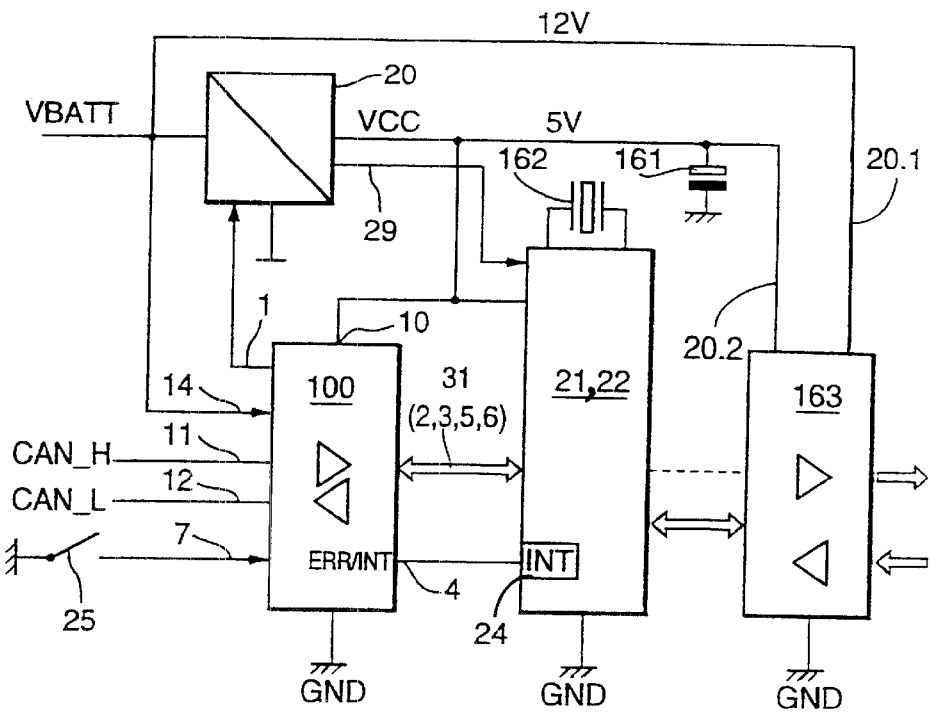
FIG. 2 shows a control unit.
Figure 3:
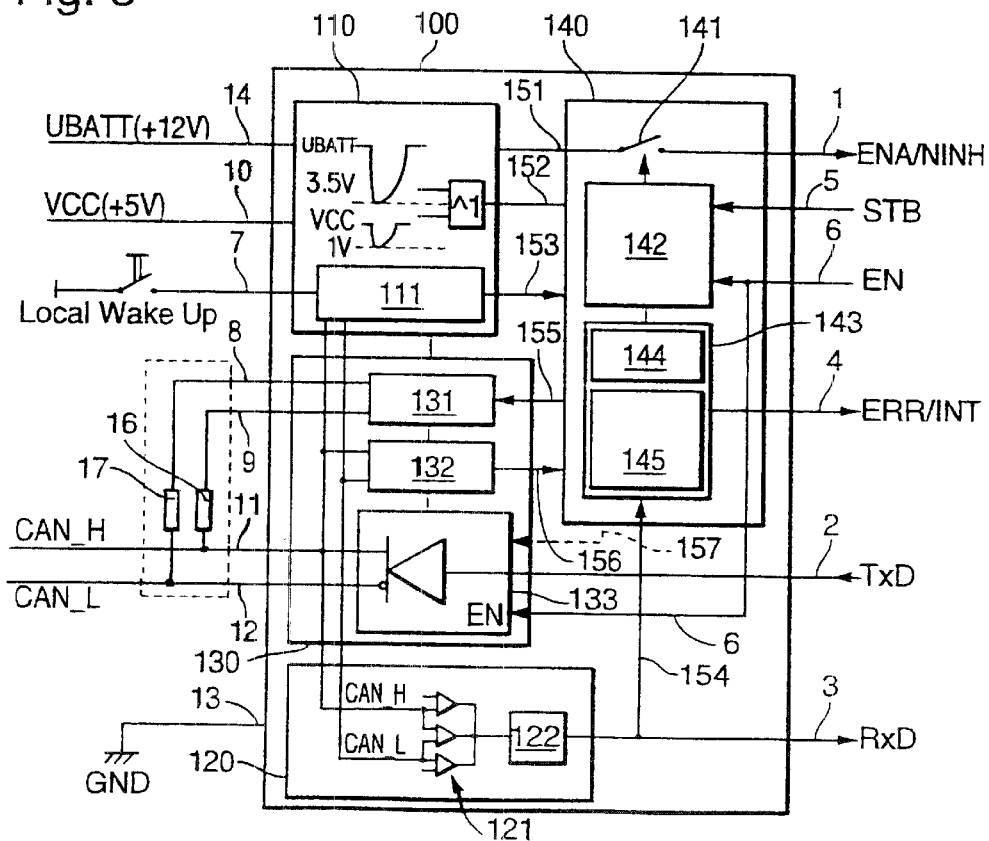
FIG. 3 shows the functions which the semiconductor circuit 100 in FIG. 2 can comprise at a lower integration level.

The microcontroller 21 in accordance with FIG. 2 which has an integrated bus communications module 22 that makes the control unit capable of bus communication, is taken as a basis here, by way of example. Referring to FIGS. 2 and 3, the bus is in this case formed by the two cores CAN_H and CAN_L, and is connected to terminals 11 and 12 of the semiconductor circuit 100. 20 is a special voltage regulator which can receive a switch-on and switch-off signal (ENA/NINH and NENA/INH) via the path 1 and can output, via the path 29, a RESET signal PWROR to the microcontroller 21 having bus protocol function 22. The voltage regulator 20 is connected, on the input side, to a busbar 20.1 at the higher supply voltage VBATT (12 volts) and, in the switched-on state, outputs, on the output side, the lower voltage VCC (5 volts) to a supply busbar 20.2 in the control unit. The lower voltage is buffered by means of a large capacitor 161 and supplies operating energy not only to the microcontroller 21 but also to an Input/Output (I/O) interface 163, which communicates with the latter, and the semiconductor circuit 100. The latter circuit—and also, for example, relay drivers or pulse-width-modulated output stages 163.1 and/or signal acquisition and digitizing input means 163.2 in the I/O interface 163—additionally draw the higher supply voltage VBATT from the feeding input past the regulator 20.

The semiconductor circuit 100, which is connected via paths 2 to 6 to the microcontroller 21, is capable (selection by EN and STB, setting by 142) of a plurality of operating modes—that is, at least the operating modes NORMAL and SLEEP. As shown in FIG. 3, this circuit may comprise all of the analog and digital circuit means for the following functions: transmitting/receiving communication (133+120=transceiver nucleus); bus fault detection in the block 132; reversing the termination of the bus by changing over terminating elements and/or their reference-ground potential in the block 131 in the SLEEP mode, automatic bus fault handling in the block 131, both in respect of fault-responsive (by 132) reversal of the termination of the bus and in respect of an fault-responsive setting and/or reconfiguration or adaptation of the transmitting and receiving means in the blocks 133 with 132 and 120; emergency communication (for example single-wire operation across reference ground GND) given the presence of a bus fault by dint of the block 132, the control block 140, the optional connection 157, and the blocks 133 and 120; wake-up identification 111 locally via the path 7 from a switch 25 or from the bus CAN_H/CAN_L; supply fault detection with regard to VBATT and/or VCC in the block 110; generation 141 and provision by the control block 140 of the switch-on and switch-off signal ENA/NINH to the voltage regulator 20; and in the blocks 143, 144, 145, setting WAKEUP, POWERFAIL and BUS ERROR flags (in order to represent INTERRUPT signals for the microcontroller 21).

The semiconductor circuit 100 drives the voltage regulator 20 in order to switch it off after the semiconductor circuit 100 has entered the "SLEEP" mode, and to switch it on in the event of a wake-up of the semiconductor circuit 100. With the voltage regulator switched off, the control unit illustrated in FIG. 2 draws from the potential VBATT, only the very small quiescent input current of the regulator and the quiescent current of the semiconductor circuit 100 in the SLEEP mode.

Figure 4:
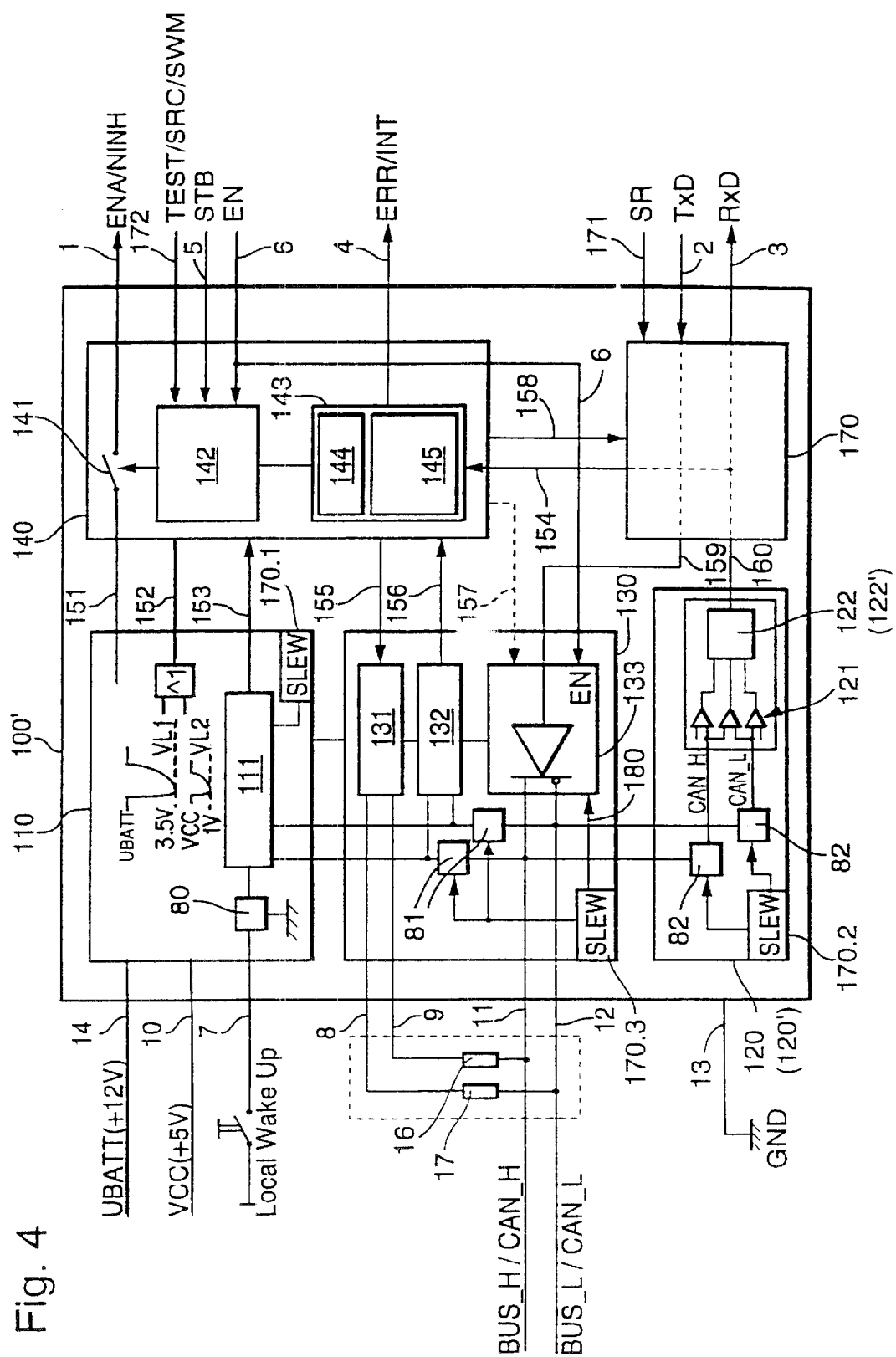
FIG. 4 shows a schematic illustration of a semiconductor circuit 100' which is even more universal than in FIG. 3 and is constructed wit additional functions.

FIG. 4 illustrates a modification of the semiconductor circuit 100 into a semiconductor circuit 100', which, for larger-scale integration, can advantageously form th basis for the "Super-Chip" described below. In this embodiment, function blocks 110, 120 and 130 include additional means 170.1 and 170.2 and 170.3, respectively, for the influencing, controlling and setting at least the receiving means 120 and the transmitting means 130, as well as (under certain circumstances) the wake-up identification means 111 in the block 110. Furthermore, the connection paths 159 and 160 of the signals TxD and RxD (and under certain conditions also the path 154) can be routed through a block 170 having the function of a slew-rate controller. Moreover, with regard to the local terminal 7, a protective filter 80 is connected upstream of the wake-up identification means 111.

Corresponding filter elements 81 and 82 are connected upstream of the two CAN_H/CAN_L inputs of the wake-up identification block 111 and the bus fault identification block 132. They are also connected upstream of the two inputs of the receiver front end 121 in the reception block 120, which has fault-handling and logic means 122 connected downstream of it. The abovementioned filter elements differ from the protective filter 80 in that they can be controlled by block-assigned slew-rate setting means 170.2 and 170.3. The slew-rate setting means 170.3 can also act, via an optional path 180, directly on the output stage 133. Active influencing of the slew rate of the transmitter in 130 is then possible on this route.

A slew-rate controller 170 can be driven, via the optional path 158, by the control block 140. In addition, it can optionally be driven via at least one further terminal 171. Furthermore, the function block 142, which sets the operating modes of the semiconductor circuit 100' in accordance with the specification from the microcontroller, can be expanded by a further input 172 for a Testsignal (TEST) and/or Slew Rate Control Signal (SRC).

The detailed function of this expansion is as follows.

The slew-rate control block 170 operates, for example, either in response to an SR signal present at its input 171, or (as explained further below) in dependence on (or in interdependency with) the signal TEST/SRC-which is optionally also interlinked with signals EN and STB-via connections (not shown). This slew-rate control block 17 influences the block-assigned slew-rate setting means 170.1, 170.2 and 170.3; and via the latter in this case, by way of example, also influences the transmission output stage 133. As a result, on the one hand, the slew rate of the output stage is correspondingly altered, set and changed over, respectively, and, on the other hand, the slew follow behavior of the blocks 110, 120 and 130 is altered, set and changed over, respectively. In the simplest case, corresponding frequency band clipping of the input signals from the bus CAN_H/CAN_L is activated at the bus inputs of the blocks 110, 120 and 130.

This controllable slew-rate influencing makes the transceiver nucleus of the circuit 100' suitable for different transmission rates and bus bit periods. As a result, the circuit 100' (and consequently, a "Superchip" which contains it) can be used in different systems having bus cut-off frequencies that differ greatly from one another. For example, such a circuit can serve FAST CANs in the management of vehicle internal combustion engines in exactly the same way as it can serve SLOW CANs in vehicle interior spaces. This integrated universality achieves a cost advantage by way of the numbers branch.

Furthermore, by control of the slew rate, radio-frequency interference signal suppression can be directly influenced, to be precise both in terms of transmission and in terms of reception. The lower the bit slew rate on the bus CAN_H/CAN_L, the greater the electromagnetic interference radiated from the bus network and its branches, which radiation is caused by transmission operation. The shorter the identifiable or discriminatable slew rate of the receiver front end 121 or of the wake-up identification block 111, the greater the risk of an undesirable reading or wake-up fault caused by radio-frequency interference spectra acting electromagnetically.

From this, it follows the filters 81 and 82 that may be used here are not only controllable low-pass filters but also, equally, real, preferably DC-coupled, slew-rate filters of analog or digital action which allow the signal slew rate or bit periods on the bus to be utilized extending as far as the respective limit slew rate or limit bit periods. The filters may also be bit period filters which can be set to the communications baud rate of the bus, in order to optimize the interference suppression. As may be understood further below in connection with FIG. 29, such bit period filters can be set digitally by a control interface 124 of the transceiver function.

In this way, it is also possible to obtain a high signal-to-noise ratio in the bus environment in motor vehicles or electrical rail-bound vehicles, for example, in which motors/engines and loads are being fed to an increasing extent by means of heavy, clocked currents. As a result of excessive resonance increases in the cabling of the supply lines of such loads, which cabling exhibits inductance and capacitance, radio-frequency electromagnetic interference fields can act to a greater or lesser extent, depending on the spatial configuration of the field and the course of a bus line. The above-mentioned features afford a possible way of reducing the effect of this kind of interference on communication (active interference protection).

In the case of preferred programming or setting of the circuit, the slew rate for wake-up signals and the slew rate for communications signals can be dimensioned such that they are unequal.

Furthermore, in the SLEEP mode, for example, the slew rate may also be set to a value which is lower than in all of the other operating modes. In this context, the connection 158 is intended to denote that, optionally, the control block 140 may also influence the slew-rate control. This measure achieves a corresponding insensitivity of a corresponding bus network, whose subscribers are each equipped with such a "SLEEP-SLEW" semiconductor circuit 100', relative to undesirable wake-up disturbances in the operating mode SLEEP. Since the circuit 100' is designed such that it consumes the least possible current $I_{IC2}$ in the operating mode SLEEP, the filter elements 81 and 82 can be constructed in such a way that they automatically effect the lowest slew rate in the event of disconnection of the internal power supply of the transmitting and/or receiving means 130 and/or 120. This lowest slew rate is then always effective in this sense in the operating mode SLEEP (run-up of the slew rate and automatic reversion to the SLEEP slew rate with a particularly high signal-to-noise ratio).

Furthermore, the controllable slew-rate influencing makes the transceiver nucleus of the circuit 100' suitable as a test transmitter and test receiver for software-based tests of a bus network, including those with test baud rates and test bit periods. In this context, too, the connection 158 is intended to denote that, optionally, the control block 140 can also affect the slew-rate influencing.

The interaction for bus diagnosis purposes of this slew-rate influencing with further functions within an SPI structure (described further below) of a semiconductor circuit 200 in accordance with FIGS. 6, 16 & 28 will be discussed further below in connection with FIGS. 28 & 29.

With regard to the transmitting and receiving means 130, 133 and 120 of its transceiver nucleus, the circuit 100' may preferably be constructed so that these means are tolerant to all possible fault states in and on the bus line network, provided that all the bus subscribers behave compatibly with regard to the bus line network. This provision which may be fulfilled, for example, if all the bus subscribers use the same circuit 100'. This applies in particular to single faults.

In addition to the operating modes of SLEEP, STANDBY, RECEIVE ONLY and NORMAL of a corresponding, relatively simple semiconductor unit 100, other operating modes are possible. The situation of expansion is realized in the present case. The block 142 can be fed, via the input 172, a further signal (designated by SRC/SWM) which redefines the meaning of the signals EN and STB, if required.

In this case, SRC stands for slew-rate control and SWM stands for single wire mode.

For example, test flags in unit 142 that can address test slew rates within 100' can be set or erased by the third SRC signal, by means of the bits EN and STB. For test capability, the slew-rate controller 170 may also comprise buffer-storing and/or digital delay means for at least one of transmission and reception path at 2 and/or 3. As also explained further below in connection with FIGS. 28 and 29, within the scope of the invention, such additional digital means can also interact with a repetitive signal SR at the input 171. In this way, under bus management which is geared towards uniform distribution of the bus intelligence, automatic testing of the bus is possible, with the participation of all the subscribers, for the presence or maintenance of defined transmission and signal-to-noise ratio qualities.

An essential aspect of the invention is that the test means which are near to the bus use a semiconductor technology which affords a high resistance to damage caused by coarse interfering influences. Thus, when a bus fault or bus quality fault has actually occurred (owing to whatever interfering influences), it is possible to retain the defective bus so that it is still fully automatically testable.

This inventive detail constitutes an important step on the way to fully automatic self- and remote diagnosis for instance via telecommunications paths of globally mobile CANs, for example in vehicles.

If appropriate, a fifth implemented operating mode "SINGLE WIRE MODE" may additionally be called up by the third SWM signal. In this operating mode the transmitting and receiving means 130 and 120 are temporarily changed over to single-wire operation via CAN_H or CAN_L with respect to reference ground GND.

In this case, only one of the two core drivers in the output stage 133 will then be activated in each case. In such an operating mode, control signals that are not critical with respect to time can, for example, be transmitted over short distances by means of the circuit 100' if necessary, at a reduced baud rate and/or bandwidth and/or slew rate (see above). That is, a type of sub-bus can be implemented for control purposes, while it can handle a different two-wire communication, independently of this, after corresponding changing over of SWM and/or, for example, at a higher baud rate.

The wide applicability of this functionality is maximized if the transceiver function 100, 100' is designed (both its transmitting and receiving means 130, 133; 120 and with its control means 142; 157; 172/SWM) so that it can transmit and receive either in a two-wire manner differentially or in a single-wire manner on at least one bus core CAN_H, CAN_L with respect to a reference-ground potential, for example with respect to reference ground GND, (that is to say with only one core driver of 133).

Figure 5:
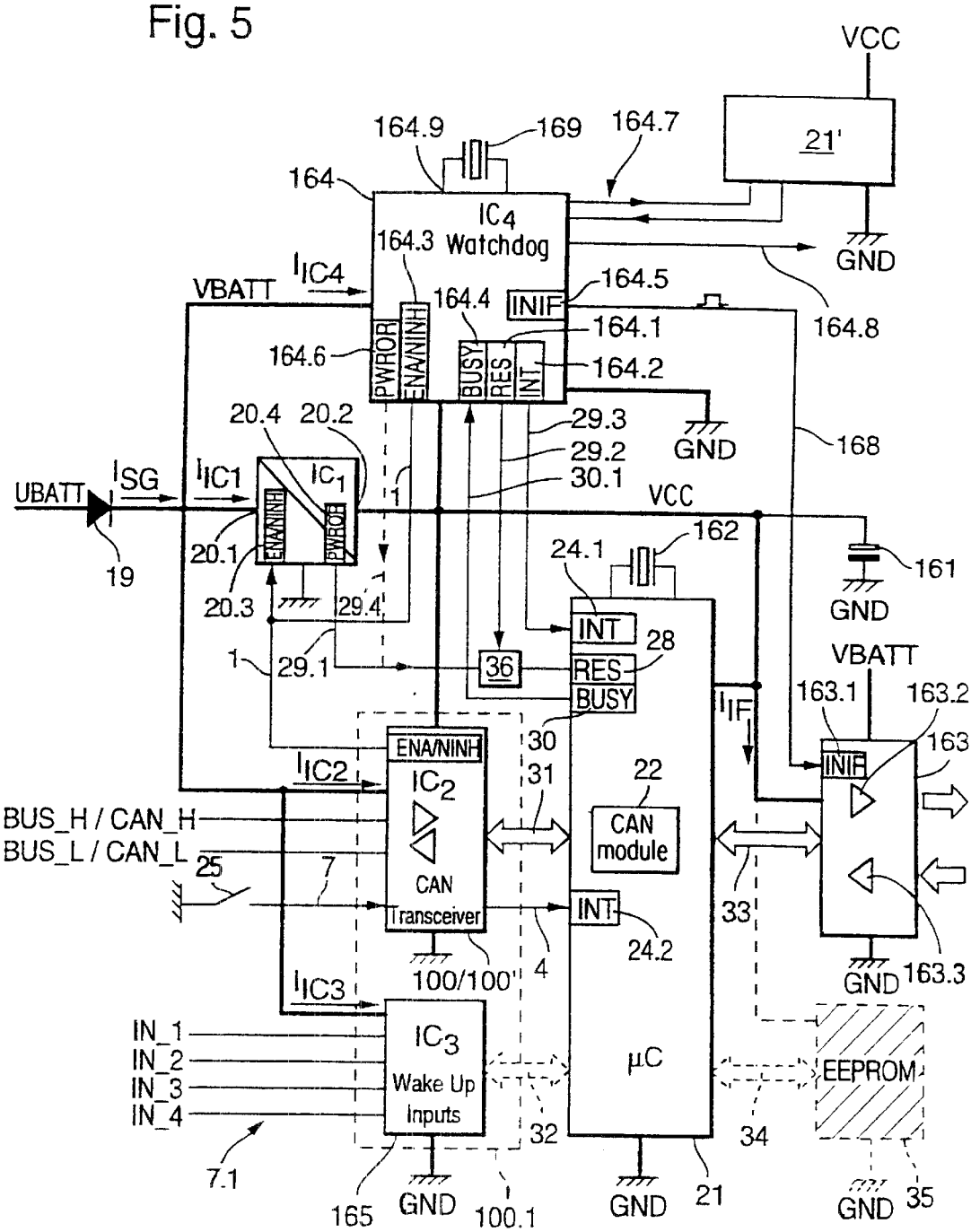
FIG. 5 shows a schematic block diagram of a more powerful control unit with a circuit function 100 in accordance with FIG. 3 or 100' in accordance with FIG. 4 and an optional non-volatile memory, ed as an EEPROM, by way of example.
Figure 6:
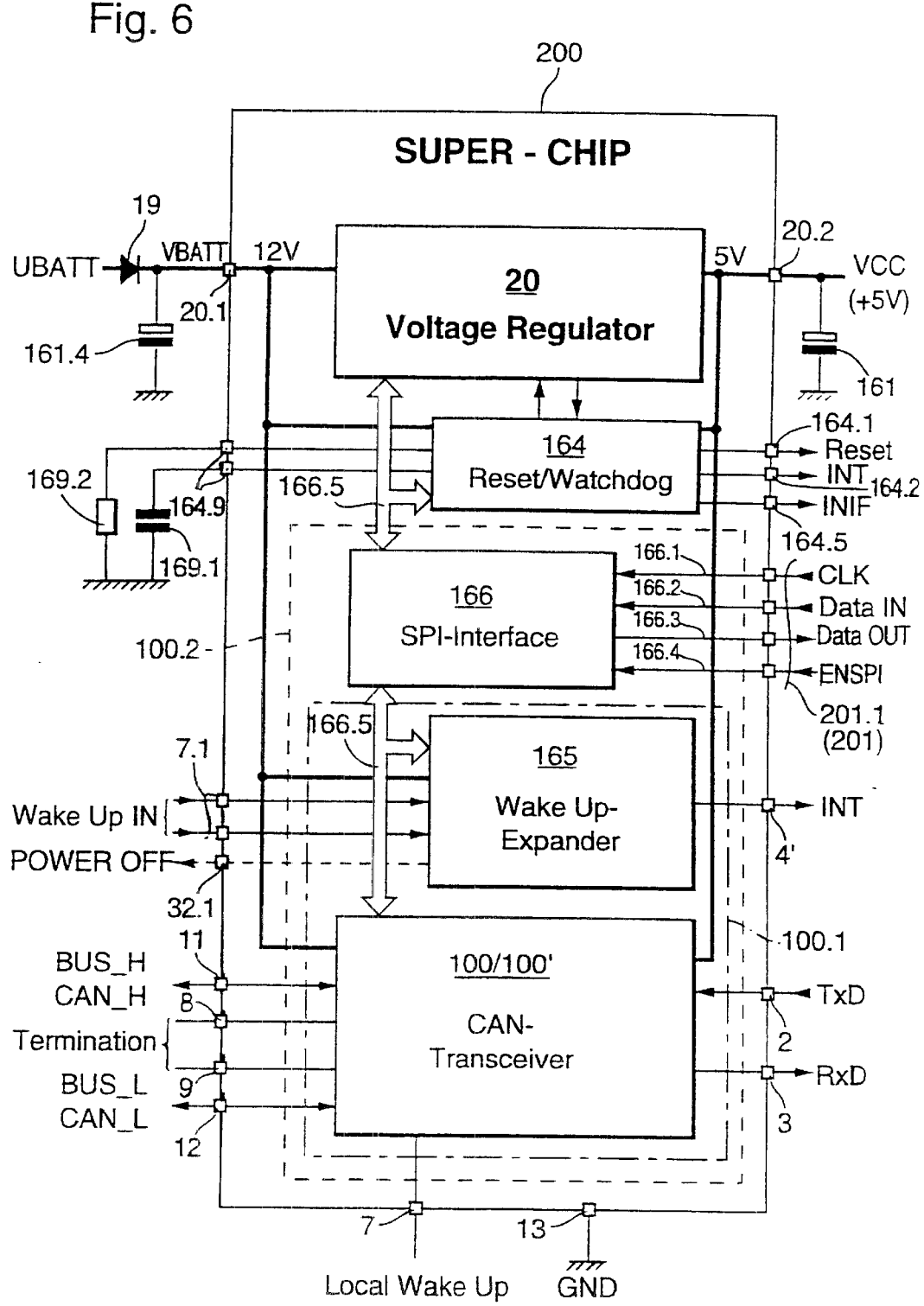
FIG. 6 shows a conceptual block diagram of a semiconductor circuit 200 which affords the power supply of a control unit and comprises even further functions.

FIG. 5 shows a modified control unit configuration whose discretely realized functions—except for those of the microcontroller 21 and of the input/output interface 163—are completely replaced by the simpler exemplary embodiment of the semiconductor circuit according to the invention as shown in FIG. 6. These functions are discussed in detail below.

The present control unit configuration differs from that in FIG. 2 inter alia by the fact that there are additionally provided a watchdog circuit 164 (IC4), which is supplied with continuous current by the input potential VBATT of the regulator 20 with respect to ground GND, and the output potential VCC of the regulator. The watchdog circuit 164 has at least one time base means 169 (for example, a resistor, capacitor, ceramic or quartz-crystal oscillator, delay element, resonant circuit or the like), and also a wake-up input expander 165 (IC3). The latter is supplied with continuous current by the potential VBATT, for in this case, for example, four inputs 7.1 (IN_1 to IN_4) additionally having wake-up capability.

This expander may be designed for the optional processing of wake-up signals from different sources, that is to say, for example, of switching signals with respect to ground GND or UBATT mixed, as explained in detail further below. On the output side, this expander acts not on the circuit 100/100', but rather, past the latter, directly on the microcontroller 21. This means that this expander is used for wake-up signals which are to be evaluated when a switch-on signal is applied to the regulator 20 by the circuit 100/100'; that is, for example, in the STANDBY mode thereof.

In this state, the microcontroller can remain in a low-power mode, for example in order to cyclically interrogate wake-up events at the inputs IN_1 to IN_4. In this context, the expander 165 may also comprise storage means (for example latches) for retaining only momentary wake-up signals until the latter have been read in by the microcontroller 21 activated from the low-power mode.

With regard to the wake-up function, the circuit 100/100' and the wake-up input expander 165 may be understood, as a fictitious circuit 100.1 with a function that is expanded once again.

The semiconductor circuit 100/100' has the control output 1 ENA/NINH which is connected to the driving input 20.3, of the voltage regulator 20.

In addition to the supply inputs mentioned, the watchdog circuit 164 has two further inputs, namely an ENA/NINH input 164.3 and a BUSY input 164.4. Also in this example, it has three outputs, namely a RESET output 164.1 (RES), an INTERRUPT output 164.2 (INT) and an INHIBIT INTERFACE output 164.5 (INIF). A fourth output 164.6 for a POWER ON RESET signal (PWROR) may be provided as an alternative to the corresponding output 20.4 of the voltage regulator 20.

The ENA/NINH input 164.3 is connected to the ENA/NINH output of the circuit 100/100'; in this case, therefore, the ENA/NINH signal of the circuit 100/100' acts at the same time on regulator 20 and watchdog 164. The BUSY input 164.4 is connected via the path 30.1 to a corresponding BUSY output 30 of the microcontroller 21, while the RESET output 164.1 is connected via the path 29.2 to a first input of a logic combination element 36. The INTERRUPT output 164.2 is connected via the path 29.3 to the INTERRUPT input 24.1 of the microcontroller, and the INIF output 164.5 is connected via the path 168 to a corresponding INIF input 163.1 of the Input/Output interface 163. The voltage regulator 20 has an output 20.3 which is connected via the path 29.1 to the second input of the logic combination element 36, the output of which is routed to the RESET input 24.1 of the microcontroller 31. The output 4 of the circuit 100/100' is in this case connected to an INTERRUPT input 24.2.

Also provided in the present case is an EEPROM 35 which is optionally connected via a multiple path 34 to the microcontroller 21 and in which data can be stored in a non-volatile but overwritable manner, for example in the event of the power supply being switched off. The microcontroller 12 and the EEPROM 35 are fed with VCC.

The multiple communications and control path 31 represents at least the terminal connections 2, 3, 5, 6, if appropriate also 171 and/or 172 of the semiconductor circuit 100/100' to the microcontroller 21. The wake-up control path 32 may likewise be a multiple path, in particular if the wake-up expander 165 comprises storage means (for example a flag register) which are reset by the microcontroller after each read-in operation. The communications path 33 between microcontroller 21 and input/output interface 163 may be a multiple to highly multiple path, depending on the number of connected sensors and actuators. In practice, the path is usually multiplexed since even very powerful microcontrollers have only a limited number of I/O ports, which do not suffice for many applications.

Accordingly, the microcontroller 21 can be reset via the path 29.1 and the logic combination element 36 from the PWROR output 20.4 of the regulator 20. Alternatively, given an appropriate design of the watchdog circuit 164, it can be reset via the path 29.4 from its optional PWROR output 164.6—as soon as the potential VCC has built up and a short period of time has also elapsed thereafter. (The latter period of time is required by the microcontroller for proper energization and starting-up of its circuits.) As an alternative, it may also be reset via the path 29.2 from the RESET output 164.1 of the watchdog circuit 164.

The watchdog circuit 164, which is quiescently energized with $I_{IC4}$, is initialized more rapidly by the ENA/NINH coupling of regulator 20, watchdog 164 and circuit 100/100'; that is, by the active ENA/NINH edge by which the regulator 20 is first switched on. As a result, it can monitor this voltage immediately (for example also with regard to a correct rise with respect to time) with the edge of VCC that subsequently rises only slowly relative to the backup capacitor 161.

The initialization of the watchdog circuit has the effect of starting up, by means of the time base unit 169 (in practice, for example, a quartz crystal or ceramic resonator), one or more internal time bases for the timing of the watchdog functions. On the one hand, the watchdog functions enable the watchdog circuit to generate and output signals which are precisely defined with respect to time, and, furthermore, enable it to test periodic signals for presence and correct timing (repetition rate, keying duration or duty ratio, burst frequency, etc.).

Configured in this way, this circuit can fulfil at least the following functions, by way of example:

1. Monitoring of at least one of the potentials VBATT and VCC to assure that they do not fall below a predetermined value and/or remain within a pre-determined range of values, in absolute terms or at a specific time; that is, also functions which can be swapped from the block 110 of the circuit 100/100'.

2. Monitoring both the microcontroller 21 and of its software execution with regard to reasonably proper functioning.

This monitoring can be effected in the following way: when it is functioning properly, the microcontroller 21 outputs at its BUSY output 30 a characteristic BUSY signal, for example a pulse having a repetition rate of 1 kHz. The presence of this signal suppresses a RESET output at 164.1 in the watchdog 164. However, if the corresponding BUSY pulses fail to appear for 3 ms, for example, or if they are repeated at a different frequency or in different burst patterns (for example in the event of monitoring a plurality of microcontrollers by means of the watchdog function 164 in the sense generalized in FIG. 1), a RESET pulse is output and passed via the element 36 to the microcontroller, so that the latter is reset. The microcontroller 21 is then reinitialized, from the point of view of the watchdog, in exactly the same way as by the PWROR signal from the voltage regulator after the latter has been switched on.

3. Cyclic wake-up of a control unit from a power-saving low-power or shutdown mode, and returning to such mode.

Such a cyclic wake-up can be carried out as follows: The application software of the microcontroller may be designed to hold the latter in a low-power or shutdown mode, which effects, for example, the outputting of STB ="H" in order to maintain the power supply via the circuit 100/100' and the regulator that is consequently switched on. At fixed time intervals, for example at an interval of 20–500 ms, the watchdog circuit outputs INT pulses to the INT input 24.1 of the microcontroller. As a result, the low-power/shutdown mode is ended and the microcontroller interrogates the signals which are currently present on the (if appropriate multiple) path 32 and are kept ready by the wake-up expander 165 from one or more wake-up signals that are possible at its inputs IN_1 to IN_4. If such a wake-up request is present, it can process the software that is intended, in accordance with the application, for this or these signals, and—if the expander 165 comprises storage cells for the purpose of keeping ready the wake-up request—can reset the cells.

This function is used, therefore, when specific wake-up signals are intended to wake up only one application, but not simultaneously the whole CAN. Nevertheless, the microcontroller can (if so provided in a superordinate bus management software) activate, via EN and STB, the circuit 100/100' and thus the whole CAN. This would be conceivable, for example, in the fail-safe case if the application-specific function fails for any reason or, for example, the inputs IN_1 to IN_4 belong to an alarm system and it would be desirable first to check an alarm for plausibility in the microcontroller, so that not until then—depending on the result of the check—are all the headlights or sirens switched on, for alarm purposes, at corresponding control units in the bus system via the circuit 100/100' and the bus network.

If, in the last example, the microcontroller is unable to ascertain an alarm signal from IN_1 to IN_4, the program is stopped by the microcontroller rather than the transceiver 100/100' being activated. As a result, the watchdog circuit 164 again passes into the operating mode for storing possible wake-up requests, and the microcontroller 21 into its specific operating mode of the initial low-power/shutdown mode in which it is ready to react anew to an INTERRUPT pulse from the watchdog circuit. In this way, the average operating current of the microcontroller 21 can be reduced to $\frac{1}{50}$ to $\frac{1}{1000}$ of the normal operating current, depending on the interrupt frequency and duration of the interrogation cycle.

For the sake of completeness, it may be mentioned that the ENA/NINH input 164.3 of the watchdog circuit 164 may also be constructed, under certain preconditions, as an output for an ENA/NINH signal to the regulator 20 acting comparably to that of the semiconductor circuit 100/100'. In this way, the power supply VCC of the microcontroller can also be completely switched off between individual interrogations of the expander 165.

For this purpose, the ENA/NINH output of the circuit 100/100' may be constructed, for example, as a tristate output and the input 164.3 of the watchdog as a tristate transceiver port. Thus, on the one hand, the regulator 20 and the watchdog 164 can be continuously switched on for as long as the duration of the ENA/NINH switch-on signal from the circuit 100/100'. On the other hand, the regulator can be switched on cyclically only for a short period of time which is predetermined, for example, by the duration of a corresponding pulse from a corresponding transceiver port 164.3 of the watchdog 164.

FIG. 5 indicates, furthermore, a further microcontroller 21', which can fulfil functions other than those of the bus communication in the control unit. Within the scope of the invention, the watchdog and reset function 164 described can equally well be constructed in such a way that it affords at least one, but preferably all of the, monitoring function(s) afforded to the microcontroller 21, including for at least one such further microcontroller 21'. The at least one further microcontroller 21' can likewise be fed from the supply busbar VCC.

This example illustrates that the circuit 100/100' on the one hand enables subscribers in the bus network to remain in the power saving SLEEP mode, while other units are held perfectly well in a low-power/shutdown mode such that they have a latent operating capability. This does not preclude a control unit equipped in this way from handling application-specifically dedicated power-saving management for its microcontroller(s) or even from being able to superpose it on that which is bus-oriented via the circuit 100/100', depending on the application software.

The INIF output 164.5 of the watchdog circuit 164 outputs an inhibit pulse which can be received via the path 168 from the INIF input 163.1 of the interface 163 and is temporally interlinked with the outputting of the reset pulse at the output 164.1. The interface 163 is inhibited for the duration of the inhibit, in order that undefined output port states of the microcontroller 21 at the instant of its resetting via the path 33 cannot activate individual output stages 163.2 and cause faulty energization for a short period of time.

It is evident that the total current consumption $I_{SG}$ of such a control unit amounts to the sum of the currents $I_{IC1}$–$I_{IC4}$, very small currents being involved in this case in the SLEEP mode. The remaining total current of the active control unit flows via the regulator 20.

Such a control unit configuration enables very many applications to be covered in the industrial control sector or vehicle, although the required performance capacity of microcontroller 21 and input/output interface 163 have to be rated dependent on the application.

As mentioned in the introduction, the total integration of the configuration in accordance with FIG. 5 led to a hyperchip. Such a solution initially appears to be advantageous because it overcame the problem of having a large number of hardware connections between the microcontroller 21 and its cooperative functions in the circuits 100/100', 163, 165 and 35. (The large total number of corresponding line connections existed only in an extremely small inaccessible space in such a hyperchip.) In this case, the number of soldering points susceptible to faults was reduced, as was the problem of EMC.

However, this advantage is nullified by the diverse disadvantages and problems of such a hyperchip as mentioned in the introduction. By contrast, alternative partial integration of the functions of the semiconductor circuit 100/100' and of the expander 165 with that of the microcontroller 21 overcame the problem of multiple connections or terminals only with regard to 31 and 32, that is, only to an unsatisfactorily small extent, with continued manifestation of the disadvantages mentioned in the introduction. Added to this is the entirely new problem, residing in the wake-up expander 165, that under certain circumstances even higher fault or interference voltages can be present at the inputs IN_1 to IN_4 of the expander than at the bus CAN_H/CAN_L:

Since, by analogy with the bus inputs of the semiconductor circuit 100/100', the wake-up inputs 7.1 can also receive radio-frequency input couplings in a single-wire manner with respect to reference ground GND, the circuit function 165 is also exposed to a high degree to electromagnetic irradiation consequences in radio wavebands. In this respect, integration of the expander together with the microcontroller dramatically increased an already existing hazard potential for the latter.

Taking these insights as a departure point, the invention takes a different route which alleviated not only the problems of structural space, type spreading and costs but also, the problems of protecting the microcontroller against damaging ambient effects and the numerous connections on the microcontroller, by means of a single semiconductor circuit 200 in accordance with FIG. 6.

In this semiconductor circuit 200, the semiconductor circuit 100/100', which drives the voltage regulator 20, is not co-integrated with its interface function between two-wire bus and bus protocol module 22 of the microcontroller 21 using the technology of the latter. Rather the semiconductor circuit 100/100' is co-integrated together with expander 165 (and element 36) on the chip, using the more robust technology of the voltage regulator 20.

The watchdog circuit 164 together with all its functions (preferably at least the three mentioned above) is likewise co-integrated using this robust technology. Within the scope of the invention, it furthermore becomes possible, as a result of this step, to swap the generation of the PWROR signal from the regulator 20 into the watchdog reset function, which is additionally expanded by this fourth function, as is symbolized by the two alternating arrows between voltage regulator 20 and watchdog function 164 in FIG. 6.

This step affords a plurality of advantages in an ideal combination, as follows:

a. In an embodiment of the circuits 20 (regulator IC1), 100/100' (transceiver IC2), 165 (wake-up expander IC3) and 164 (watchdog IC4), all the interconnected circuit functions which are to be supplied jointly with quiescent current from VBATT and are therefore exposed to an increased risk of damage due to jumpstart, load-dump or other interfering loading from the potential VBATT, are thus combined in a homogeneous technology on a semiconductor chip using the voltage-regulator technology which is capable of withstanding overloading.

Included with the circuits 100/100' (IC2) and 165 (IC3), therefore, are also those circuits, whose inputs CAN_H/CAN_L and IN_1 to IN_4 are exposed to a high risk of interfering loading from the bus and from the application zone. What this means for the resulting overall circuit 200 is optimum realization conditions for high resistance using proven and, moreover, cost-effective process technology as proven and customary for voltage regulators.

b. The problem of numerous connections within a control unit is solved in the context of the circuit according to the invention by co-integration—on the substrate of the voltage regulator—of a serial interface having only a small number of terminals.

An interface function having maximum terminals may preferably be provided for this application. Within the scope of the invention, this may be, for example, a UART interface, an RS 232 interface, or, for example, a standardized Serial/Parallel Interface (SPI) or a Serial Communication Interface (SCI) 166. The latter may then be understood as a subscriber circuit on an SPI/SCI bus within a control unit, as can be seen from the subsequent FIGS. 7 and 8. The problem of numerous connections and the inherent possibility of EMC interference for the control unit as a whole is dispelled by this measure.

The serial/parallel interface 166 illustrated by way of example in FIG. 6 is a standardized SPI 166, as mentioned above, which is provided with full terminal allocation: namely 166.1 for (SPI) clock (CLK), 166.2 for data input (Data IN), 166.3 for data output (Data OUT), and 166.4 for activation (ENSPI) of the SPI. However, the ENSPI input is not necessarily required in the context of the circuit 200. The abovementioned three to four corresponding paths form the multiple SPI path 201.1 between the semiconductor circuit 200 and the microcontroller 21 in FIG. 7 and 8.

The expansion by a serial interface such as, for example, an SPI or SCI 166 opens up the freely configurable use of the semiconductor circuit 200 with a minimum number of terminals in a wide variety of applications.

The universality already evinced in connection with FIG. 4 is further enhanced in that, by virtue of the SPI/SCI 166, important characteristics of the circuit 200 can be designed such that they can be freely or optionally programmed via only three or four terminals, such as, for example:

the so-called Reset behavior, for instance with regard to the POWER ON, POWER DOWN, VCC monitoring and BUSY RESETS;

the various watchdog times and waiting windows for the BUSY monitoring (software watchdog) and system monitoring of the microcontroller, if appropriate for the ENA/NINH pulse as well, and all other conceivable circuit functions under timing control by the watchdog function;

the definition of the wake-up inputs 7.1: Response polarity, response type (level sensitive/edge sensitive), hysteresis and trigger threshold, digital filtering of the truth acceptance, if employed (as described, for example, further below in connection with FIGS. 10 and 13);

communication with the CAN transceiver: Operating-mode control STB/EN on the part of the microcontroller, internal fault flag allocation for fault messages to the microcontroller, slew-rate setting via SR/SRC/SWM/STB/EN for FAST CAN and SLOW CAN operation and also for bus test routines;

the limit values for monitoring the applied potentials VBATT and VCC as well as the type of evaluation also with regard to the identification of an interruption that has taken place in the power supply from the potential VBATT (power-fail identification);

and others.

For this purpose, the SPI 166 communicates within the circuit 200 via internal paths 166.5 with the regulator 20, the watchdog function 164, the wake-up expander 165 and the bus transceiver, embodied in the circuit region 100/100', and diverse function blocks thereof in accordance with FIG. 4. For the sake of clarity, the wake-up expander 165 is in this case illustrated with only two inputs 7.1 (Wake Up IN). Thanks to the SPI expansion, it no longer requires a dedicated multiple connection 32 to the microcontroller 21, since the reading of the wake-up signals from the wake-up expander 165 into the microcontroller is in this case effected via the data path of the SPI bus 201, likewise the resetting of storage means in the expander 165, which are contained for example for buffer-storing wake-up requests therein.

Figure 7:
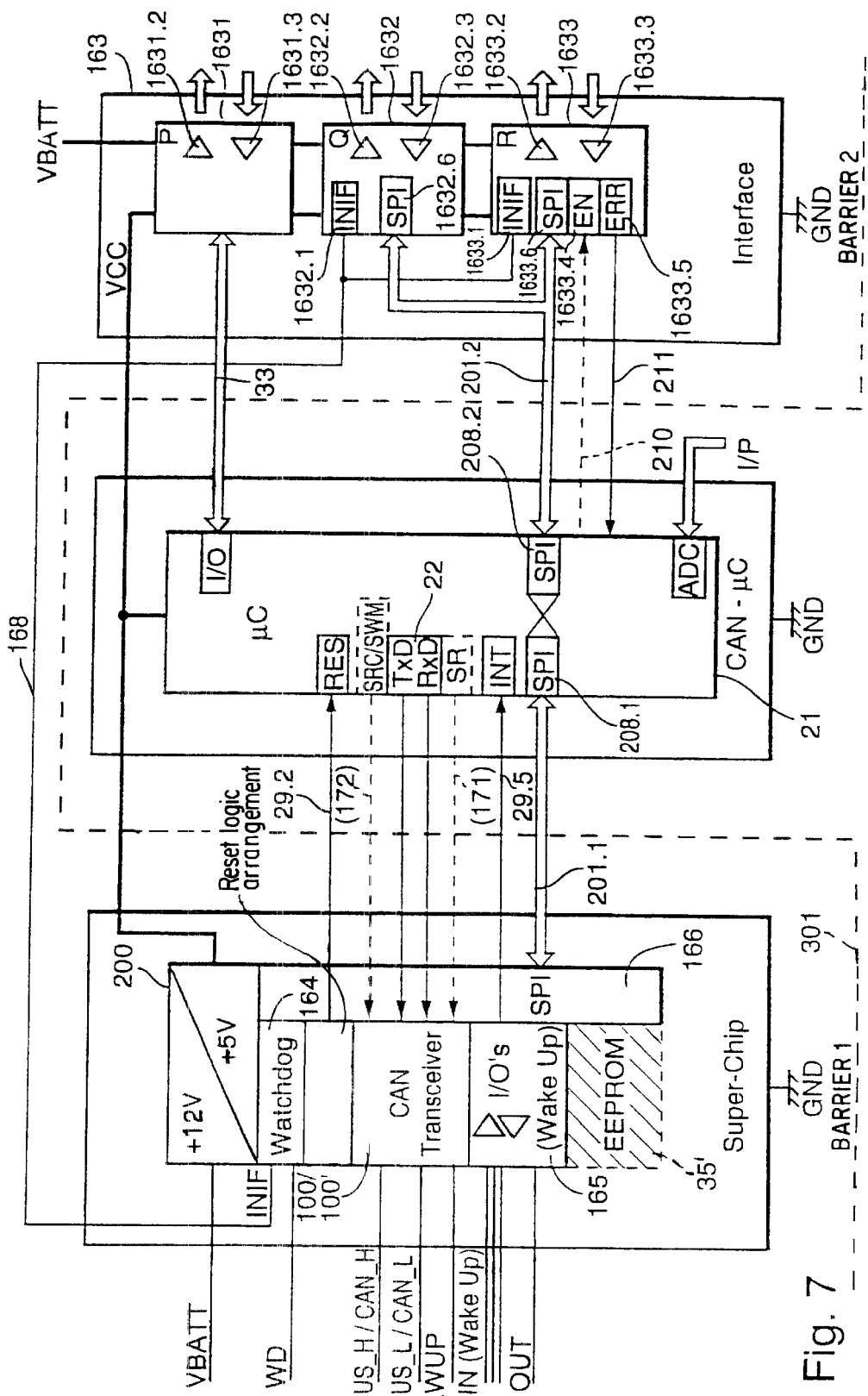
FIG. 7 shows a conceptual block diagram of a control unit which includes the semiconductor circuit according to the invention as shown in FIG. 6 in the control unit in accordance with FIG. 5 with an optional non-volatile memory area in the form of an EEPROM, by way of example.

In order to initiate the reading-in of a wake-up signal, the expander 165 may additionally have an INTERRUPT output 4', from which, via a path 29.5, the microcontroller 21 with SPI capability can be induced to effect reading in, cf. FIG. 7. A cyclic wake-up for this purpose of the microcontroller 21 is controlled in this case (also below), by the watchdog circuit function 164, as already described above with regard to FIG. 5. A corresponding INT signal at the output 4' can be processed in this respect as a statically present (since stored in the expander) interrupt in the course of microcontroller initialization that is shortened in a power-saving manner.

Furthermore, the wake-up expander 165 may optionally have, in addition, a Power OFF output 32.1, via which a switch-off signal POWER OFF can be output, for any desired use, whilst bypassing both the microcontroller as such, and, for example, the wake-up cycle thereof, depending on specific wake-up signals on specific input lines. Such an output can advantageously be utilized in cases where wake-up cycles for reading in wake-up requests last a very long time.

In this case, by way of example, a capacitor 169.1 and a resistor 169.2 (FIG. 6) are provided as external time-determining elements at terminals 164.9 of the watchdog function 164. This is not intended to signify a restriction; it goes without saying that frequency- or time-selective components such as quartz-crystal oscillators, ceramic resonators, delay or SAW filters can also be provided as the time base unit.

Except for the new terminals 201 (SPI Bus), 32.1 (Wake Up/POWR OFF) and 4' (INT/Wake Up Expd), the terminals of this circuit function correspond to those which have already been explained previously. (See FIG. 6.) What is essential is that the terminals for STBN, EN, ERR/INT, SR, TEST/SRC/SWM of FIG. 4 no longer crop up in this case since they are controlled, or replaced, by the SPI bus 201 via the SPI interface 166.

In the text below, the circuit 100, 100', to the extent of its equipment in accordance with FIGS. 3 and 4, is also referred to as transceiver function or as bus transceiver when it is applied as an integration component within the larger overall circuit function 200.

It is evident that the transceiver 100' with SPI communications capability and the wake-up expander 165 with SPI communications capability can, by analogy with FIG. 5, be understood in this case, too, as a circuit function 100.1 which is expanded by combination and forms, together with the SPI interface 166, a more global transceiver function 100.2.

Figure 28:
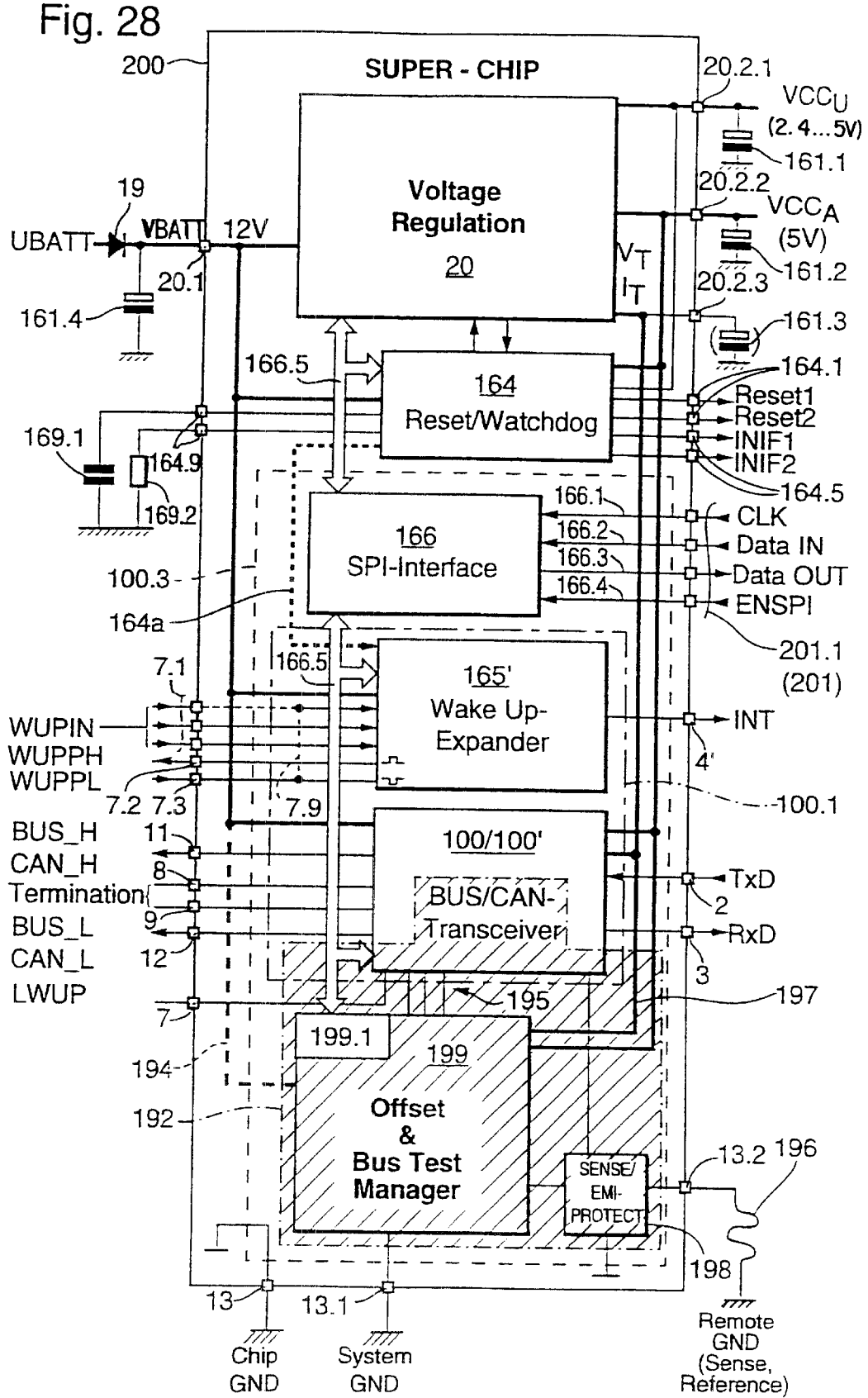
FIG. 28 shows a conceptual block diagram of a further developed circuit which comprises additional means 199 for the network-wide location, detection and handling of reference-ground potential faults and for potential tests with regard to transmission and reception level windows of bus subscribers.

For completeness, attention is drawn to the fact that a corresponding semiconductor circuit 200 for multi-microcontroller operation can, of course, have a plurality of reset and INIF outputs, as already mentioned analogously in connection with FIG. 5 and as shown in FIG. 28.

The polarity reversal protection element 19 upstream of the regulator 20.1 is expediently not co-integrated. The filter capacitors 161 and 161.4 indicated at VCC and VBATT, respectively, support these potentials against dips and effect controlled voltage maintenance when current no longer flows via the element 19, so that a regulated program termination in the microcontroller and/or data protection in an (its) EEPROM are still possible.

Since microcontrollers with SPI capability enjoy widespread use in the CAN sector, for example, they are therefore cost-effective mass-produced components. Accordingly, this "SuperChip", which can be produced completely using a high-voltage technology (in contrast to a completely new hyperchip, including its protective means and measures that can only be produced using low-voltage technology), need only be connected to conventional, cost-effective mass-produced components in order to achieve an overall result which is excellent in every respect.

Furthermore, however, the SPI interface of such a "Super-Chip" also allows very simple cooperation with microcontrollers which do not even have an SPI interface in the actual sense, by the simulation of an SPI interface internally in the controller by means of port software at conventional digital I/O ports. In such a case, the SPI interface of the "Super-Chip" therefore represents the always fixed destination protocol of the port programming of the microcontroller, as a result of which corresponding programming is easily standardized.

FIG. 7 shows the function block structure of a control unit created by implementation of the overall functionality 200 in accordance with FIG. 6 in a control unit in accordance with FIG. 5, if, at the same time, the microcontroller 21 and the input/output interface 163 or parts 1632, 1633 thereof are also provided with SPI interfaces.

This illustration reveals the function of the circuit 200 as barrier 1 with regard to interference from the CAN bus zone flowing in from the left. By virtue of the circuit 200, overvoltages, transients, radio-frequency interference, etc. can no longer reach or exceed the dashed line 301 between micro-controller 21 and circuit 200.

An analogous barrier 2 against interference streaming in from the application zone can also be formed by the interface 163 given an analogous design using a robust technology of its circuits 1631, 1632, 1633. As a result, interference flowing in from the right from the application zone, such as overvoltages, transients, radio-frequency interference, etc., also can no longer reach or exceed the dashed line 301 between microcontroller 21 and interface 163.

In this way, the connections of the sensitive microcontroller 21 to the bus and application zones are effectively screened from interference streaming in. This advantage opens up the possibility of using microcontrollers with circuit structure geometries tha t will also shrink even further in the future.

This screening function 301 is supplemented and supported by high electromagnetic compatibility of a correspondingly constructed control unit because, even in the case of extremely high complexity of the application, there are only a few critical connecting lines, acting as antenna loops of irradiated and radiated interference, on the highly clocked microcontroller. A complex case is already provided in the example of FIG. 7, namely a microcontroller with two independent SPI interfaces 208.1 and 208.2, separate SPI buses 201.1 and 201.2 for bus and wake-up control and the interface 163. In most cases, however, a microcontroller with just one SPI interface 208 will suffice, so that the two SPI interfaces 208.1 and 208.2 will then merge as indicated and the two buses 201.1 and 201.2 will also become one bus 201, as is illustrated, moreover, in FIG. 8. Since this results in space being gained for an EMC-conforming configuration of the conductor track reaching between microcontroller and environment on a corresponding printed circuit board of a control unit, in this respect, too, the circuit 200 also affords a potential for cost reductions extending even to minimization of the screening outlay for a corresponding unit.

Furthermore, optional connecting paths 29.2 and 172 between the CAN transceiver 100/100' and the microcontroller 21 as well as corresponding ports of the latter for SR and TEST/SRC/SWM signals (as explained in connection with FIG. 4), in parallel with the SPI path 201.1, are shown by dashed lines in FIG. 7. Although these paths can be implemented in the SPI path 201.1, a connection of this type may be advantageous for particular purposes—for example in operating modes of the circuit for the purpose of bus fault analysis, as explained further below. However, they are not absolutely necessary in the context of the SPI architecture employed here for a control unit.

A general case is also illustrated here with regard to the connection between microcontroller 21 and interface 162. The interface submodule 1631 with output stage 1631.2 and signal acquisition 1631.3 communicates with the microcontroller 21, by analogy with FIG. 5, conventionally via the I/O port of the controller by dint of the multiple path 22. The interface submodule 1632 with output stage 1632.2 and signal acquisition 1632.3 has SPI capability and communicates with the micro-controller 21 via the SPI path 201.2 between the SPI port 208.2 of the microcontroller and the SPI port 1632.6 of the interface submodule. The interface submodule 1633 with output stage 1632.2 and signal acquisition 1632.3 has SPI capability and communicates with the microcontroller 21 likewise via the SPI path 201.2 between the SPI port 208.2 of the microcontroller and its SPI port 1633.6. In addition, it also has an ENABLE input 1633.4, which can be driven by the microcontroller via a path 210, and an ERROR output 1633.5, which is connected to the microcontroller 21 via the path 211 and from which an fault message can be communicated past the SPI path to the microcontroller. This module can, consequently, be selectively inhibited via its EN input. Moreover, the modules 1632 and 1633 additionally have inputs 1632.1 and 1633.1, respectively, which correspond to the input 163.1 in FIG. 5. The INIF signal explained above can be fed to these inputs via the path 168 from the watchdog function 166 in the circuit 200, in order to block the outputs of these modules 1632 and 1633 in the event of a reset of a micro-controller 21 for a specific short period of time.

In FIG. 7, moreover, it is indicated that, within the scope of the invention, a non-volatile memory 35'—corresponding to the non-volatile memory 35 in FIG. 5—may also be co-integrated in the circuit 200. It may be designed as an EEPROM, for example.

This memory may serve, on the one hand, for storing the configuration of the circuit 200, it being possible for such storage to be effected both autonomously within the functionality of the circuit 200 or from the microcontroller 21 via the path 201.1. On the other hand, initialization data for the microcontroller and/or the overall control unit, for example relating to the relevant configuration of the interface 163, can also be stored in this non-volatile memory. A further possibility for the use of such a memory 35' consists in the storage of fault states on CAN_H and/or CAN_L in the SLEEP mode. Furthermore, the states of the storage cells 127L and 127H of a reception function 120' expanded for bus quality and/or bus fault analysis purposes, in accordance with FIG. 29, can also be written to such a memory. 64 to 512 bytes are sufficient, in practice, for the abovementioned purposes.

The co-integration of this EEPROM may be expedient not just from economic reasons, but also because it allows the number of components and connections on the printed circuit board of a corresponding control unit to be held to an absolute minimum, and the microcontroller 21 with all the elements required in each control unit to be accommodated in an extremely small space. This in turn results in EMC and cost advantages.

Figure 8:
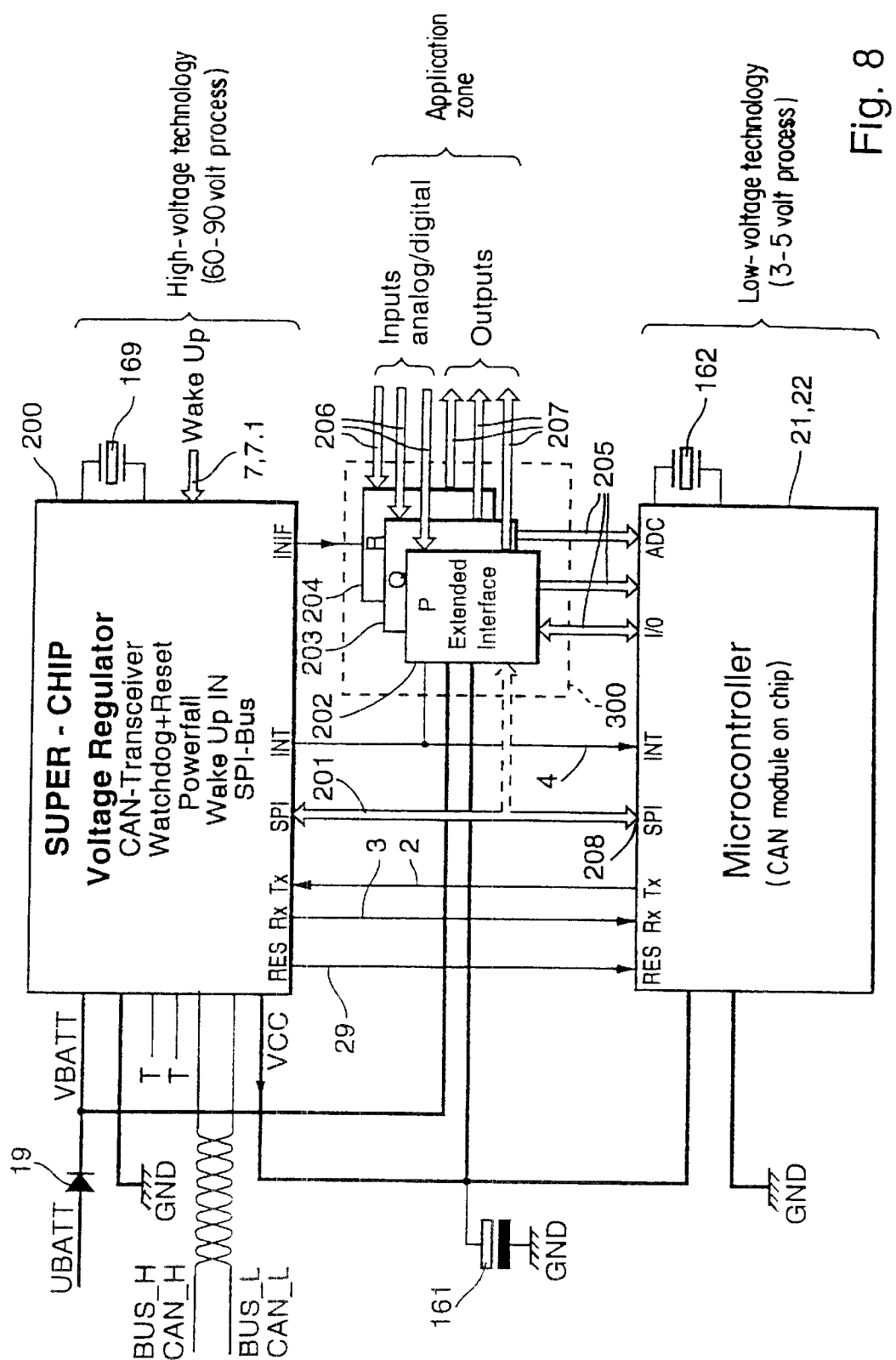
FIG. 8 shows a schematic illustration of a universal system architecture for control units with bus capability.

FIG. 8 finally illustrates how the semiconductor circuit 200 can be utilized as the basis for a novel control unit technology. In the context of this technology, such units can be designed, as it were, as uniform "mainframes", which comprise the circuit 200 and the microcontroller 21 with CAN module 22 or universally designed SMD soldering surfaces for different microcontrollers used for a variety of applications. An extension zone 300 is provided therein in which only "Extended Interfaces" 202, 203, 204 to be developed in an application-specific manner need be inserted and connected. These then correspond to the interface submodules 1631 to 1633 in FIG. 7.

These extended interfaces likewise may (but do not have to) have SPI capability, as indicated by dashed lines. With regard to their inputs 206 and outputs 207, they can be separately protected in a manner depending on the application. As a result, protective path via the "mainframe" with microcontroller is either no longer required or is additionally effective. In this way, it is possible to achieve high insulation of the microcontroller 21 from the application zone.

It is striking that the mainframe, which unites two different semiconductor technologies (for example 60–90 volt process for the "Super-Chip", 3–5 volt process for the microcontroller), can be prefabricated at one location and then be equipped at another location with extended interfaces—if necessary with the appropriate microcontroller as well—in an application-specific manner, and programmed. This architecture affords not only logistical advantages, but also the possibility for recycling at the repair level.

Figure 1:
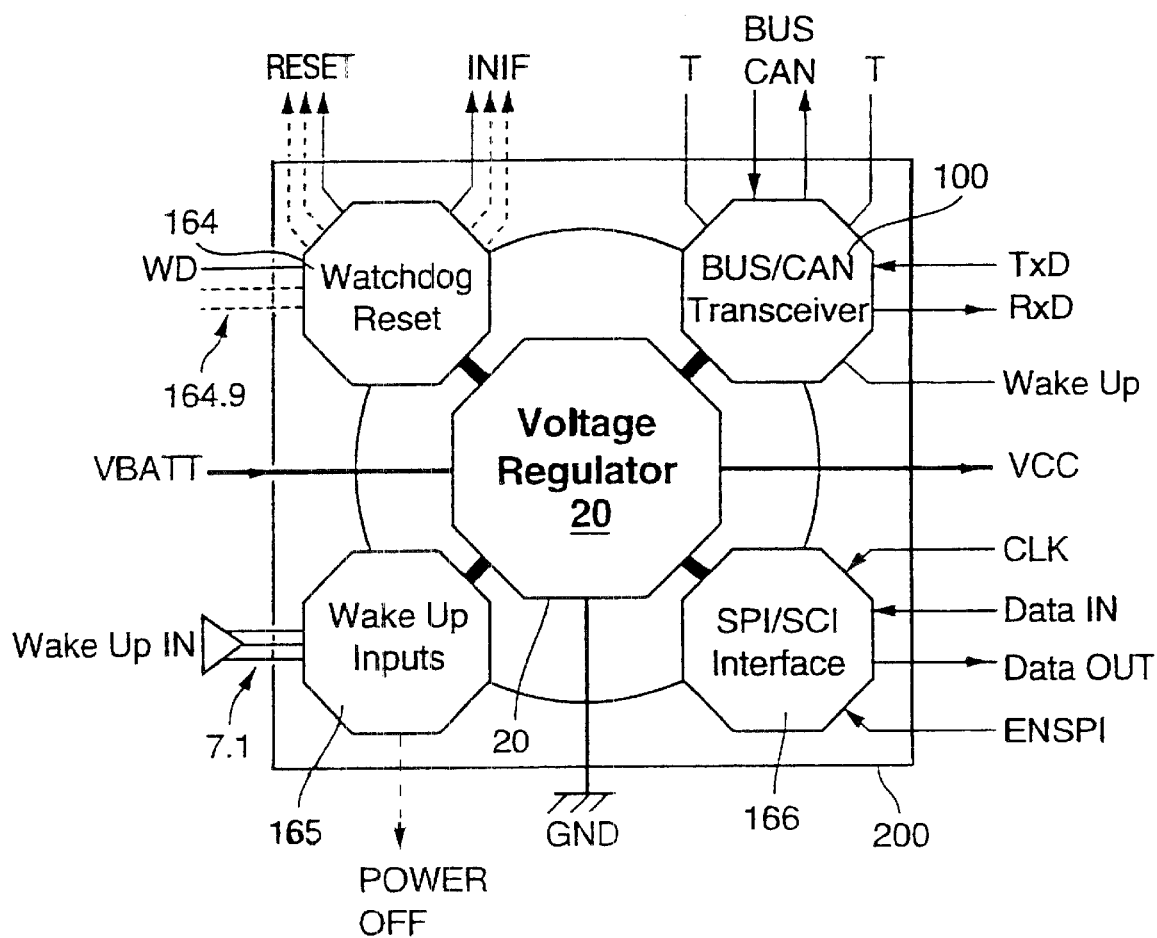
FIG. 1 shows a first illustration of the functional allocation of a semiconductor substrate, which integrates further functions together with a voltage regulation function.

FIG. 1 schematically illustrates the functional allocation of a semiconductor substrate by a semiconductor circuit 200 that has been described thus far, as well as its most important connections to the peripherals.

A semiconductor circuit 200, taken as a basis in this case, has a watchdog function 164 which is optionally provided with a plurality of RESET outputs and a plurality of INIF outputs for the control of a plurality of microcontrollers or microcomputers. It is furthermore illustrated that the SPI interface function 166 implemented in the description and in the drawing is to be understood only as an example with no restriction. Within the scope of the invention, therefore, the interface function 166 may also be replaced by an SCI (Serial Communication Interface) interface function, by which a UART or RS 232 interface, for example may also be understood in the broadest sense. It is furthermore symbolized in FIG. 1 that under the two-wire bus, within the scope of the invention, the CAN bus that is taken as a basis for the purpose of explanation is not intended to constitute any restriction at all with regard to a two-wire bus.

In application zones subjected to particularly high stresses due to temperature change and/or corrosive attack, it is necessary to energize switching contacts as sensors with a certain minimum current. Investigations have shown that currents of 10–50 mA are indeed sufficient for this. Only currents of such magnitude ensure a reliable contact capability of the switching path even over a long time. Hitherto, this current requirement has severely limited the number of such switches in systems having only a limited energy reserve.

Further reaching investigations have shown that the maintenance of a reliable switching capability is already ensured by such current flows lasting only a short period of time.

In the description of the control units in accordance with FIG. 5 and FIG. 7, it was assumed that in the case of a requirement of such switches which are interrogated by the wake-up expander 165 at inputs 7.1, the corresponding power supply of the switches is effected in the application zone. On the one hand, this necessitates a corresponding outlay outside the control unit. On the other hand, a clearly non-trivial current requirement of the relevant control function thereby appears merely shifted into the application zone—in favor of a small current consumption of the control unit. If such a switch is supplied with current from the wake-up expander 165, this would change nothing regarding the system current balance because the corresponding current requirement must then be covered from $I_{IC3}$.

Figure 9:
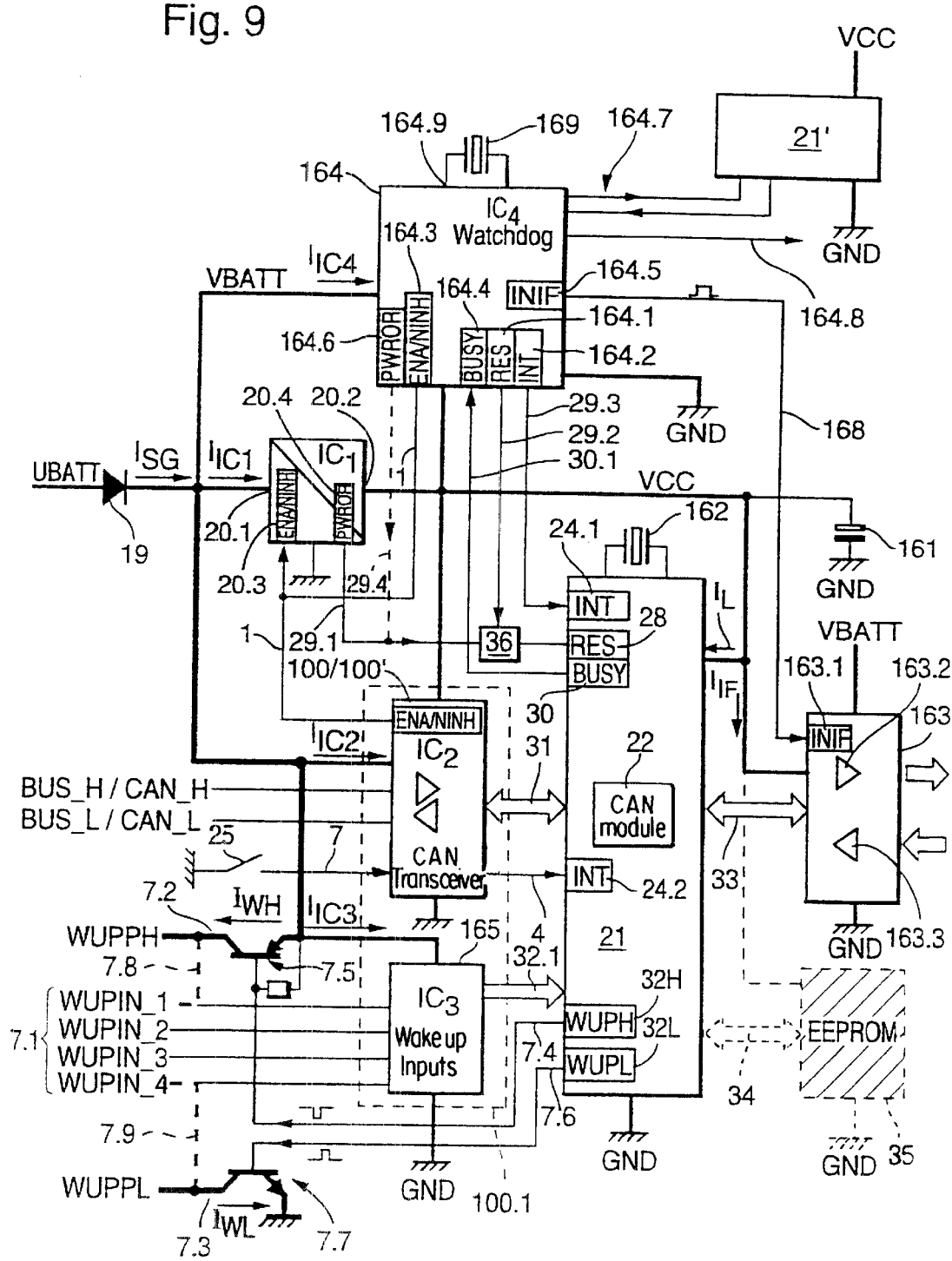
FIG. 9 shows a schematic block diagram of a control unit according to FIG. 5 a power-saving wake-up function.

The overall outlay and current consumption arising for corresponding switch interrogations can be reduced considerably however, if the control unit is developed in accordance with FIG. 5 (or analogously in accordance with FIG. 7), as illustrated in FIG. 9. The microcontroller 21 has an output 32H for outputting a Wake-Up Power H signal (WUPPH) and in this case, by way of example, a further corresponding output 32L for out-putting a Wake-Up Power L signal (WUPPL).

The output 32H is connected via a line 7.4 to the control input of an electronic switch or of a controllable current source 7.5 (shown by way of example, as a bipolar PNP transistor), whose emitter is supplied by the potential VBATT of the regulator input 20.1. The output (collector) of the controllable switch or of the current source (of the PNP transistor) 7.5 constitutes the supply busbar for all of the wake-up switches to be energized with respect to ground GND in the application zone.

The output 32L is connected via a line 7.6 to the control input of a corresponding electronic switch or of a controllable current source 7.7 (shown by way of example, as a bipolar NPN transistor), whose emitter is supplied from ground GND. The output (collector) of the controllable switch or of the controllable current source (of the PNP transistor) 7.7 constitutes the supply busbar for all of the wake-up switches to be energized with respect to the feeding voltage UBATT in the application zone.

The inputs 7.1 WUPIN__1 to WUPIN__4 correspond to the wake-up inputs in FIG. 5. The wake-up signals from the wake-up sensors in the application zone, which sensors are supplied with voltage from the busbar 7.2 and 7.3, are fed back via the said inputs. The dashed connections 7.8 and 7.9 between the output WUPPH and the wake-up input WUPIN__1, and between the output WUPPL and the wake-up input WUPIN__4, are intended to symbolize that in the abovementioned case of a current source 7.5 and 7.7, respectively, the busbar 7.2 may also be directly electrically connected (that is, identical) to the input WUPIN__1 from 7.1; and the busbar 7.3 may also be directly electrically connected (identical) to the input WUPIN__4 from 7.1. All that is then required in each case is that the (single) electrical connecting line (WUPIN__1, WUPIN__4, respectively) to the relevant sensor connected to ground GND or UBATT in the application zone in that the wake-up current $I_{WH}$ and $I_{WL}$, respectively, is then taken up, depending on the sensor status, either by the relevant sensor or the internal input circuitry of the wake-up expander 165 for the inputs WUPIN__1 and WUPIN__4, respectively. In the latter case, it is used there for the purpose of evaluation.

Figure 11:
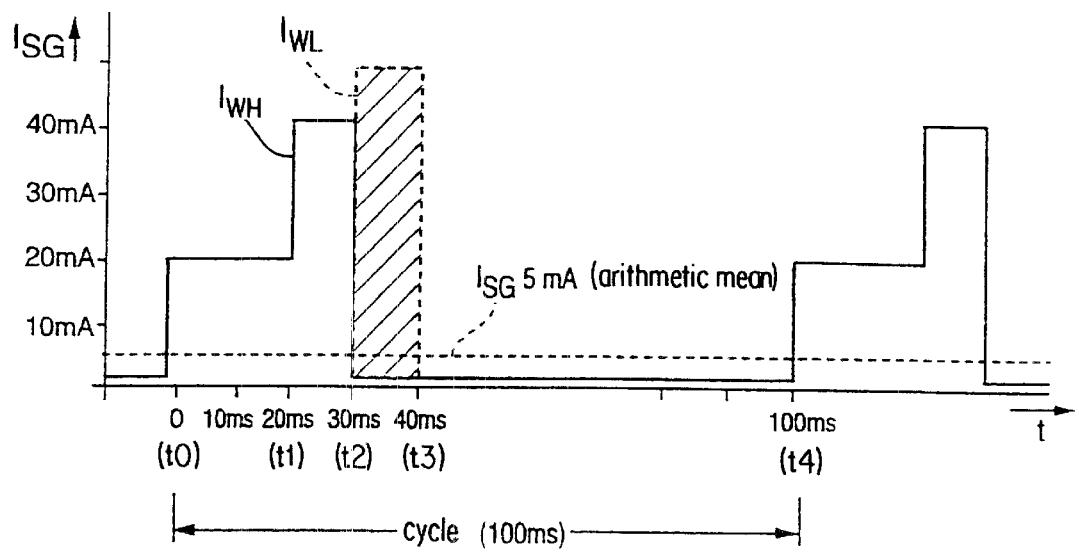
FIG. 11 is a diagram which illustrates the current consumption of a control unit according to FIG. 9 in wake-up standby.

The power-saving function of this control unit becomes evident from FIG. 11, in which (by way of example only for the output 32H (WUPPH) and the High-Side switch 7.5 for wake-up switches to be energized externally with respect to ground GND) the current consumption is plotted against time in wake-up standby. In this case, the current and time values entered are to be understood as being by way of example.

In accordance with the description relating to FIG. 5, item 3. therein, the application software of the microcontroller holds the latter in a low-power or shutdown mode. This effects the outputting of STB="H" for maintenance of the power supply via the circuit 100/100' and the regulator 20, which is consequently switched-on. The control unit takes up only approximately 2 mA in this state. After in each case 100 ms ($t_0$ to $t_4$), the watchdog circuit 164 effects initialization of the microcontroller 21, which is concluded after approximately 20 ms ($t_0$ to $t_1$). The current consumption is approximately 20 mA during these 20 ms.

Unlike in the case according to FIG. 5, following its initialization by the watchdog 164, the microcontroller outputs, at its output 32H, a pulse lasting 10 ms to the controllable switch—transistor 7.5, whose output—collector supplies, during the time interval $t_2$-$t_1$, sensors to be energized in the application zone with the current $I_{WH}$ from the supply busbar VBATT with respect to ground GND. In this way, it is only during this short time interval that a (relatively high) overall current consumption of in this case 40 mA (by way of example) is produced. Shortly before the instant $t_2$, the microcontroller reads in from the wake-up expander 165 all the wake-up events which have been detected and pre-processed in a predetermined manner (for example checked in terms of their edge, etc.). At the instant $t_2$ it returns to its low-power or shutdown mode, in which the overall current consumption of the control unit consequently decreases to approximately 2 mA again. After a further 70 ms, the cycle is repeated anew at the instant $t_4$.

Disregarding a correspondingly clocked sensor supply with respect to UBATT via a corresponding output 32L and electronic switch 7.7, an average total current consumption of only approximately 5 mA is produced in this way, including, therefore, the abovementioned minimal energization of one or two external wake-up switches with higher currents.

The clocking of a corresponding electronic switch 7.7 for the energization with respect to ground GND of wake-up sensors from the supply busbar UBATT, can be effected in a manner staggered over time. Owing to the relatively long initialization time ($t_1$-$t_0$) of 20 ms, corresponding complementary energization is then expediently added immediately at $t_2$. Such an energization $I_{WL}$ is indicated by dashes in the time interval $t_3$-$t_2$. In this way, minimal initialization energy losses then arise.

Independently, however, the clock rate of the clock control signals, which are output at the outputs 32H and 32L of the microcontroller, for the energization of high-side and low-side wake-up sensors may also be different. A correspondingly lower repetition rate (e.g. of the wake-up pulses $I_{WL}$ for corresponding high-side wake-up sensors) can reduce the current consumption allotted to the latter.

In principle, this type of power saving is also possible, without restriction, with a control unit according to FIG. 7, which contains a semiconductor circuit 200 having the functional scope and architecture according to FIG. 6. For this purpose, it is necessary only to allocate corresponding control outputs 32H and/or 32L (WUPPH and/or WUPPL) on the microcontroller 21 and to control them by software.

For the sake of completeness, it is pointed out that the switching elements 7.5 and 7.7 do not necessarily have to be switches in the actual sense which switch the potential VBATT and the potential GND, respectively, through to their outputs 7.2 and to 7.3, respectively. Rather these elements may equally well be output drivers of current sources which provide the currents $I_{WH}$ and $I_{WL}$ as impressed (maximum) currents in the event of driving on the part of the microcontroller.

By contrast, the developments of the semiconductor circuit 200 described below permit not only an even further power saving in the case of application-specific wake-up standby of a control unit, but also, in addition, an increase in the wake-up signal-to-noise ratio and also in the data protection in the event of a disturbance internally in the control unit (that is to say not having an effect via the bus). They relate, on the one hand, to the wake-up expander 165 from FIGS. 5 and 6 and, on the other hand, to the voltage regulator 20 from FIG. 6 and are included in the function block diagram in FIG. 16.

Figure 10:
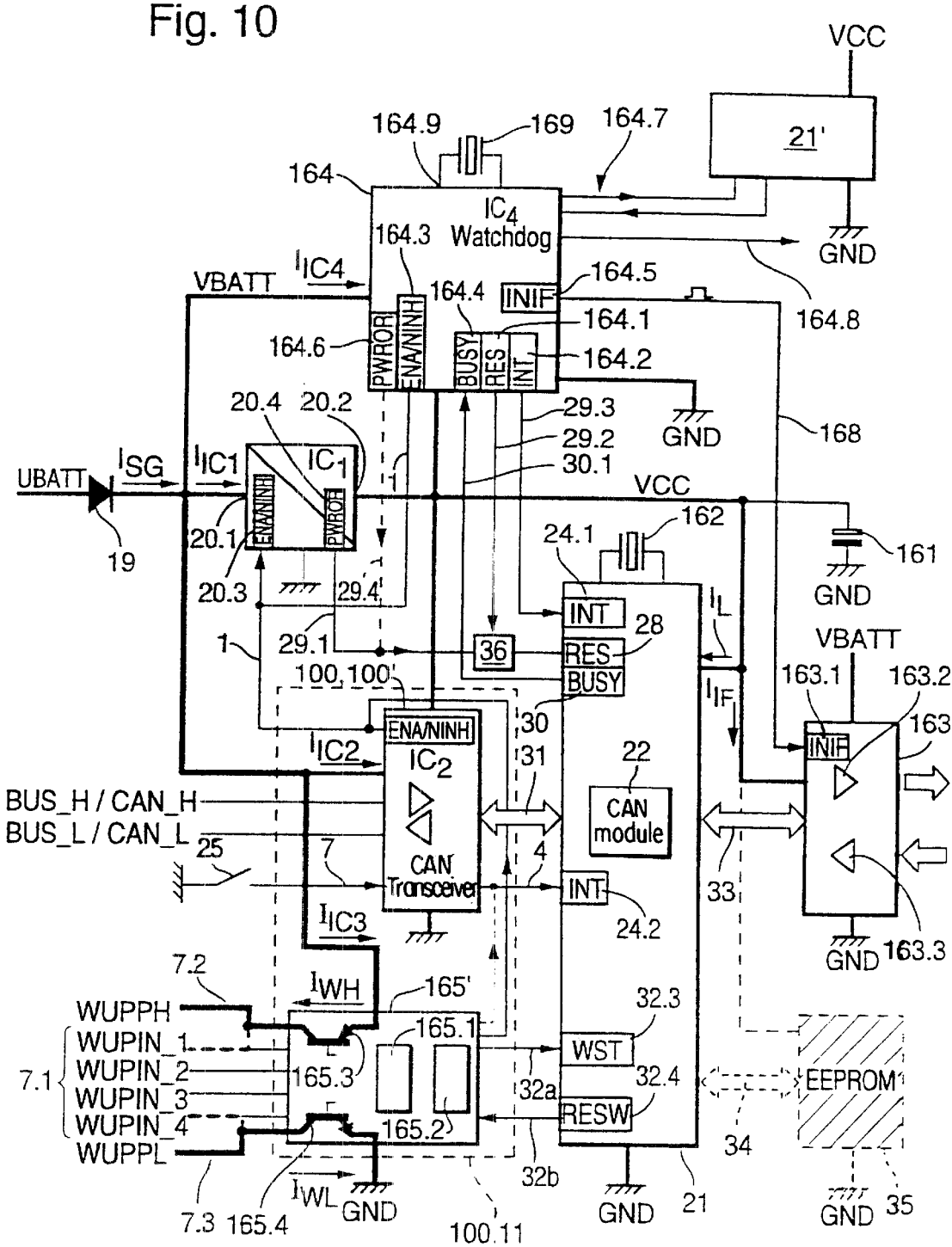
FIG. 10 shows a schematic block diagram of a control unit which enables an even greater power saving in wake-up standby.

Taking FIGS. 5 and 9 as a departure point, the first development of the circuit 200 can be understood from the function block diagram of the likewise discrete analogue of a corresponding control unit in accordance with FIG. 10.

Accordingly, a wake-up expander 165' is provided which integrally comprises a controllable electronic switch and/or a controllable current source 165.3 and/or 165.4. The former and/or latter therefore replace the corresponding external one(s) 7.5 and 7.7, respectively, in FIG. 9. The elements 165.3 and 165.4 can thus switch, for example, the potential VBATT and the potential GND, respectively, through to their outputs 7.2 and 7.3, respectively. These elements may equally well provide the currents $I_{WH}$ and $I_{WL}$ as impressed (maximum) currents in the event of corresponding driving in the wake-up expander.

Here, too, the inputs 7.1 WUPIN__1 to WUPIN__4 correspond to the wake-up inputs in FIG. 5. The wake-up signals from the wake-up sensors in the application zone, which sensors are supplied with voltage from the busbar 7.2 and 7.3, are fed back via the said inputs. The dashed connections 7.8 and 7.9 between the output WUPPH and the wake-up input WUPIN__1 and between the output WUPPL and the wake-up input WUPIN__4 are intended to symbolize in this case, too, that in the abovementioned case of a current source 165.3 and 165.4, respectively, the busbar 7.2 may equally well be directly electrically connected (that is, identical) to the input WUPIN__1 from 7.1, and the busbar 7.3 may also equally well be directly electrically connected, (identical) to the input WUPIN__4 from 7.1. All that is then required in each case is that the (single) electrical connecting line WUPIN__1 and WUPIN__4, to the relevant sensor connected to ground GND or UBATT in the application zone in that the wake-up current $I_{WH}$ and $I_{WL}$, respectively, is then taken up, depending on the sensor status, either by the relevant sensor or the internal input circuitry of the wake-up expander 165' for the inputs WUPIN__1 and WUPIN__4, and, in the latter case, is used there for the purpose of evaluation. In such a case, the dashed connection may then also equally well be provided inside the expander 165', if the feedback function from the application zone as described in connection with FIG. 9 is dispensed with and a circuit 200 according to the invention is intended to be of small design and, for this purpose, must have the smallest possible number of external terminals.

The expander 165' comprises at least one timer 165.1 and at least one resettable storage cell and/or register 165.2. The said timer may be an autonomous timer or one controlled by the watchdog circuit 164 (a corresponding operative connection 164a between 164 and 165' is omitted here, but is indicated in FIG. 16). The expander 165' (IC3) and the transceiver 100/100' (IC2) are combined to form a more complex circuit function 100.11.

Figure 12:
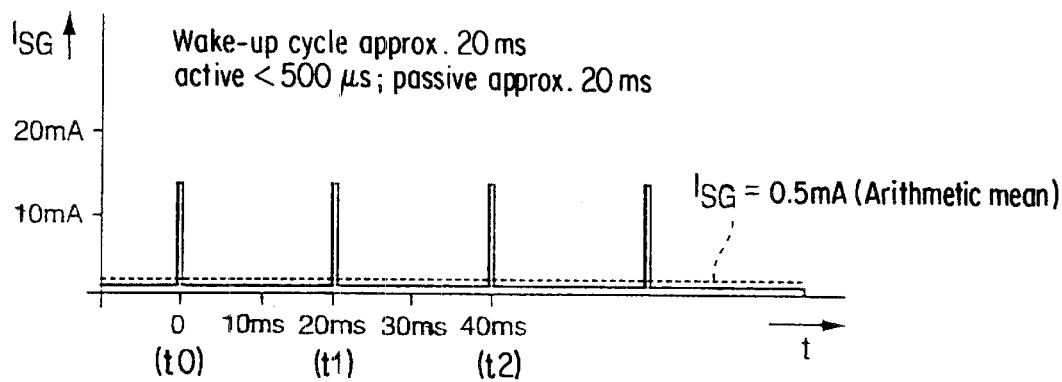
FIG. 12 is a diagram which shows the current consumption of a control unit with a wake-up expander which is constructed for autonomous wake-up detection without support from the microcontroller.
Figure 13:
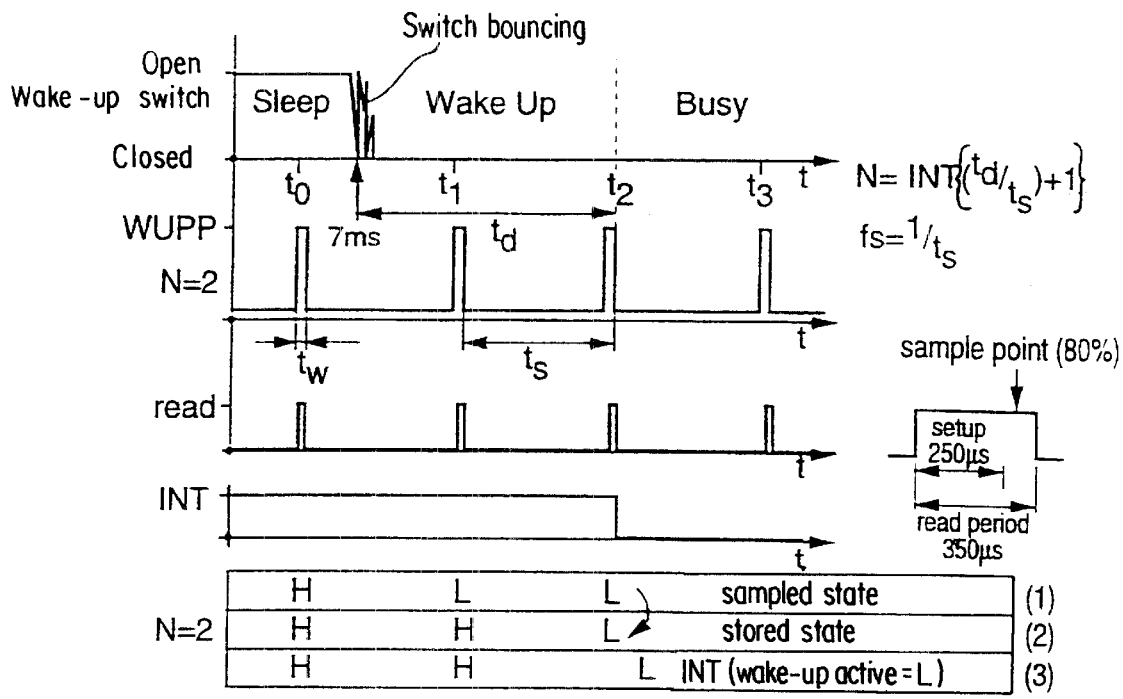
FIG. 13 shows a timing diagram for illustrating an exemplary wake-up operation with an increased signal-to-noise ratio.

The state of the storage cell and/or of the said storage register 165.2 can be transferred via a path 32a to a wake-up status input 32.3 (WST) of the microcontroller 21. This storage cell and/or this register can be reset via a connection 32b from a reset output 32.4 of the microcontroller 21. On the output side, the expander 165' may be connected to the ENA/NINH inputs 20.3 and 164.3 of the regulator 20 and watchdog 164. Furthermore, on the output side, it may additionally be combined with the output 4 of the transceiver 100/100'. Operation in application-specific wake-up standby in accordance with FIGS. 12 and 13 is possible by virtue of these measures.

Under the control of its timer 165.1, the expander 165' connects at least one of the outputs 7.2 and 7.3 to VBATT or ground GND, respectively, by corresponding driving of at least one of its controllable switches 165.3 and 165.4, so that the respective sensing currents $I_{WH}$ and $I_{WL}$ can flow. Currents of the order of magnitude of 10–20 mA are assumed in the present example. In this case, this connection takes place at a time interval of 20 ms. The switching time is only 500 µs, for example. The operating current taken up by a corresponding control unit in application-specific wake-up standby via the expander 165' may thus amount to only 0.5 mA, as an arithmetic mean.

In accordance with FIG. 13, the evaluation can take place as follows. At an interval of 20 ms, a switch which, for example, is connected to the input WUPIN__1 of 7.1 and switches with respect to ground GND is interrogated by the signal WUPPH, for example via a resistor (not shown) which is arranged in the current path between 165.3 and the said switch. The signal WUPPH in this case consists of very short pulses having the duration $t_w$. Above the signal WUPPH, the voltage across the said switch is illustrated in an initially open state and then closed state (with respect to ground GND). Approximately 7 ms after the instant $t_0$, the switch changes from the open to the closed state and, as a result, the potential at the wake-up input WUPIN__1 changes from "H" to "L". The logic arrangement of the expander 165' identifies the state "L" at the input WUPIN__1 as active wake-up signal. Indicated under the signal WUPPH is the reading clock pulse which loads the storage cell and/or the storage register 165.2, and underneath that, by way of example, is the interrupt signal INT output by the expander 165' via the line 4 to the microcontroller 21. Reading pulses having a length of 350 µs are taken as a basis here, for example, the actual state acquisition in each case taking place after a set-up time of approximately 250 µs has elapsed.

Line (1) of the table underneath shows the state that is respectively read in at instants $t_0$, $t_1$, $t_2$, etc., line (2) shows a state of the storage cell and/or in the storage register 165.2 that is assumed at these times, and line (3) shows the logic level of the INT signal that is derived therefrom. The transition "H-L" in this case represents the wake-up-triggering interrupt signal edge, by way of example.

It is evident that at the instant $t_0$, the state "H" is read and, at the instant $t_1$, the new state "L" is read (for the first time) and is read into a first of N storage cells. In this case, by way of example, only after the second reading-in of the state "L" at the instant $t_2$ is this state written to the N-th (last) storage cell in the storage register 165.2 and, consequently, is the INT state "H" then replaced by the state "L".

The time $t_d$ that elapses between the state change at the wake-up input WUPIN__1 and the evaluation in the store can thus be chosen to be longer than the sampling period $t_s$. This increases the signal-to-noise ratio with respect to spurious signals on account of switch bouncing or due to electromagnetic interference in comparison with simple sampling. For this purpose, it is also possible for the state "L" not to be stored until after reading-in has been effected more than twice in succession, provided that the associated delay is tolerable. The degree of this "digital filtering" is defined by the number N, which specifies how often a wake-up event has to be successively acquired until the truth state of the acquisition is written to the store for the purpose of evaluation, where N=INTEGER $((t_d/t_s)+1)$. In that case, then, the sampling period $t_s$ influences this number. The said sampling period can either be derived by a timer 165.1 of the expander 165' or—if the latter is supplied with a time or frequency reference signal via 164a from the watchdog function 164—be temporally interlinked with a period of an internal reference signal of the watchdog function 164. The invention includes the case where the abovementioned number N is programmable at least for one of the WUPIN inputs 7.1, in accordance with specific application requirements.

It has been shown in practice, however, that even for N=1 (direct sampling), a suitable selection of the acquisition instant within the reading time of in this case 350 µs, for example, can optimize the signal-to-noise ratio, with the result that filtering by verification of a repeatedly identical, new reading result is not necessary in many applications.

It is evident that this development enables a power saving to be achieved hand in hand with high interference immunity.

This is because, while the wake-up expander 165 according to FIG. 5 is used only for wake-up signals which arise as long as a switch-on signal is applied to the voltage regulation by the transceiver 100/100' (for example, in the STANDBY mode of the transceiver 100/100'), in this case wake-up signals are always sampled without the participation of the microcontroller 21. Therefore, the microcontroller can be entirely deenergized during the sampling and the identification of such signals.

Nevertheless, the microcontroller can, of course, also remain energized as in FIG. 5, in a low-power or shutdown mode from which it must be transferred, for the purpose of reading in at its input 32.3 a wake-up signal, which, as described above, has already been digitally prefiltered, if appropriate, by means of the watchdog function 164 into a ready-to-operate status that suffices for this purpose.

The number N and also remaining functional characteristics of the wake-up expander 165' (for example, response polarity, response type (level sensitive/edge sensitive), hysteresis and trigger threshold, with regard to one or all of the inputs 7.1) can be provided, in this case as well, such that they are selectable and, in this respect, also programmable. In this case, special programming means of the semiconductor circuit 200 can enable one-time programming—the latter optionally also being able to be initiated via the interface 166 and the serial communications path 201, 201'1 to the at least one microcontroller 21, 21'.

Figure 14:
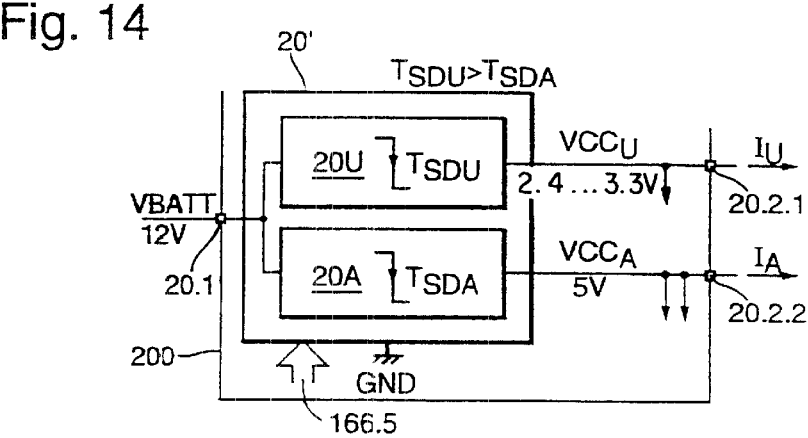
FIG. 14 is a block diagram of a voltage regulator which, for the purpose of a further power saving and increased data protection, comprises two regulating paths which are independent of one another on the output side.

FIG. 14 shows, in a functional block diagram, a modification of the regulator 20 to form a more complex regulator unit 20', which comprises two separate regulators 20U and 20A. The regulator 20U generates a first operating voltage $VCC_U$ for the microcontroller 21 at a first chip output terminal 20.2.1 from the potential VBATT at the chip input terminal 20.1. It may preferably be designed for a smaller maximum output current $I_{Umax}$ of 20 . . . 50 mA, for example.

The regulator 20A generates a second operating voltage $VCC_A$ for at least all the remaining logic circuits of the relevant control unit at a second chip output terminal 20.2.2 from VBATT. It is preferably designed for a larger maximum output current $I_{Amax}$ of 100 . . . 300 mA, for example.

The regulators 20U and 20A are independent of one another both in terms of circuitry and in terms of function. However, they can be switched off and on under electronic control jointly or in functional operative connection. In this case, it may be provided that the regulator 20U is the first to switch on and the last to switch off. This regulator is preferably designed as a linear regulator. The regulator 20A may be designed as a linear regulator or as a switched-mode regulator, as explained further below. Such a switched-mode regulator 20A can derive the feeding power ($VCC_A \times I_A$) required by the application from a higher supply potential VBATT, without the semiconductor circuit 200 as a whole thereby being thermally overloaded and the energy efficiency o f a corresponding control unit being noticeably impaired.

Figure 15:
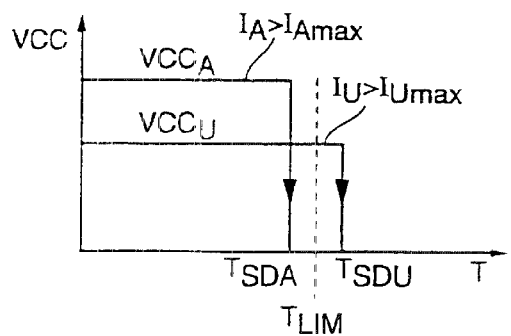
FIG. 15 is a diagram which illustrates the temperature-dependent switch-off behavior of the two voltage regulators according to FIG. 14 which are thermally coupled to one another via the chip substrate.

In the event of overloading caused by a defect, the invention furthermore provides for the two regulators to be switched off in a supervised and thermally controlled manner in accordance with FIG. 15. In this illustration, it is already assumed, in accordance with the technological development, that the logic supply voltage $VCC_U$ for the microcontroller is lower than the logic supply voltage $VCC_A$ of the remaining electronics of the relevant control unit. It is evident that the switch-off temperature $T_{SDU}$ for the supply voltage $VCC_U$ is rated higher than the switch-off temperature $T_{SDA}$ for the supply voltage $VCC_A$. In the face of the thermal coupling of the two regulators via the chip substrate, the invention ensures that the regulator 20U can be switched off under all possible overload states of the regulator 20A, but not below a defined limit temperature $T_{LIM}$.

This measure ensures that even in the event of interference occurring in the application zone and overloading the power supply, the microcontroller 21 can still be supplied with voltage $VCC_U$ for a short time from the terminal 20.2.1, in order that the microcontroller can still store present data in its EEPROM. This protection concept is based, therefore, on the fact that a current flow which is excessively high due to a defect is in each case caused by components which are supplied by the voltage regulator 20A. This is permissible because an excessively high current flow $I_U$ of the microcontroller(s) results from a malfunction thereof which, as a rule, always involves the inability to store data any longer.

Figure 16:
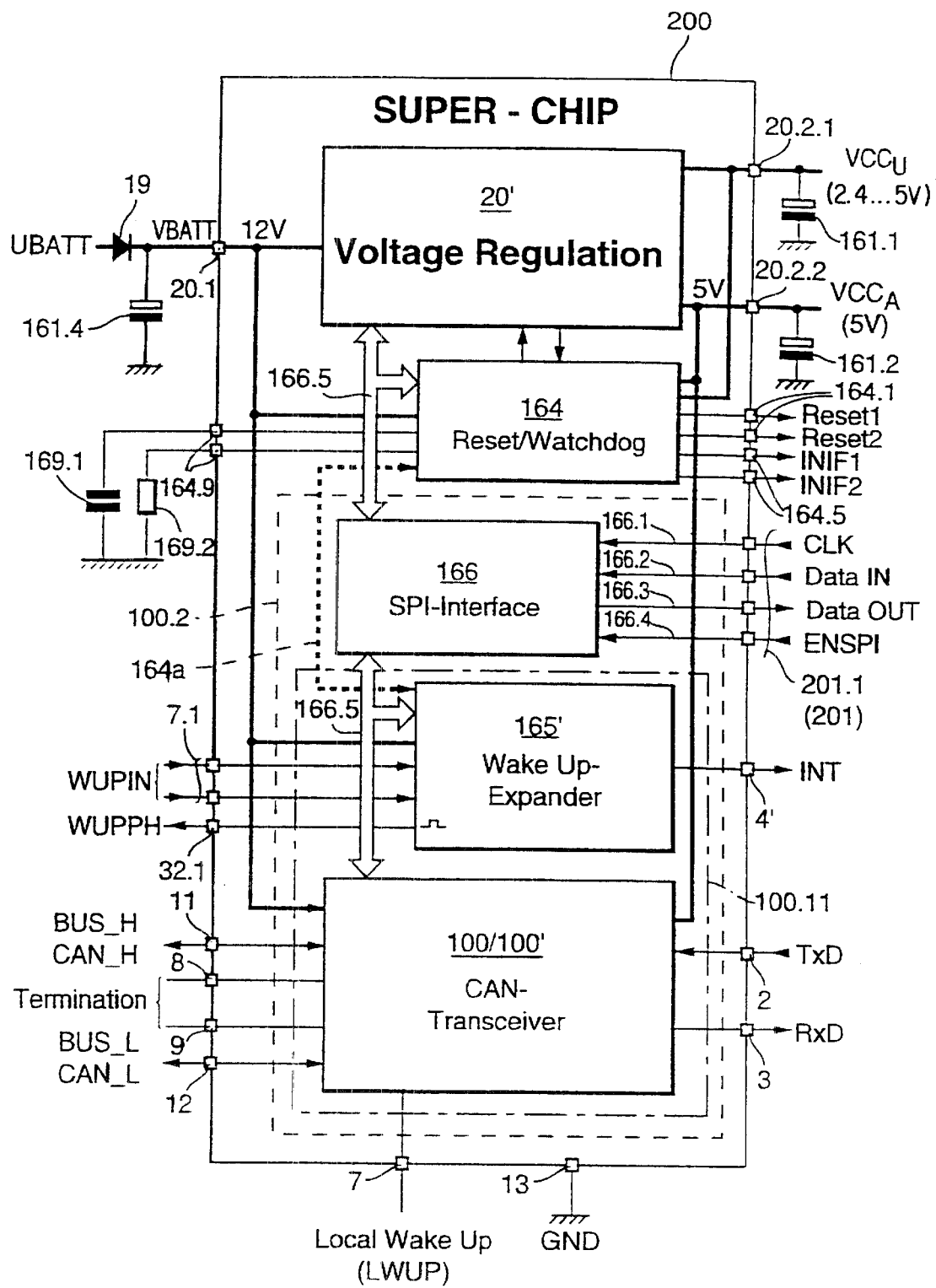
FIG. 16 is a schematic block diagram of a circuit 200 which implements the developed wake-up function according to FIGS. 10, 12 and 13 and enables increased power saving and data protection as a result of its supply output being split in accordance with FIGS. 14 and 15.

The function block diagram according to FIG. 16 illustrates an example of a semiconductor circuit 200 which is expanded by the abovementioned developments. Without restricting the generality, its wake-up expander 165' in this case has only one output 7.2 for outputting WUPPH current pulses. The reset and watchdog function 164 is expanded to the extent that it can reset at least two microcontrollers independently of one another and, in this context, can also output two different inhibit signals INIF1 and INIF2. The connection 164a symbolizes an operative connection between the reset/watchdog function 164 and the wake-up expander 1651 in respect of a time-determining signal, as already mentioned above. In this case, too, the wake-up expander 165' and the bus transceiver 100/100' are combined to form a more complex circuit function 100.11.

The voltage monitoring function (mentioned above in connection with FIG. 3) of the block 110 of the transceiver 100/100' is in this case, for example, realized in its entirety by the reset/watchdog function 164. However, this is not mandatory, not least because of the SPI architecture; depending on the degree to which the individual functions are resolved in a chip layout, the output voltages $VCC_U$ and $VCC_A$ can also equally well be monitored by a correspondingly expanded block 110 assigned to the transceiver 100/100', that is to say additionally as well, depending on the requirements.

Figure 17:
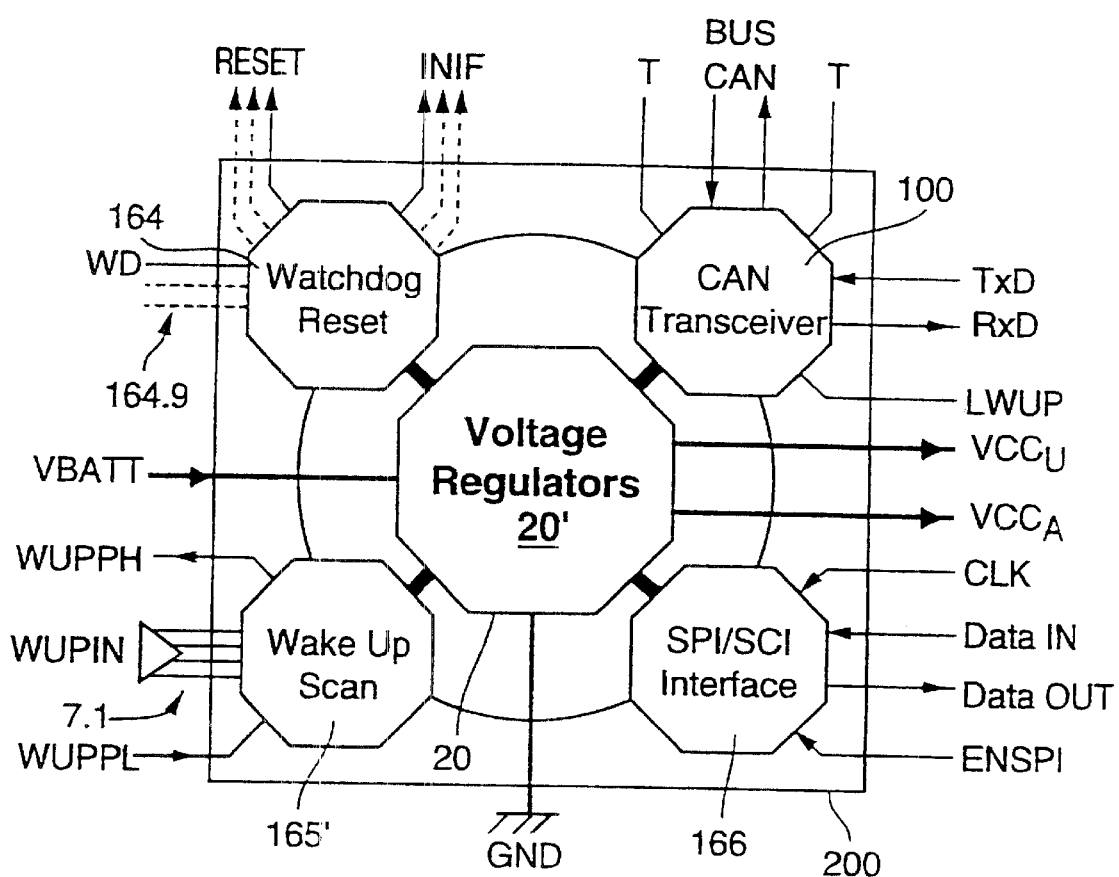
FIG. 17 shows a corresponding illustration of the functional allocation of a semiconductor substrate which integrates the functions according to FIG. 16 with at least two voltage regulators for external loads.
Figure 18:
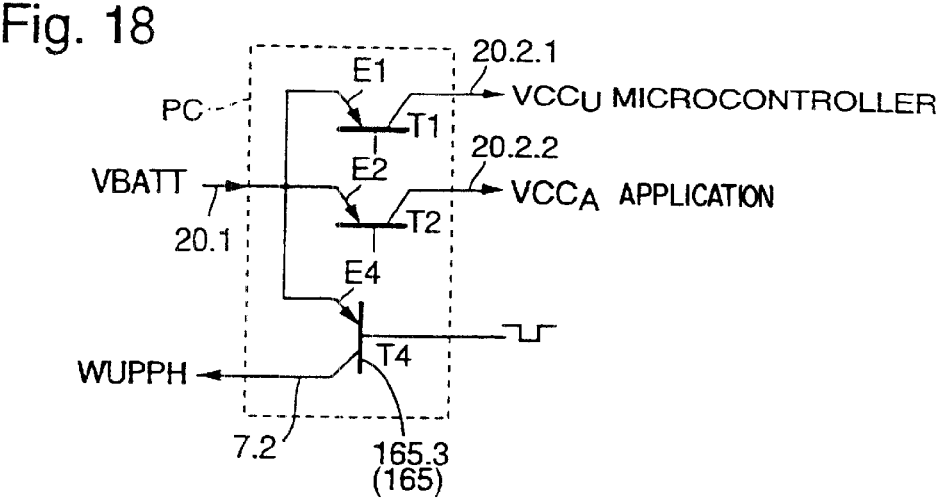
FIG. 18 shows current-carrying constituents of a power cell of uniform bipolar structure as part of the circuit 200 in FIG. 16.
Figure 19:
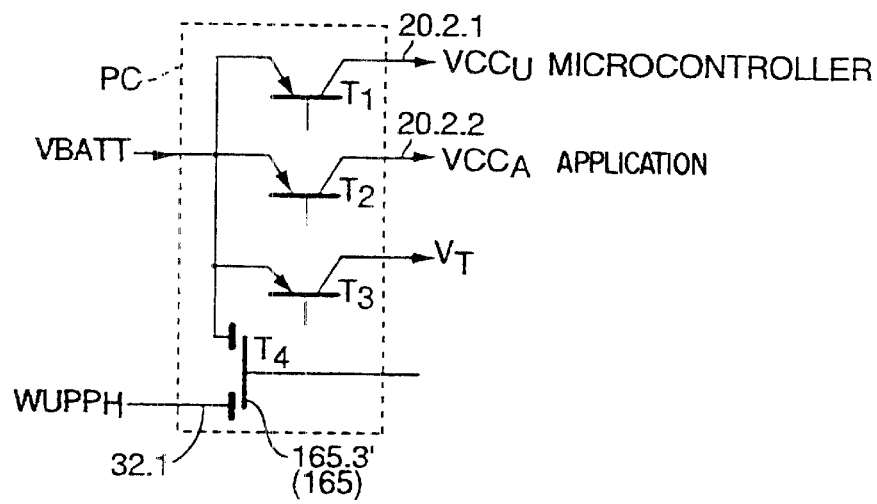
FIG. 19 shows current-carrying constituents of a power cell as part of the circuit 200 in FIG. 16 which comprises bipolar and field-effective active elements.
Figure 20:
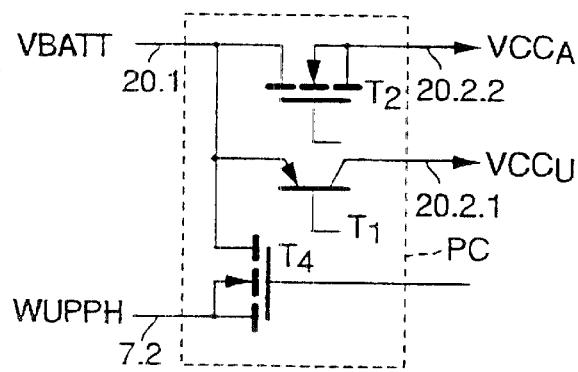
FIG. 20 show current-carrying constituents of a power cell, realizable in the context of high-voltage smart power technology.

FIG. 17 illustrates the corresponding functional allocation of a semiconductor substrate. It goes without saying that in the course of integration, individual functions may also be realized in parts in a cross-block manner. FIGS. 18–20 make this clear, by way of example.

Accordingly, in accordance with FIG. 18, it is possible to realize for example series pass transistors $T_1$ and $T_2$ as actuating element of the regulators 20U and 20A and also at least one controllable switch 165.3 of the wake-up expander 165' for outputting a WUPPH signal for the purpose of clocked energization of external wake-up sensors within a single power cell PC, which, from standpoints of robustness, is thermally optimized and, if appropriate, monitored as well.

The same applies correspondingly to reset, watchdog and timer functions with regard to topological optimization of a corresponding circuit.

Furthermore, according to FIG. 19 and FIG. 20, the active elements of the abovementioned power cell PC are not restricted to elements having an identically configured structure or of the same conduction type. Rather elements having a different structure and a different conduction type can be employed. For example, a FET structure may be used for the clocking switch 165.3' and bipolar structures for linear regulators, or bipolar and FET structures for linear regulators and/or switched-mode regulators mixed, etc.

Figure 21:
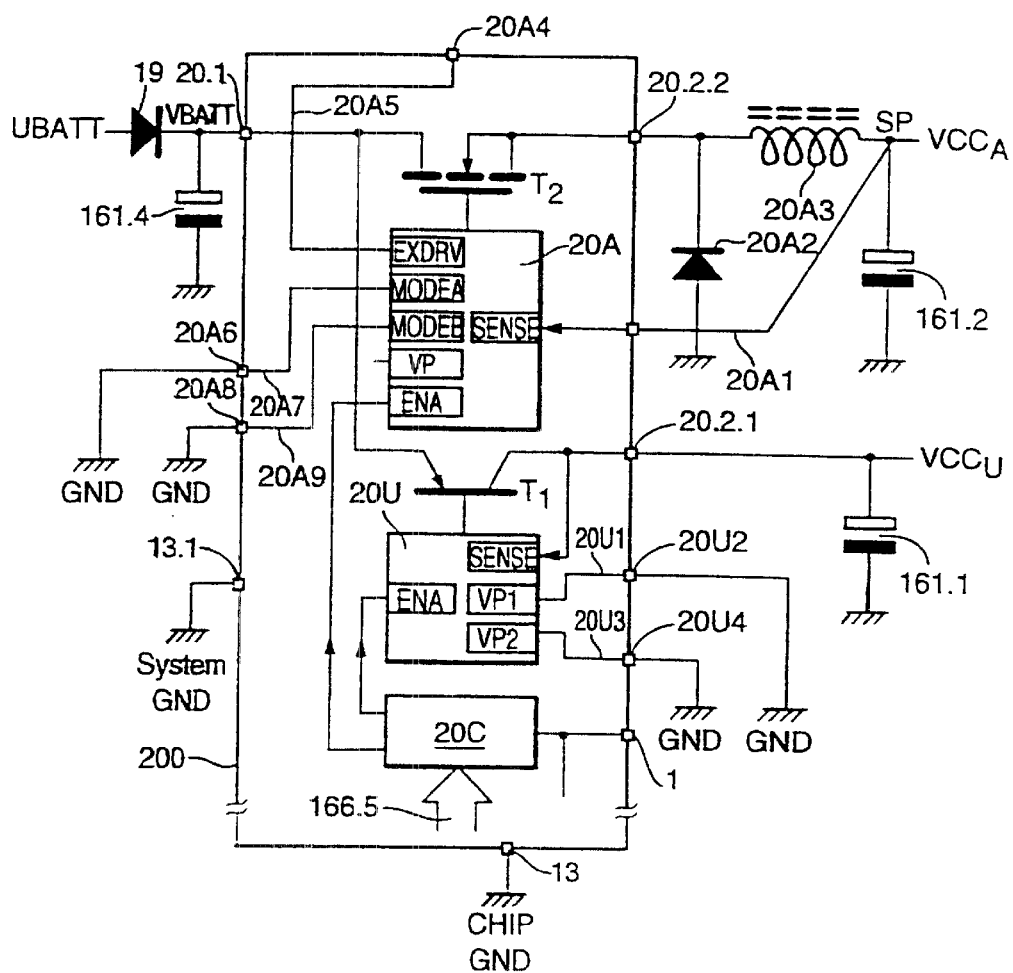
FIG. 21 shows the circuit diagram of a power-saving, low-interference and universal voltage regulation function for a particularly wide input voltage range.

In this context, as a further development detail, FIG. 21 shows the circuit diagram of a voltage regulating function 20' for a particularly universal applicability of the circuit 200. Over and above already known chip terminals, the semiconductor circuit 200 has for this purpose even further chip terminals 20A4, 20A6, 20A8, 20A10, 20A11, 20U2 and 20U4. Moreover, a special (SPI-resolved) terminal 1 may be provided.

In this case, by way of example, the regulator 20U, including a preferably bipolar series pass transistor $T_1$, for the supply voltage $VCC_U$ is designed as a linear regulator, and the regulator 20A, comprising a field-effect transistor $T_2$, for the supply voltage $VCC_A$ is designed as a programmable multi-mode regulator. Without restricting the generality, the regulator 20U can equally well be realized as a switched-mode regulator. This case is not set forth in the figures and described here since everything that is explained below with regard to the regulator 20A as a switched-mode regulator can, of course, also be applied to a corresponding regulator 20U designed as a switched-mode regulator. A design as a switched-mode regulator may be advantageous for control units with more than two microcontrollers or additional controller-external logic functions having a considerable current requirement, or if control units—optionally configured in this way—are intended to be able to be operated within a particularly wide input voltage range. A linear regulator is used for supplying one or only two microcontrollers, however, especially as its advantage of a lack of interfering induction enables particularly cost-effective unit designs. The regulators 20A and 20U also comprise the known bias elements for potential-conforming driving of the transistors $T_1$ and $T_2$, in other words, for voltage dividers, offset source(s) or charge pump(s), for example.

Furthermore, a switch-on and switch-off control 20C is provided for the regulators 20U and 20A, which control acts in each case separately on ENA inputs of both regulators and can be addressed via the SPI bus 166.5, by way of example. In the present case, this switch-off control provides, by way of example, a Pin signal ENA/NINH at an additional terminal 1 of the circuit 200.

Programming and external circuitry of the regulator 20A for its operation as a step-down switched-mode regulator (Buck Switch Mode) are shown, by way of example. For this purpose, at its terminal 20.2.2, the circuit is externally connected up to a freewheeling diode 20A2, which is connected with respect to ground GND, and a storage inductor 20A3, which, on the output side, acts on the storage capacitor 161.2 on which the voltage $VCC_A$ can be tapped. This configuration of a step-down regulator proves to be superior when a corresponding control unit is exposed to extreme temperature fluctuations, since such a regulator effects the least possible loading on the storage capacitor 161.2. This low degree of loading ensures the longest possible service life of a corresponding capacitor. Since, in this case, suitable (electrolytic) capacitors can—depending on the loading—achieve a considerably shorter MTBF than the circuit according to the invention or the microcontroller, such a regulator ultimately maximizes the availability of a control unit having the circuit according to the invention.

The controllable path of the regulating transistor, in this case a MOSFET transistor, by way of example, is connected on-chip between the terminals 24.2.2 and 20.1 of the circuit 200, which transistor is driven, on the gate side, by the regulator 20A which has an input SENSE for acquiring $VCC_A$ as actual quantity.

This switch-on and switch-off control can integrally afford the time-varying switching on and off (already mentioned above) of the regulators 20U and 20A and, if appropriate, also the delayed thermal disconnection of the regulator 20U. The ENA/NINH signal which can be picked off at the terminal 1 in an SPI-resolved manner may be of interest for further power-saving control purposes in the case of the abovementioned control of the regulators 20U and 20A externally (in the application zone).

In the present case, the regulator 20A has an output EXDRV for alternative driving of an external regulating transistor $T_2'$, an input MODEA for the programming of its mode with internal or external regulating transistor, an input MODEB for the programming of its mode as linear or switched-mode regulator, and an already known input ENA for switching off and switching on the regulator.

The regulator 20U likewise has an input SENSE for acquiring $VCC_U$ as an actual quantity and, furthermore, two inputs VP1 and VP2 for the programming of its output voltage $VCC_U$.

The output EXTRV of the regulator 20A is connected via a path 20A5 to the circuit terminal 20A4, its input MODEA is connected via a path 20A7 to the programming terminal 20A6, its input MODEB is connected via a path 20A9 to the programming terminal 20A8, and its input VP is connected to the programming terminal 20A10.

The input VP1 of the regulator 20U is connected via a path 20A11 to the programming terminal 20U2, its input VP2 is connected via a path 20U3 to the programming terminal 20U4, and its SENSE input is connected to a terminal 20A11 of the circuit 200. The latter is connected externally of the circuit 200, to the junction point between the storage inductor 20A3 and the storage capacitor 161.2.

By way of example in the present case, the external connection of the terminal 20A6 to ground GND sets the mode of the regulator 20A with internal regulating transistor $T_2$, and the external connection of the terminal 20A8 to ground GND sets its operating mode as switched-mode regulator.

In contrast to this, in the case of the regulator 20U, for example, an external connection of both terminals 20U2 and 20U4 to ground GND sets the regulator's output voltage to $VCC_U$=5 volts. The connection of the terminal 20U2 to VBATT and of the terminal 20U4 to ground GND, on the other hand, sets it to 3.3 volts, while the connection of the terminal 20U2 to ground GND and of the terminal 20U4 to VBATT sets it to 3.0 volts. Finally, the connection of both terminals 20U2 and 20U4 to VBATT sets it to 2.8 or 2.4 volts (these voltage values are to be understood as being by way of example).

Figure 22:
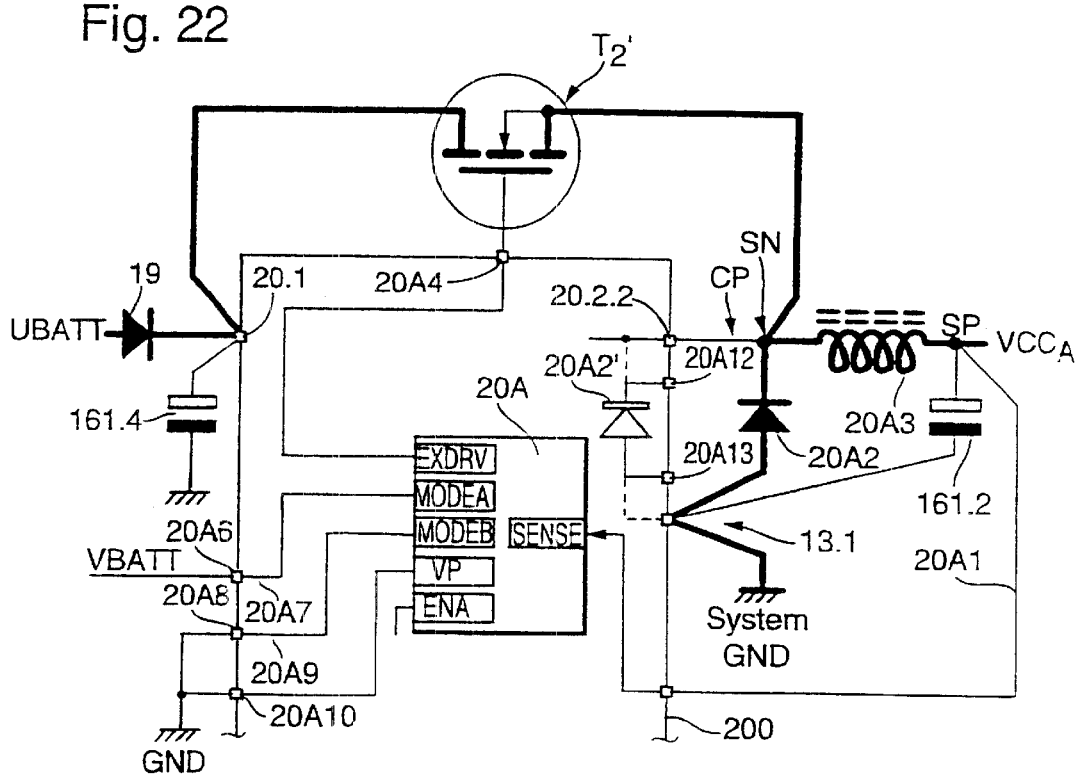
FIG. 22 shows a circuit-diagram extract for one alternative from a total of four possible modes of operation of the voltage regulation function according to FIG. 21.

A corresponding programmability of the output voltage $VCC_A$ for the regulator 20A, moreover, is indicated in FIG. 22.

This development allows the semiconductor circuit 200 to be adapted in a simple manner to different supply requirements of different microcontrollers 21 of a wide variety of different technologies. The scope of the invention equally well encompasses not only such external Pin programming of the circuit but also correspondingly non-volatile, one-time fixed programming of the circuit, for example by means of a fuse or anti-fuse programming. If appropriate, the latter can even be enabled by special internal means by means of a corresponding programming unit via the SPI path (Hidden One Time Pin Programming HOTPP).

The programming terminals may also be understood in this sense: What may be involved in this case are normal, externally connectable circuit terminals, or externally inaccessible programming terminals on the semiconductor wafer for e.g. bond programming, or fuse or anti-fuse terminals.

FIG. 22 illustrates an example of further development details and the alternative external circuitry of the circuit 200 for switched mode with increased output current $I_A$ of the regulator 20A.

An alternative operating mode of the regulator 20A is illustrated for this purpose, namely with an external regulating transistor $T_2'$. For this operating mode, the terminal 20A6 is connected to the potential VBATT and the terminal 20A8 to ground GND. The connection of 20A8 likewise to VBATT would, on the other hand, set the operating mode of the regulator 20A in conjunction with T2' as a linear regulator.

Furthermore, a programming input 20A10 for the output voltage $VCC_A$ is indicated here on the circuit 200. This input is connected to ground GND in order, for example, to set $VCC_A$ fixedly to 3.3 volts, while a connection to the potential VBATT or to the terminal 20.2.1 having the (temporally leading) output voltage $VCC_U$ can set the output voltage $VCC_A$ to 5 volts.

It is furthermore indicated that a freewheeling diode 20A2' can likewise be constructed on the semiconductor substrate of the circuit 200 for step-down switched-mode regulation, it being possible for this diode to be connected to two further terminals 20A12 and 20A13 of the circuit 200. It may alternatively (or if appropriate, additionally) be connected by at least one of its two electrodes in a circuit-internal manner or on-chip to the chip terminal 20.2.2 and/or to a specific chip terminal 13.1 System GND, which is capable of carrying current. In the relevant control unit, it is connected to the central ground (application ground) thereof, as explained below in connection with FIG. 28 and FIG. 30.

Whether and which of such circuit-internal or on-chip (multiple) connections are constructed in the individual case depends on the realization technology of the semiconductor circuit. In any event, corresponding connections in interaction with the topological and thermal chip design as well as the arrangement of the individual terminals on the semiconductor circuit 200 serve to achieve the highest possible suppression of switching spikes in the reception block 120 or 120' of the transceiver 100, 100' under operating conditions outside its SLEEP mode.

Preferably, an internal freewheeling diode 20A2' may be provided for use for lower output currents up to 100 mA, for example. Furthermore, at least one terminal pin, which is connected to one of the two electrodes of the internal freewheeling diode 20A2', can be arranged immediately next to the terminal pin 20.2.2 or 13.1 of the circuit. This arrangement enables a connection of the internal freewheeling diode by means of a suitable design of the printed circuit board of a corresponding control unit, in the course of mounting the circuit, with the least possible leakage inductance. For example, an internal, insulated freewheeling diode 20A2' can also be connected in this way by providing a common continuous terminal path on the printed circuit board side, both for the terminal pins 20.2.2 and 20A12 and for the terminal pins 13.1 and 20A6. For operation with an external freewheeling diode 20A2, on the other hand, merely at least one such terminal path is to be resolved into two individual such paths.

The scope of the invention further includes replacing an internal freewheeling diode, for example for lower output currents, by a controlled electronic freewheeling switch, for instance a power MOS transistor, which is correspondingly turned on during the current thrust phases by the regulator 20A (controlled synchronous valve). Such a development (not shown) minimizes the thermal power loss which arises in the semiconductor chip and is to be dissipated therefrom.

Using the operational configuration with an external switching transistor, FIG. 22 furthermore illustrates how a sufficiently high signal-to-noise ratio can be achieved in the reception block 120 or 120' of the transceiver 100/100' even with higher output currents. The storage capacitor 161.4 on the input side is in this case connected directly to the terminal pin of the chip terminal 20.1 of the circuit 200. A POWER FET which is operatively connected to the chip terminal 20A4 by its gate and to the storage capacitor 161.4 at 20.1 by its first switching path terminal feeds a supply node SN with its second switching path terminal.

The supply node SN is connected, on the one hand, to an electrode of the external freewheeling diode 20A2 and to the first terminal of the storage inductor 20A3 and, via a special path CP on the printed circuit board of the relevant control unit, to the terminal 20.2.2 of the semiconductor circuit 200. The storage capacitor 161.2 and the input SENSE of the regulator 20A (not shown) are connected to the second terminal of the storage inductor 20A3. The respective other terminals both of the freewheeling diode 10A2 and of the storage capacitor 161.2 are connected directly to the terminal 13.1 on the semiconductor circuit 200 and, at that same place, also to the central ground of the control unit (application ground) System GND.

It is evident that in this case switching spikes with high current are not routed via, but rather past, the chip substrate of the circuit 200 since the effective freewheeling diode 20A2 (in this case outside the semiconductor substrate) discharges the storage current of the inductor 20A3 from the node SN. This is the precondition for also being able to keep the electromagnetic interference loading of the semiconductor substrate low. It can be assisted by a suitable design of the printed circuit board of a corresponding control unit carrying the semiconductor circuit 200. In an advantageous manner, for example, the path CP and the node SN are topologically dimensioned or placed on the printed circuit board in such a way that the node SN (a) is spaced apart from the semiconductor circuit by a magnetic blocking surface and (b) lies on the printed circuit board in the region of the magnetic extinction line of the ampere flow at interfering frequency flowing around the circuit 200.

By using the circuit in such an EMC-optimized connection environment, however, it is possible not just to realize sufficient insulation of the reception block 120 or 120' of the transceiver 100, 100' with respect to interference of the switched-mode regulator. Rather, in this way, it is also possible to utilize the supply voltage $VCC_U$, which is obtained (by linear regulation) with very low interference, for a high functional signal-to-noise ratio of the microcontroller 21, without a relatively high filtering outlay, even when the said voltage is only 2.8 or 2.4 volts, for example.

Within the scope of the invention, such a multi-mode regulator comprises all the switching and bias means which are necessary for the alternative operating modes with internal and external regulating transistor as well as for the alternative operating modes thereof as linear or switched-mode regulator (for example, in order to deactivate the internal transistor $T_2$ in the case of operation with external transistor $T_2'$ (idle float), etc).

As a further development, such a multi-mode regulator may additionally comprise a controllable switch which can establish a short circuit between the circuit terminal 20A11 and the circuit terminal 20.2.2 in the case of operation of the transistor $T_2$ as linear regulator. This is of interest when the terminal 20A8 is intended to be utilized not as programming terminal, but rather for any desired changeover of the regulator 20A between linear and switched mode for only temporarily increased current outputting in the switched mode together with, if appropriate, a correspondingly reduced signal-to-noise ratio of the supply voltage $VCC_A$. This detail can advantageously be utilized in the control units with electrical actuators or other loads which have to be operated only occasionally with a high degree of simultaneity in a burst mode.

The invention is in no way restricted to the channel type of MOSFET switching transistor $T_2$ and/or $T_2'$ as illustrated in FIGS. 21 and 22. Rather, a respectively complementary channel type is also encompassed. Within the scope of the invention, at least the regulator 20A includes, if appropriate, necessary charge pump means.

The above-described architecture of the voltage regulation 20' enables not just a particularly wide input voltage range VBATT of, for example, 12 to 48 volts in on-board electrical networks of means of transport. Rather, it is also suitable for keeping the quiescent current requirement of a corresponding control unit to a minimum within a wide input voltage range.

This is possible because a suitable switched-mode regulator for an output current of 250 mA, for example, can now be designed for a quiescent current of at most 20 to 40 $\mu$A, given a total power loss of at most 300 mW for maximum output current.

Figure 23:
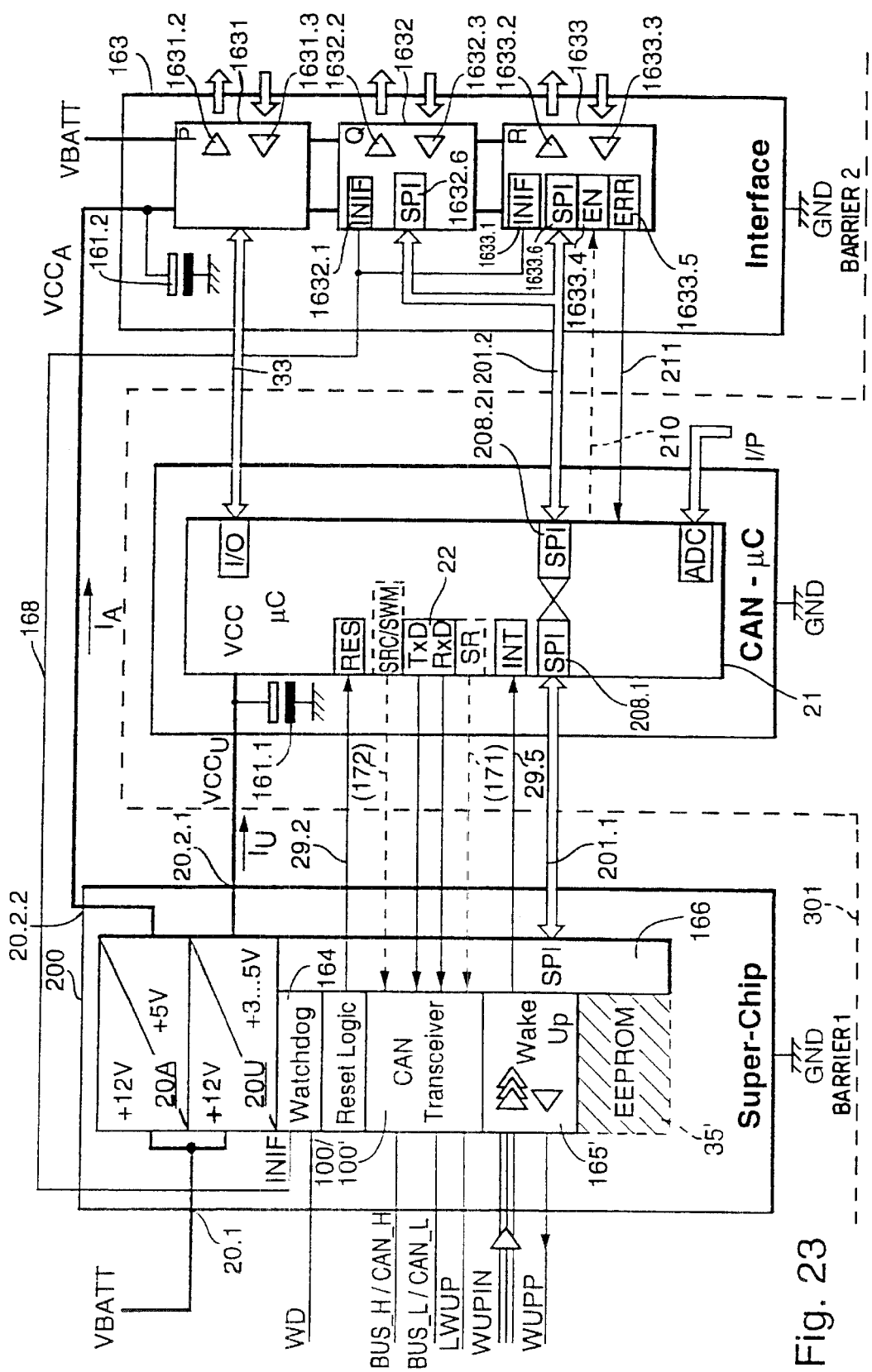
FIG. 23 shows a simplified function block diagram of a control unit which results from implementation of the semiconductor circuit according to FIG. 16 in the control unit according to FIG. 9.

It becomes immediately evident from FIG. 23 that the power supply of the microcontroller 21 from a special regulator 20U also inevitably substantially increases the reverse insulation of the microcontroller with respect to interference streaming in from the application zone.

In the context, the splitting of the storage capacitor 161 in FIGS. 2 and 5 into the two capacitors 161.1 and 161.2 also plays a crucial role. Moreover, it becomes plausible from this illustration that a well-proportioned division of the storage capacitor 161 into a part 161.2 that can be utilized only by the interface 163 and a part 161.1 that can be utilized only by the microcontroller 21, in conjunction with the above-described concept of a higher switch-off temperature $T_{SDU}$ of the regulator 20U, additionally serves to protect data in the event of interference.

In this respect, the development in the power supply path takes account not just of the foreseeable further development of the technologies of cooperative microcontrollers, namely in the direction of ever smaller supply voltages. Since logic levels of the signal voltages of corresponding controller also decrease as supply voltages decrease, the development in the power supply path also accommodates growing requirements with regard to ensuring sufficient signal-to-noise ratios in control units of future technologies.

Figure 24:
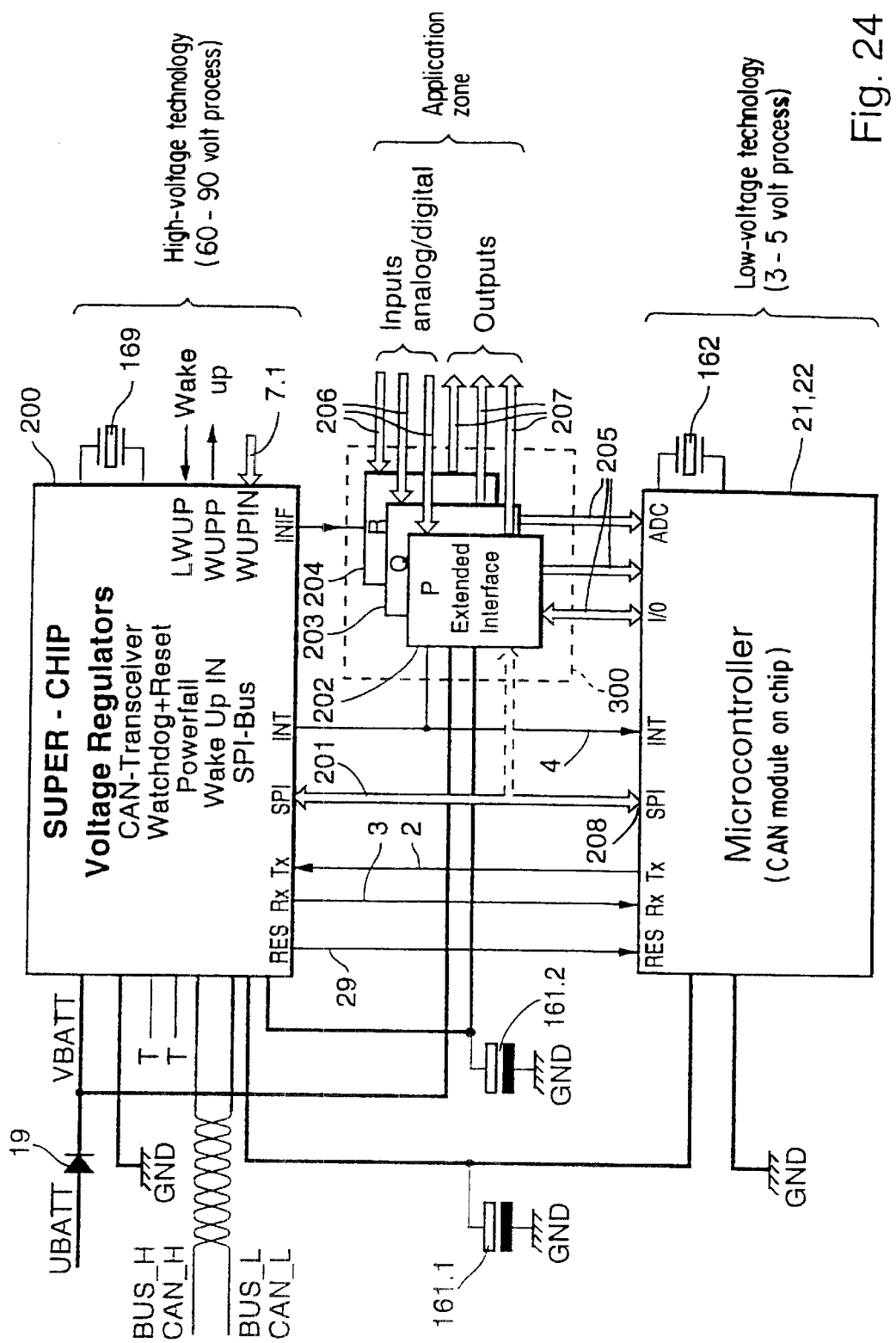
FIG. 24 shows a schematic illustration of a correspondingly developed, universal system architecture for control units with bus capability.

FIG. 24 illustrates that this advantage can be utilized in its entire scope without any restriction particularly in the context of the progressive control unit architecture according to FIG. 8.

The developments described below increase the functionality of the circuit given the presence of bus faults which adversely effect the communications capability of individual subscribers. These also include, in particular, ground faults which cause parasitic offset voltage drops between control units and a potential which is utilized as reference potential throughout the bus, and can lead to bus level shifts and consequent communications interference.

Figure 25:
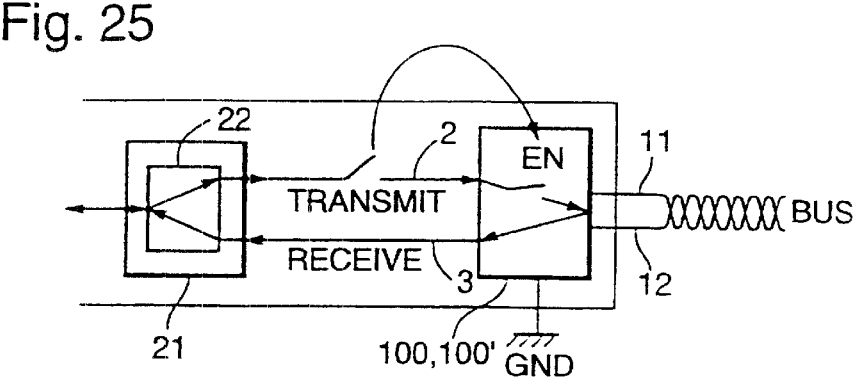
FIG. 25 shows a schematic illustration of an interruption of the transmission path for the purpose of keeping the bus free from response accesses of other bus subscribers, for example for the purpose of handling a ground fault of a bus subscriber.

With regard to the analytical handling of bus faults, it may be necessary, in accordance with FIG. 25, to interrupt the transmission path between microcontroller 21 or its protocol module 22 and the two bus core connections 11 and 12, in order to keep the bus free of undesirable or interfering transmission accesses. The operating mode RECEIVE ONLY already mentioned above can be used for this purpose. In this case, such disconnection is effected from the microcontroller e.g. via a control bit EN, which is transmitted via the path 6 to the transmission output stage 133. Only when the control bit EN has the prescribed logic level is the bus also available to transmission access by the transceiver, otherwise it is not available. FIG. 25 symbolically illustrates this detail.

Figure 26:
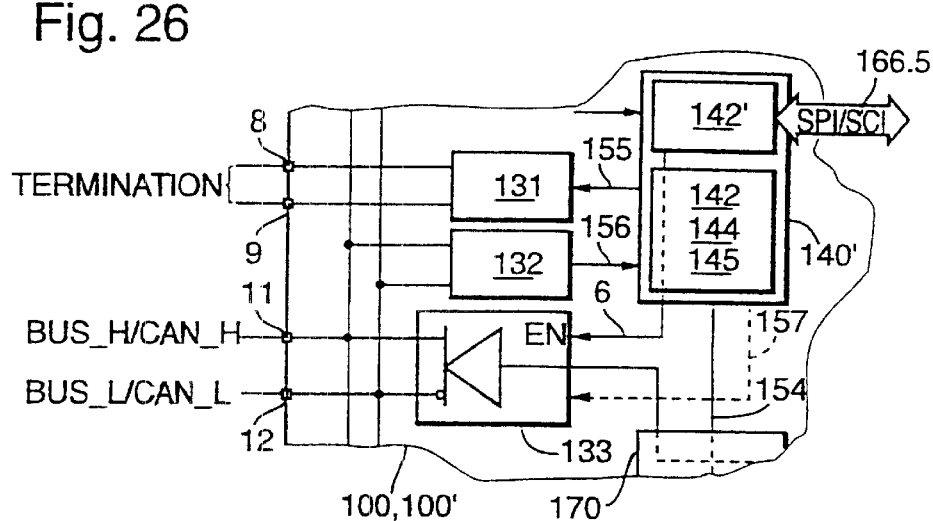
FIG. 26 is a partial block diagram of a semiconductor circuit 100, 100' for illustrating the software-based activation of such an interruption.

FIG. 26 shows how this detail is virtually concealed in the case of an SPI implementation, because in this case the microcontroller 21 communicates with the bus transceiver 100' via a bus medium (the SPI bus, for example), and, consequently, the EN bit is transmitted in a logged manner to the bus transceiver 100'. Ultimately, then, in this case an EN bit which enables or inhibits the transmission output stage 133 is generated by decoding, stored and/or overwritten in a control block 140' of a corresponding bus transceiver 100' or 100.11, which control block has SPI communications capability.

Figure 52:
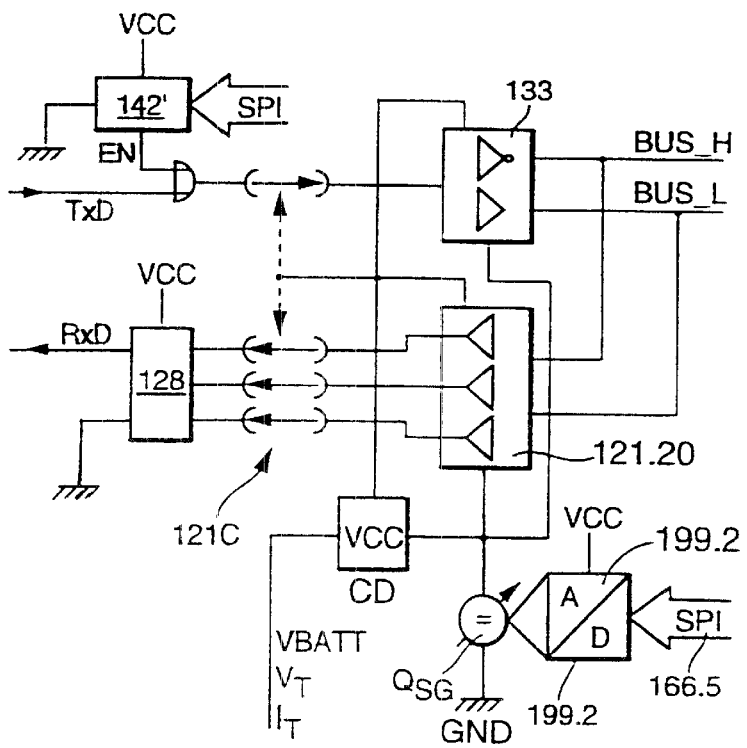
FIG. 52 shows a fourth block circuit diagram, reduced for particular application purposes, of additional means in accordance with FIG. 28 and FIG. 47, relating to the receiving end and the transmitting end of a bus transceiver.

In FIG. 26, therefore—as part of such an SPI implementation—the block 142—which sets the operating modes of the transceiver 100, 100' in accordance with an instruction from the microcontroller and which is illustrated there combined with blocks 144 and 145—is assigned at least one storage register 142', which holds received operating state information until it is overwritten by the reception of more up-to-date information. This store also at least comprises a cell for the abovementioned SPI-decoded EN signal for the output stage 133. The path 6 from this store to the transmission output stage 133 within the block 140' is indicated by a dashed line. The at least one store for the EN bit is also illustrated in FIG. 52. This bit, which activates the RECEIVER ONLY mode of the bus transceiver 100, 100', is important for the utilization of the developments described below by diagnostic software for acquiring and monitoring the bus levels.

FIG. 28 illustrates a function block diagram of a further development of the circuit 200 based on the abovementioned infrastructural detail. This development serves specifically to afford, throughout the network, the location, detection and handling of reference-ground potential faults in or at bus subscribers. A clarification is provided below of what is to be understood by this using the example of a motor vehicle:

All the control units of a motor vehicle are directly electrically connected to the vehicle body—as reference-ground potential surface—called vehicle ground. The vehicle ground serves, on the one hand, as distribution conductor for closing the operating circuits of loads and control units and, on the other hand, also as reference-ground potential surface for control or wire bus signals, as in the present case.

The operating current flow between control unit and vehicle ground unavoidably produces a certain small voltage drop, by which the ground potential internally in the units—System GND is raised above the vehicle ground. Depending on the design of this ground connection and the current flow therein, the consequence is that there are slightly differing ground potentials System GND internally in the units. As a direct consequence, although supply voltages which are regulated to a fixed value internally in the units may be exactly the same in all the control units, the potentials of the corresponding supply busbars internally in the units with respect to the vehicle ground are not, however. This also applies analogously, for example, to threshold values or dominant feeding potentials of reception discriminators in the receiving section 120, 120' or of line drivers 133L and 133H in a transmitting section 133 as in the present case as parts of the transceiver 100, 100'.

Figure 46:
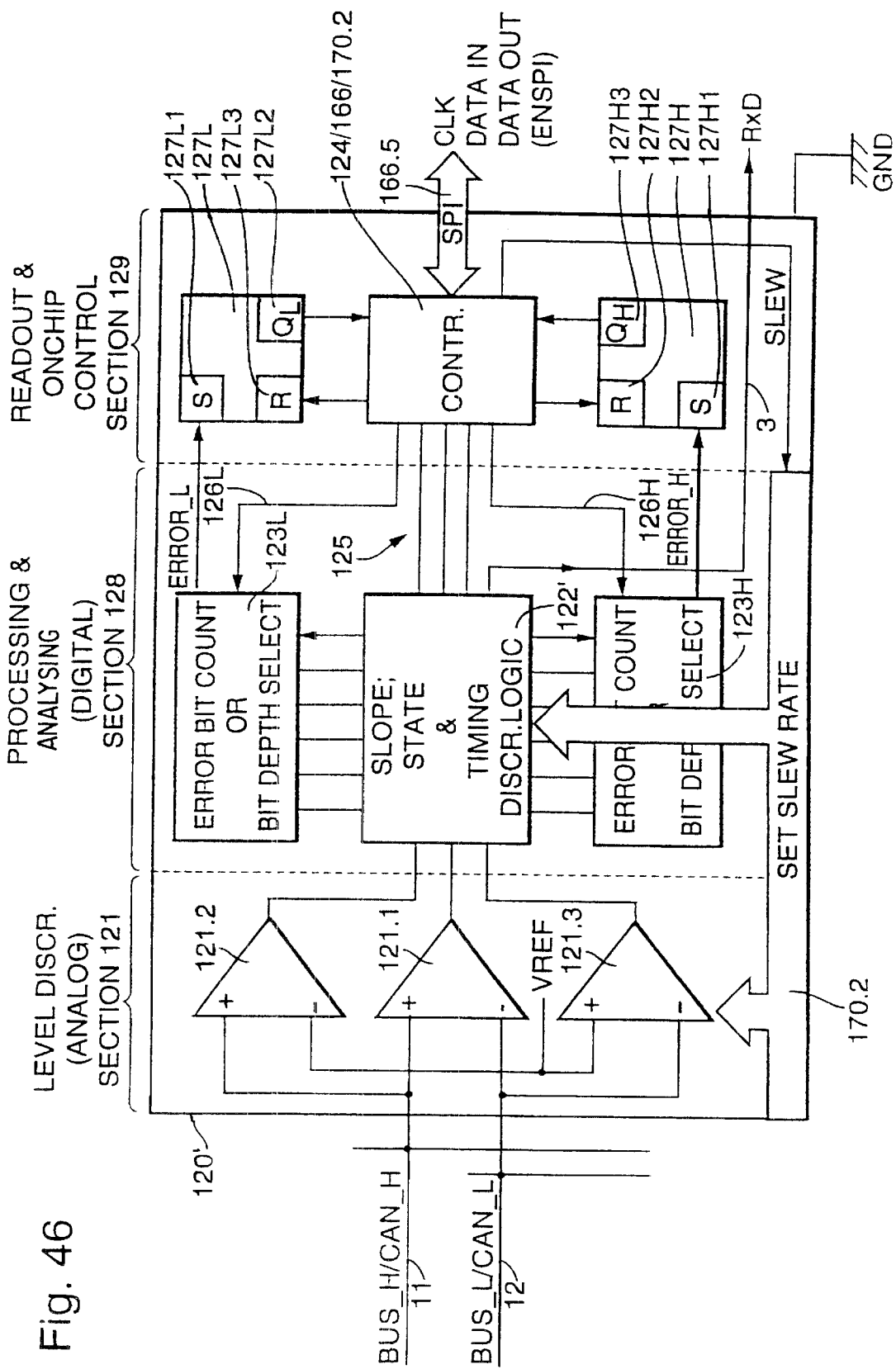
FIG. 46 shows a block diagram of a reception block within a bus transceiver which is equipped with additional means for the detection and analysis of bus faults.

If there is poor contact (contact that is impaired by corrosion, for example, between the grounding cable of a control unit, through which cable the operating current flows, and the body), the "offset fault" of the ground potential System GND internally in the unit relative to the corresponding internal ground potentials of other control units may become impermissibly large. As a consequence, e.g. the threshold value VREF of the reception discriminators 121.2 and 121.3 in FIG. 46 are then shifted beyond a bus-specifically permissible tolerance range, so that the recessive bus level window for this receiver may even be shifted to such an extent that reception is no longer possible.

In order to enable maximum availability of large two-wire bus networks with many subscribers under harsh operating conditions, the invention provides for the circuit 200. In addition to functionalities which support the communications capability and realize the wake-up capability, other functionalities are included, which impart to a corresponding bus system (line network and subscribers) not only the capability of locating and verifying such defective bus subscribers, but also the capability of latent testing and monitoring of the operating level windows of all the subscribers. The latter functionality provides the capability of obtaining and of constantly updating a measure which describes the margin that presently exists for one or more bus subscribers in each case before it or they undergo failure caused by a level fault. (In addition to other aspects, this measure is the most important for defining the bus quality).

In the case of a motor vehicle, during each service of the vehicle a service station can thus immediately obtain an impression of the overall state of the physical-communicative matching of the transceivers in the bus network and, if necessary, carry out precautionary or maintenance work in a highly targeted manner with minimum outlay. It is evident that in a vehicle having a very large number of such circuits in very many control units connected to the vehicle ground, intervention possibilities which are supported in this way, before the actual occurrence of the fault situation, avoid unnecessary service outlay and increase the availability of the motor vehicle.

The development in this regard relates, on the one hand, to expansion by a function block 199 which is likewise SPI-controllable, and, on the other hand, to quite specific expansions in the bus transceiver 100, 100' (at least in the transmission block 133 therein). For maximum testing flexibility, corresponding expansions are also provided in the reception block 120. These expansions and the way in which they can be realized, by way of example, are described below.

In this case, the function block 199 (OFFSET & BUS TEST MANAGER) can be connected, by way of example, via a particular chip terminal 13.1 to a reference-ground point SYSTEM GND in the unit carrying the circuit 200. Furthermore, the function block 199 can additionally be fed—preferably via a further function block 198 (SENSE/EMI PROTECTION)—an external reference-ground potential REMOTE GND from the application environment of the relevant unit via another particular chip terminal 13.2. The line 196 symbolizes a connection which—in the abovementioned example of a vehicle—can be routed from the relevant unit to a ground point on the vehicle body, which ground point is essentially free from current loading.

The function block 199 is operatively connected to the transceiver 100/100' in a manner of greater or lesser complexity, which is intended to be symbolized by the multiple path 195. Attention is already drawn at this point to the fact that this complexity may result from the fact that this function block, in a real chip design, may be connected to a greater or lesser extent to control structures of the transceiver 100, 100' —comprising receiver and/or transmitter—and/or of the interface 166, or may even be properly embedded in such structures. In order to characterize and elucidate the chip functionality which is made possible by this function block, an explanation is given below of specific transmitter and receiver developments which interact with this function block in order, together with the interface 166 and the microcontroller of the electronic unit, to enable the above-described "intelligence" for the purpose of automatic locating and determining of potential faults and for the purpose of fault margin monitoring in conjunction with suitable management software.

For the purpose of supplying power to digital circuit functions in the function block 199, the latter may be power-supplied with the potential $VCC_A$ from the output 20.2.2 of the regulator 20A.

Figure 27:
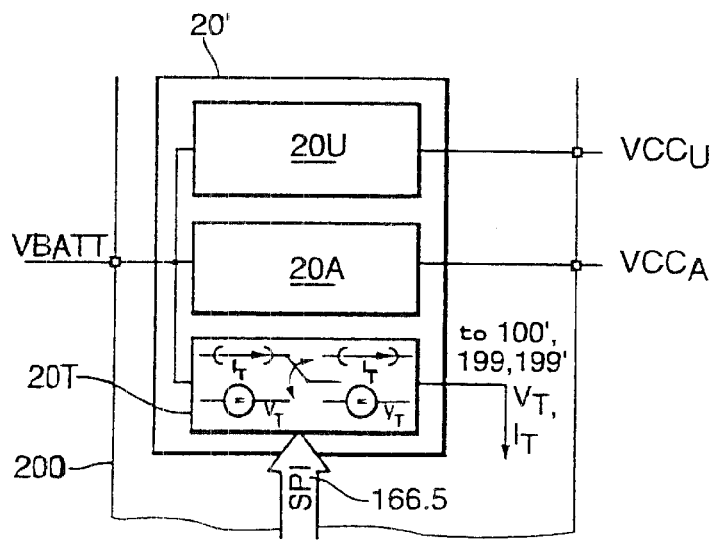
FIG. 27 shows a functional block diagram of a voltage regulator according to FIG. 16 which comprises, in order to support means for locating, detecting and handling reference-ground potential and for potential tests with regard to transmission and reception level windows of bus subscribers, a further supply path for the on-chip provision of an auxiliary voltage or an auxiliary current.

Equally, the voltage regulation 20 may optionally comprise, in addition, at least one third regulator 20T for a further supply potential $V_T$ or else a fixed supply current $I_T$, as illustrated in FIG. 27, from which the block 199—and also the bus transceiver 100, 100', if required—can be supplied via an on-chip feeding path 197, that is to say with a high degree of decoupling with respect to the output 20.2.2 of the regulator 20A having the potential $VCC_A$.

As a rule, the voltage $V_T$ will be higher than the voltage $VCC_A$, depending on the realization of the function block 199 and on the degree to which different features are formed (for example single-wire or two-wire testing capability, small- or large-swing level testing capability, etc.) and the production technology of the circuit 200. The chip terminal 20.2.3 shown in FIG. 28 can, in this respect, be provided (only) for the connection of a filter capacitor 161.3, that is to say not for supplying other external circuits or unit components, or for external monitoring purposes, particularly if a current source output is involved, for example. FIG. 27 further illustrates that the block 20T may also be designed in such a way that its output quantity can be changed over between a voltage $V_T$ and an impressed current $I_T$, under control access via the SPI path 166.5. Such a design, in interaction with circuit structures in the block 199 and in the bus transceiver 100, 100', can effect, inter alia, the automatic changeover or switching on and off of functions of such structures.

In by far and away the simplest case, the block 199 comprises means which allow the so-called bus level window at least of the output stage 112 of the transceiver 100/100' to be influenced, in particular to be increased. This is illustrated in FIG. 29. In this case, a D/A converter which is also incorporated in 199 and is driven via the digital path 166.5 is provided for the specification of a voltage value which acts on a controllable offset voltage source $Q_{SG}$. This effectively appears looped into the current path of the "normal" ground connection of the output stage 133 to the potential GND, which is possible by suitable monolithic insulation of diverse components of the output stage 133.

In order to keep the supply voltage VCC of the output stage 133 constant, a voltage clamp or a voltage regulator CD is connected in parallel with the said output stage. In the first case, the output stage can preferably be supplied with power via a current source CS from a supply busbar at a correspondingly high potential VBATT or $V_T$, and from the regulator CD in the second case, in which case the regulator CD can then be fed by the said supply busbar via the supply path SUPPLY indicated by a dashed line. The current source CS can also be entirely omitted if it is possible to supply the output stage 133 by means of an impressed current $I_T$ from the regulator 20T in accordance with FIG. 27.

In the simplest case, the controlled voltage source $Q_{SG}$ can be realized by an impedance converter which converts the output voltage swing of the D/A converter 199.2 in a ratio of essentially 1:1 to a source impedance which is appropriate to the feeding current of the output stage 133.

With this construction, it is thus possible, in accordance with a digital specification at the D/A converter 199.2, to shift the dominant feeding level window (difference between the source levels of the two core output stages 133L and 133H), which is kept constant by the voltage clamp or the voltage regulator CD, in the direction of higher voltage values. It is possible for this variable voltage swing to amount to 0 to 5 volts, for example, resulting in a feeding H source level of up to 10 volts with regard to the bus network. In order to bridge the consequently variable driving voltage swing of the output stage inputs, logic driving of the output stages with the transmission signal TxD by means of an impressed current path is provided here, by way of example.

A block 199 configured in this way, in conjunction with a correspondingly equipped transmission output stage 133, thus permits an fault voltage to be simulated at the transmitting end by means of digital setting data which are obtained via the path 166.5, which fault voltage, in the case of a bus transceiver, no longer allows normal communication, in particular normal reception, in a bus subscriber with an ground fault.

Given an appropriate magnitude of the terminal voltage of the source $Q_{SG}$, the fault voltage in the case of the receiver subjected to reception interference can thus be compensated for, at least partly or even completely, across the entire bus termination. The terminal voltage of the source $Q_{SG}$ is expediently adjustable in a defined manner. In particular, it can be altered at least in steps, that is to say, given a corresponding stepped nature, for example in staircase or ramped fashion to a greater or lesser extent over time in accordance with respective specifications via the digital path 166.5.

Figure 30:
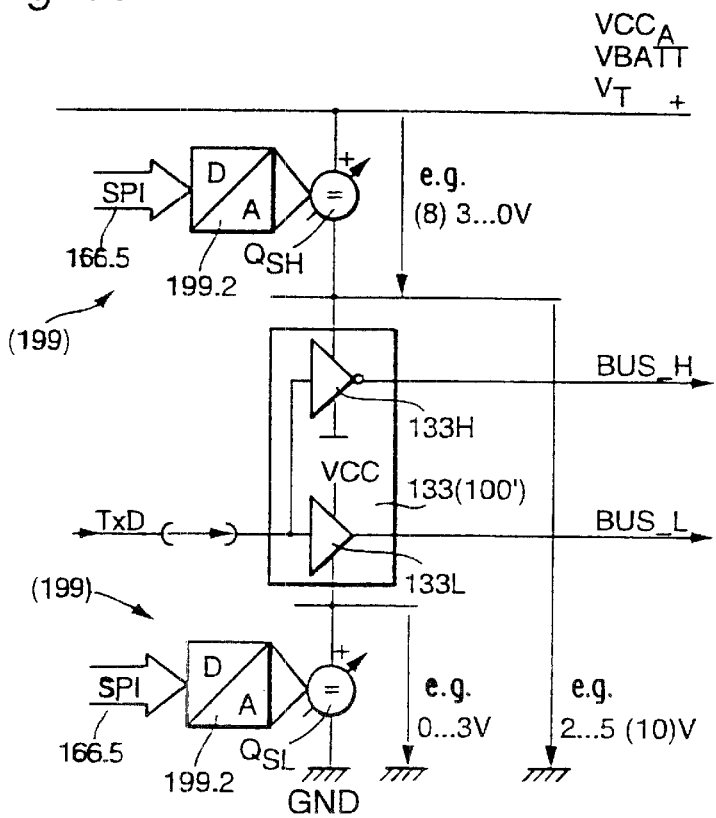
FIG. 30 shows a second corresponding block circuit diagram, relating to the transmitting end of the transceiver function.

In accordance with FIG. 30, with regard to the transmitting end, the development may equally well comprise two separate controllable offset voltage sources $Q_{SL}$ and $Q_{SH}$, the source $Q_{SL}$ corresponding to that described above. In order to raise the negative supply potential of the core output stage 133L, the source $Q_{SH}$ is connected in such a way that it permits correspondingly digitally controllable alteration of the positive supply potential VCC or VBATT or $V_T$ of the core output stage 133H. In this case, therefore, the L source level feeding onto the bus can be altered independently of the H source level feeding onto the bus, and vice versa.

For example, the controllable offset source $Q_{SL}$ may sweep across a voltage swing of 0 to 3 volts and the controllable offset source $Q_{SH}$ one of 8 or 3 to 0 volts. Depending on the magnitude of the supply potential of the offset source $Q_{SH}$, in this development it is thus possible to adjust the dominant L source level from 0 to 3 volts and the dominant H source level from 3 or 8 to 0 volts.

Figure 33:
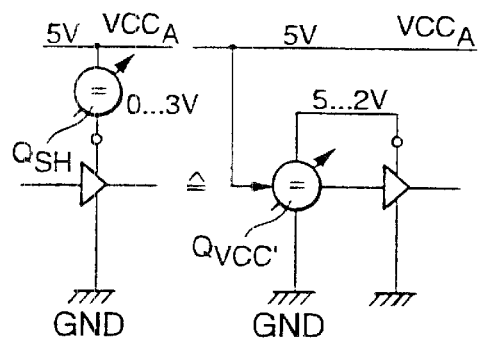
FIG. 33 shows a schematic illustration of offset or supply sources which, within the scope of the invention, correspond to one another or can be converted into one another and are equivalent in this respect.

Reference is made, in the context, to the elucidating illustration in FIG. 33, according to which, within the scope of the present invention, it is unimportant to which of two supply potentials an offset voltage source is referred, for example an offset voltage source $Q_{SH}$ which can be adjusted between 0 and 3 volts underneath a supply busbar VCC with 5 volts being equivalent to an adjustable offset voltage source $Q_{VCC}$, across GND with an adjusting range from 5 to 2 volts.

Figure 36:
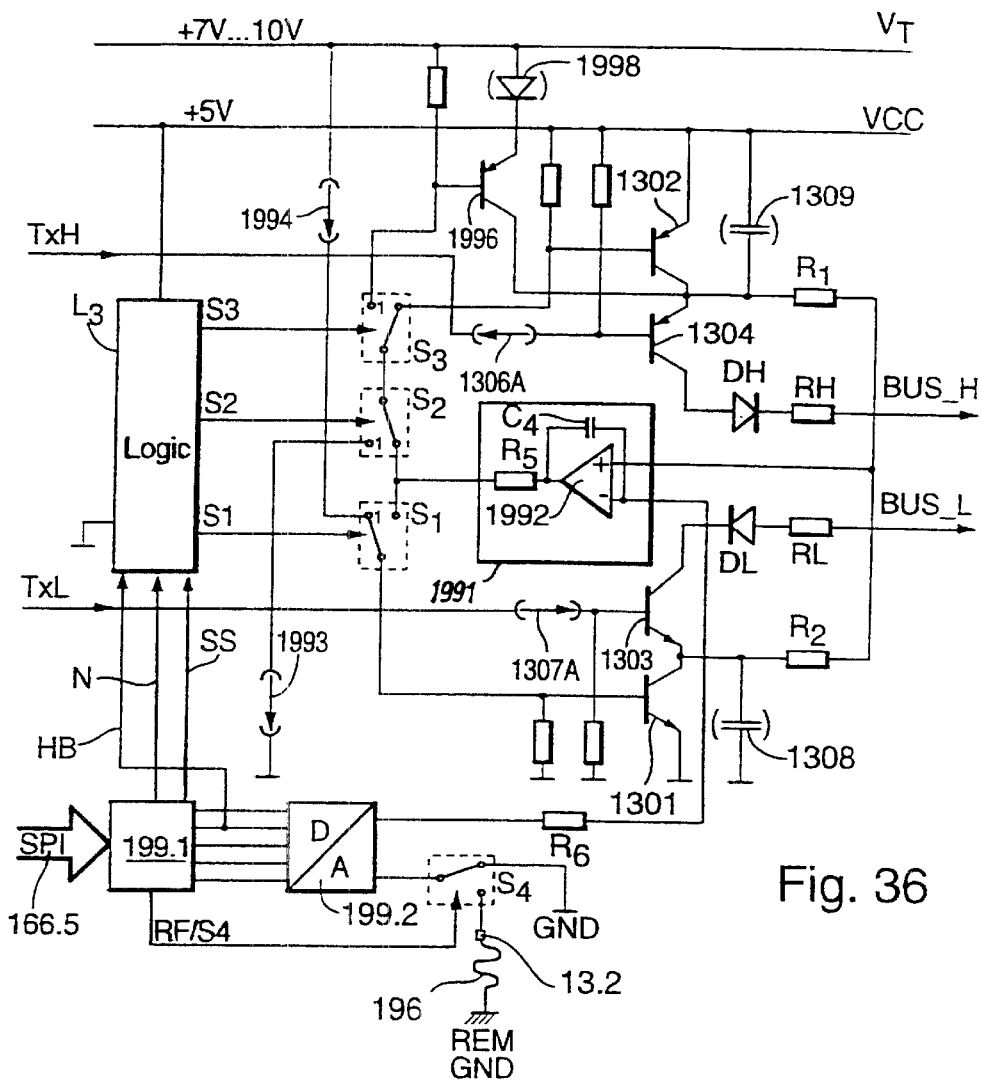
FIG. 36 is a simplified circuit diagram which illustrates various functionalities in a similar manner to FIG. 31.
Figure 37:
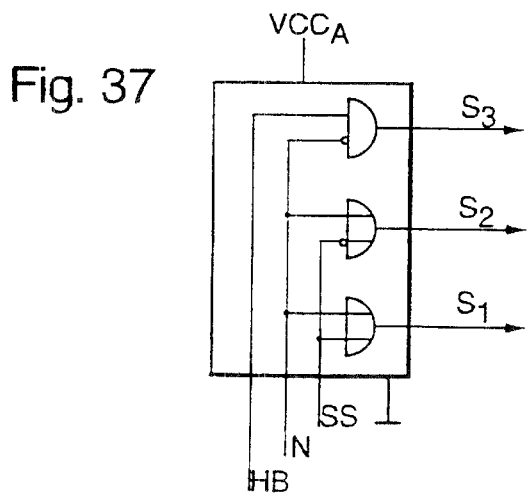
FIG. 37 shows a logic diagram of a possible driving functionality $L_3$ in FIG. 36.
Figure 39:
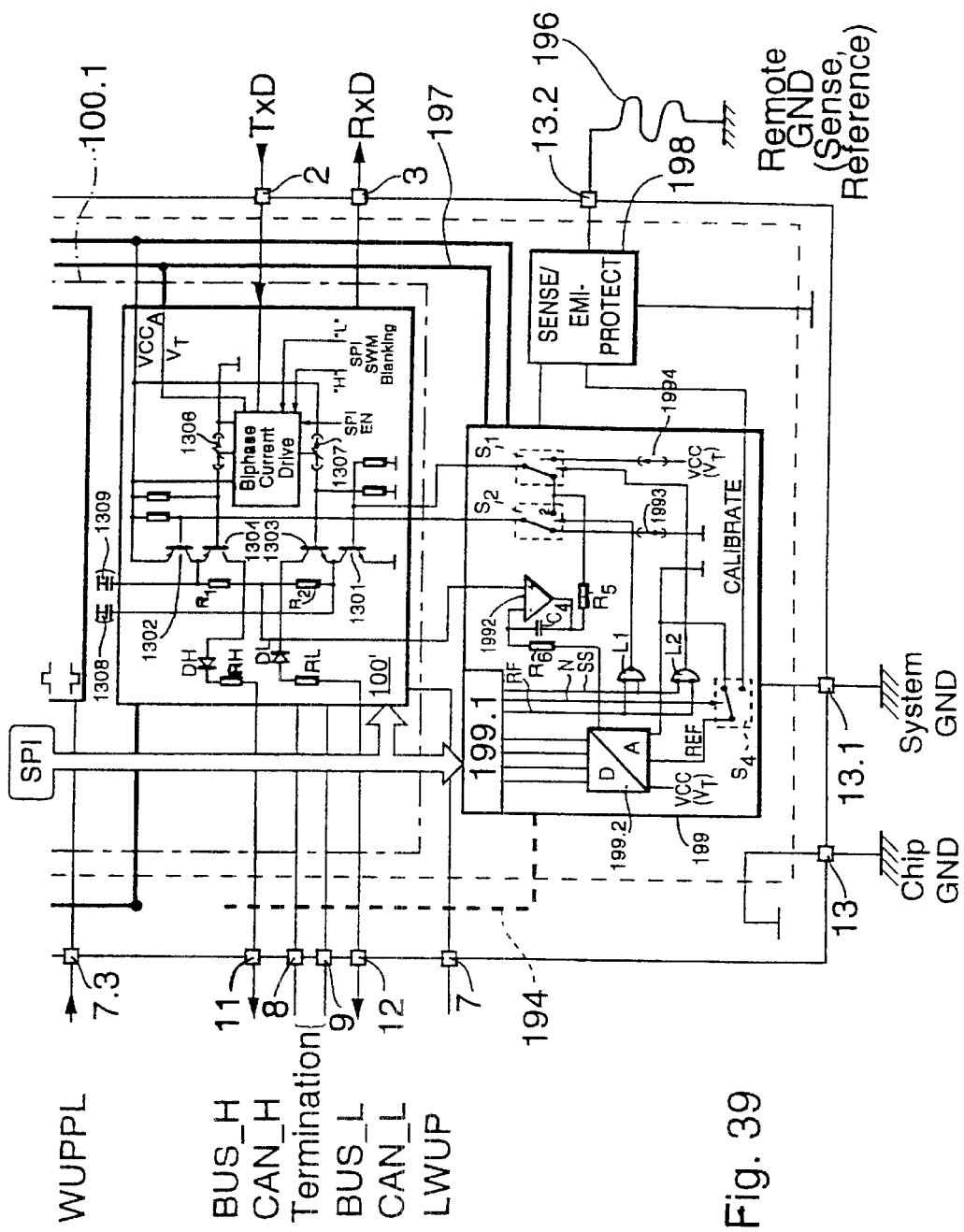
FIG. 39 shows a distribution diagram of additional means in the sense of FIG. 28, these being limited in this case, by way of example, to the transmitting end of the transceiver function.

The invention covers the development according to FIG. 30 to the effect, on the one hand, that the two offset sources $Q_{SL}$ and $Q_{SH}$ can be utilized alternatively, as is illustrated in somewhat more detail in FIG. 36 and 37 and FIG. 39, for example, without restricting the generality. In that case, in principle, in each case only one voltage specification is ever necessary and, in this respect, only one D/A converter, which can be correspondingly charged/recharged during the selection from both alternatives of the specification which is currently required in each case.

Figure 38:
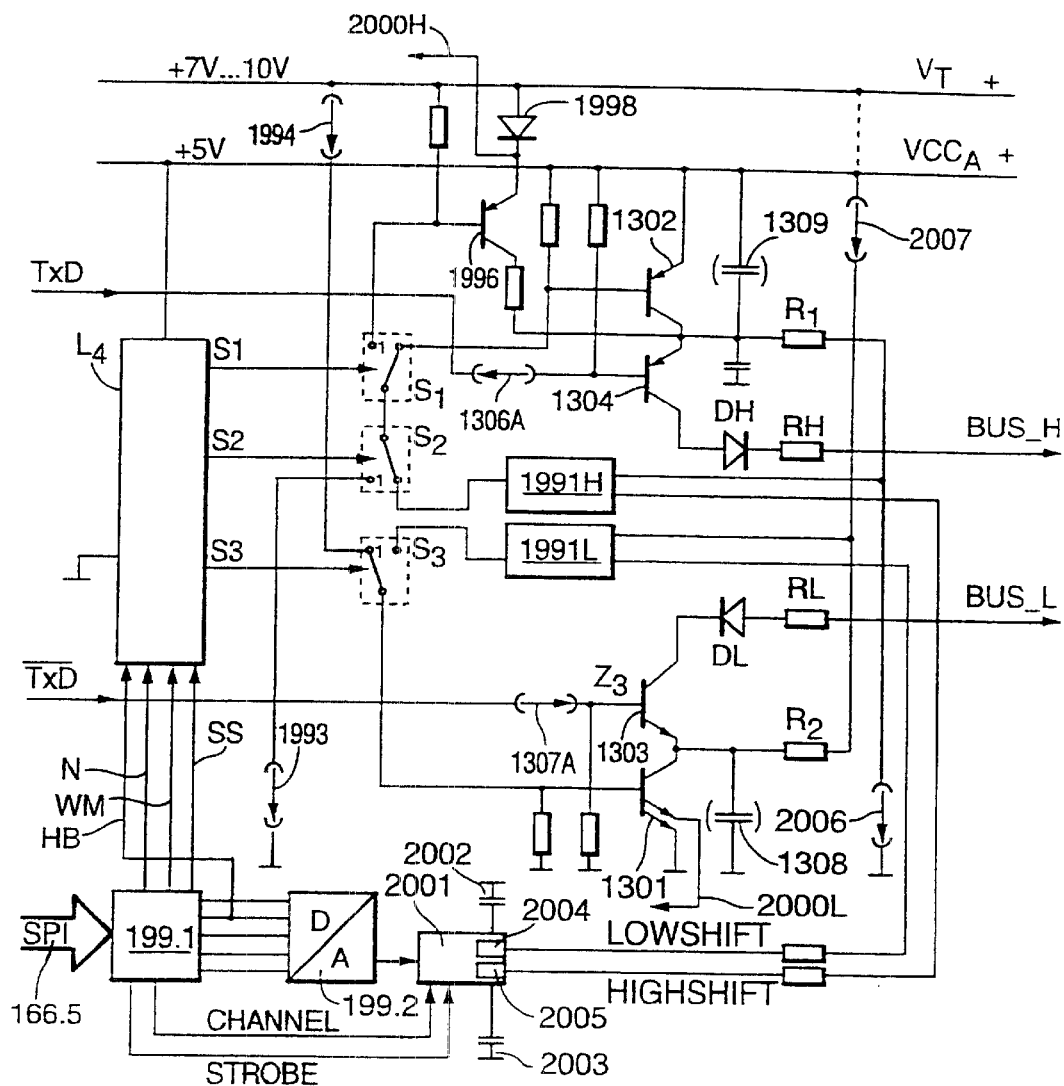
FIG. 38 shows a simplified circuit diagram which illustrates functionalities beyond those of the example of FIG. 36.

In addition, the invention equally covers the development according to FIG. 30 to the effect that the two offset sources $Q_{SL}$ and $Q_{SH}$ can be utilized simultaneously and independently of one another, as is illustrated in somewhat more detail for example in FIG. 38, without restricting the generality. The three figures mentioned will also be referred to further below.

Figure 31:
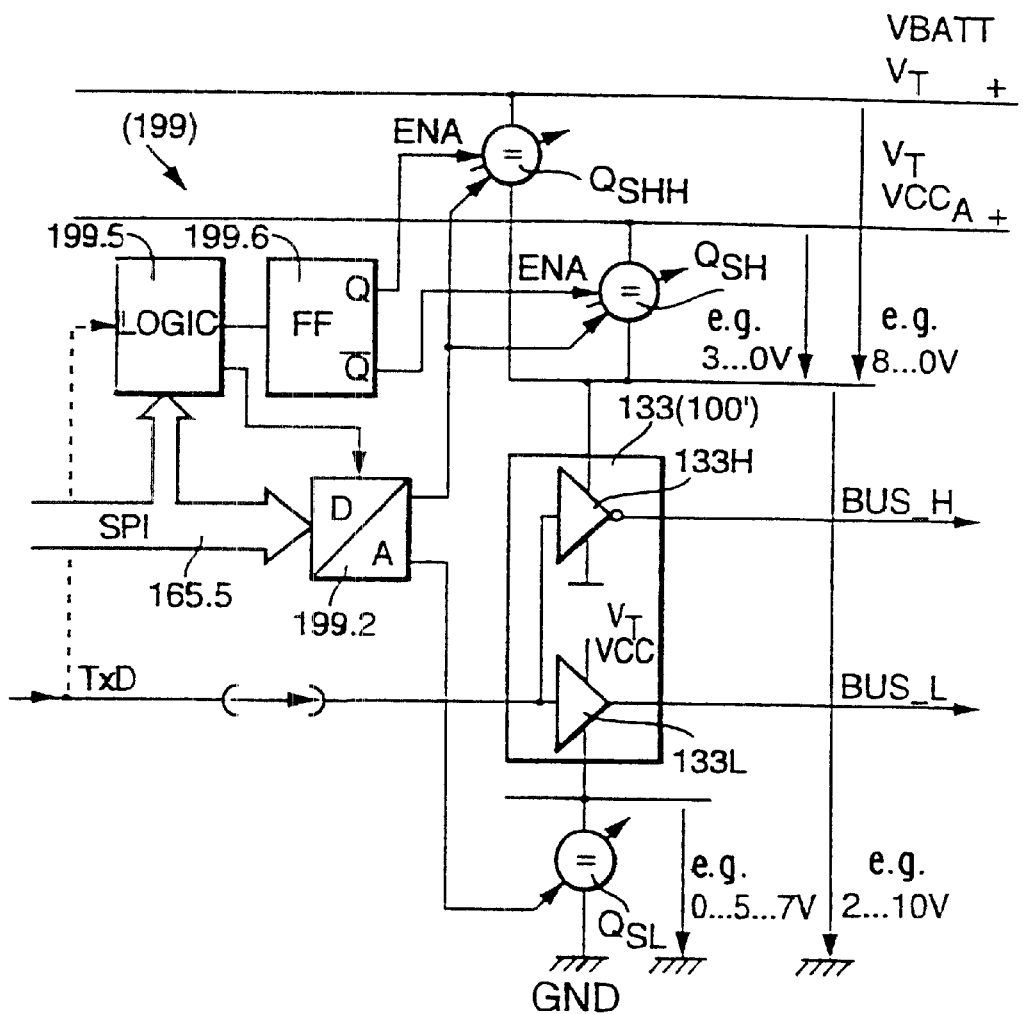
FIG. 31 shows a third simplified block circuit diagram, relating to the transmitting end of the transceiver function.

The exemplary embodiment according to FIG. 31 also allows the installation of at least two offset sources $Q_{SL}$ and $Q_{SH}$ which can be utilized simultaneously, a D/A converter 199.2 having two corresponding outputs for the specification of two offset values being provided in that figure. In this case, by way of example, one output is fixedly assigned to the source $Q_{SL}$ and the other output is provided exclusively for the optional control of a first source $Q_{SH}$ (on the supply busbar $V_T$ or VCC) and of a second source $Q_{SHH}$ (on the higher-potential supply busbar VBATT or $V_T$). As in the case of the previous examples, logic driving of both output stages by means of at least one impressed current path is provided in this case as well.

The digital path 166.5 driving the D/A converter 199.2 furthermore drives a logic arrangement 199.5, which, for its part, is both connected to the D/A converter 199.2 and triggers a flip-flop 199.6. The two mutually inverted outputs of the flip-flop 199.6 drive the offset sources $Q_{SH}$, and $Q_{SH}$ H in the sense of a selection. According to the state of the flip-flop 199.6, an active ENAble signal is applied to one or the other offset source. That is, either the offset source $Q_{SH}$ on the supply busbar $V_T$ or VCC or the offset source $Q_{SHH}$ on the (still more positive) supply busbar VBATT or $V_T$ is active; never both simultaneously. In the inactive state, each of the offset sources $Q_{SH}$ and $Q_{SHH}$ may be thought of as a short circuit (or, in practice, as a source having an insignificant residual voltage drop).

The logic arrangement 199.5 may thus be configured in such a way that if the flip-flop 199.6 is triggered, for the purpose of a state change, the logic arrangement can also drive the D/A converter 199.2 for the purpose of recharging at least one desired value specification, in particular in the sense of a selection for the source $Q_{SH}$ or $Q_{SHH}$. From the above explanations, the voltage ranges entered in FIG. 31 are self-explanatory. This development thus permits a dominant H source potential which can optionally lie below or above the bus-specifically normal H source potential or equally well be keyed, as required, between the two. It furthermore lies within the scope of the invention to design the logic arrangement 199.5 appropriately so that such a changeover is also enabled in a manner interlinked with the data signal TxD, this being symbolized by the dashed signal path to the logic arrangement 199.5.

The developments that have been described up to this point thus make it possible to shift one or both feeding dominant source level(s), on the one hand, in a direction in which the reception level window of a bus subscriber is also necessarily shifted when it has a defective connection to a reference-ground potential, which connection carries current and, in this respect, causes its own offset voltage drop, such as, for example, in the case of a defective ground connection of a control unit as bus subscriber to the body of a motor vehicle.

On the other hand, however, it is also possible, in accordance with the temporal driving of one or more D/A converters, to shift one or both feeding dominant source level(s), starting from one or two higher values, in directions opposite to the shifting direction or offset of the reception level window of a correspondingly defective bus subscriber. This capability of the circuit 200 provides specific testing possibilities both before and after the occurrence of a potential fault situation in a bus network.

Figure 32:
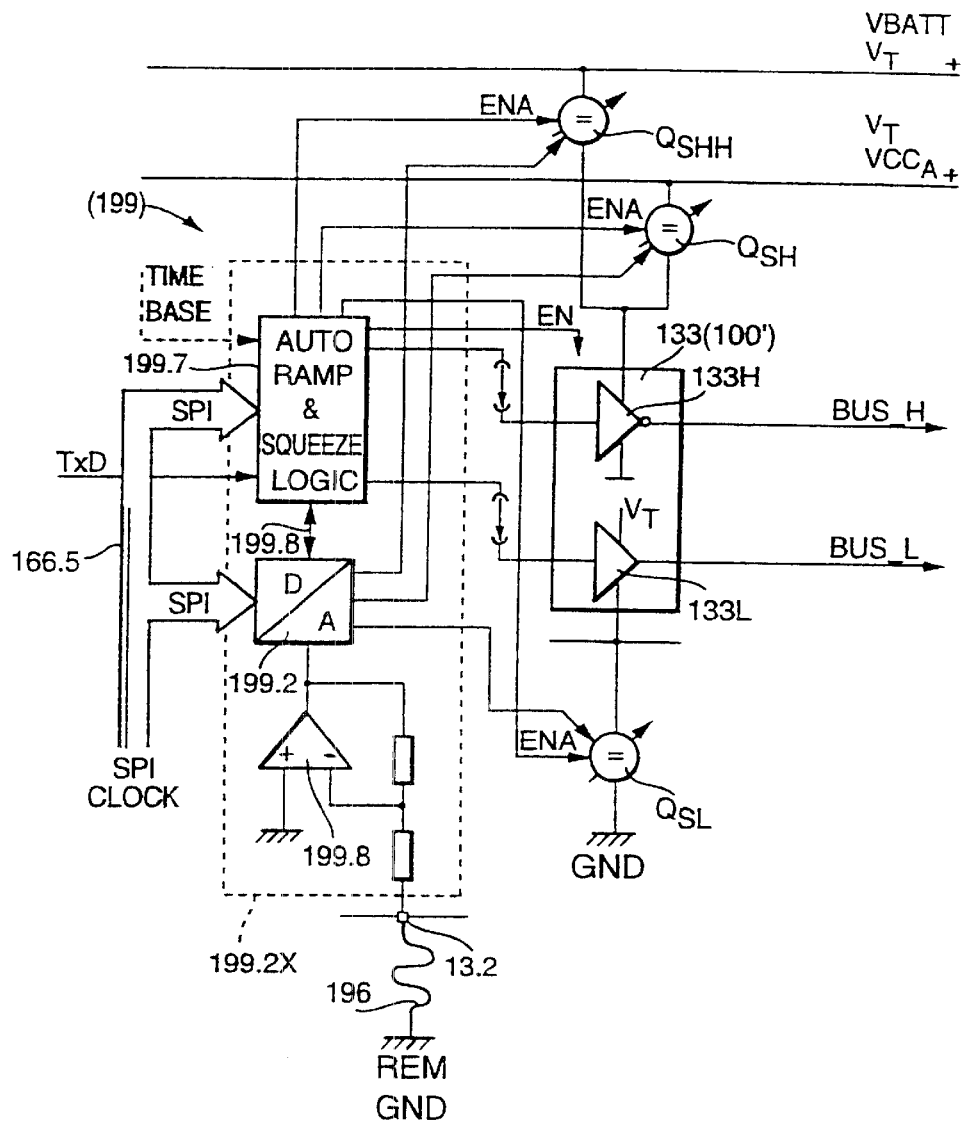
FIG. 32 shows a fourth simplified block circuit diagram, relating the transmitting end of the transceiver function.

Such tests extending across an entire bus network having a large number of subscribers are simplified and accelerated in the development of the circuit in accordance with FIG. 32, for example.

What has already been explained with regard to FIG. 33 also applies without any restriction to this development. In this case, on the one hand, a D/A converter 199.2 permits the outputting of, for example, three analog control or desired values to corresponding offset sources $Q_{SL}$, $Q_{SH}$ and $Q_{SHH}$. Without restricting the generality, all or only two of these values can be available simultaneously. In this case, too, the D/A converter 199.2 can be driven via a digital path 166.5 of the SPI type, for example. Furthermore, a logic arrangement 199.7 can likewise be driven by the digital path 166.5 and interacts with the D/A converter 199.2 via a bidirectional connection 199.8. The logic arrangement 199.7 can be driven by the SPI clock signal; the supply of an external time base signal may also equally well be provided.

Without restricting the generality of the invention, a corresponding time base signal could be derived for example by the timer 165.1 of the wake-up expander 165' or (if the latter is, for its part, supplied with a time or frequency signal via 164a (FIG. 28) from the watchdog function 164) could either be temporally interlinked with a period of an internal reference signal of the watchdog function 164 or be obtained from a branch of the connection 164a in FIG. 28.

Moreover, the transmission signal TxD may also be able to be fed to the logic arrangement 199.7. In this case, by way of example, the output stages 133L and 133H are driven by the logic arrangement 199.7 via respectively individual logic paths with current impressing. Also indicated, furthermore, is a measurement amplifier 199.8, which is wired up to generate a quantity corresponding to the difference between the chip or ground potential internally in unit and an external reference ground REM GND. This quantity is fed, for example, to the D/A converter 199.2.

The configuration and function of the logic arrangement 199.7 in connection with the D/A converter 199.2 are as follows.

Driven by a clock signal, which may either be the clock signal of the path 166.5 or else one which is obtained in accordance with the description above, the logic arrangement 199.7 generates, inter alia, in accordance with data received via the path 166.5, control signals for the D/A converter 199.2. These signals enable the D/A converter (i) to generate and provide desired value specifications of the A/D converter which vary in a defined ramped fashion, (ii) to freely alter the dominant window width in a defined manner (so-called squeezing of the bus bit eye width), and also (iii) to effect the selection or changeover (ENAbling) of the corresponding target offset source(s) $Q_{SL}$, $Q_{SH}$ and/or $Q_{SHH}$.

Without restricting the generality of the invention, in this case the first function (so-called "ramping") can be carried out both for single-wire and for two-wire tests and the second function (so-called "squeezing") can preferably be provided for two-wire tests, depending on the configuration of diagnostic software that utilizes the abovementioned properties. In this case, it may be possible to provide analog voltage levels which approximate a voltage ramp or represent a squeeze increment or decrement, if necessary optionally time-slot-interlinked with the (not necessarily) synchronous data signal TxD.

For example, it is thus possible, in accordance with a number M which can be loaded via the path 166.5 from the microcontroller 21, for a ramp increment or decrement to be effected at the earliest or exactly after a number of transmission bit periods, which number is determined by the said number M. If this number M can be received by all the bus subscribers with reception capability, test software which is correspondingly designed can convey, using this predeterminable number M, virtually elementary verification foreknowledge regarding an imminent test cycle throughout the bus.

In conjunction with receiver features described in more detail below, plausibility checks within the bus subscribers are thus possible with low loading of the bus network. This is the key to a high acceleration of corresponding tests. In this context, attention is expressly drawn to the fact that the circuit 200 can also comprise, in addition, means which are not illustrated in the figures and enable a current reference changeover of the output stage 133H between the offset sources $Q_{SH}$ and $Q_{SHH}$ to be effected within a period of time which is shorter than the bus bit period.

Some of the elements explained above are bordered by dashes in FIG. 32 and designated by 199.2X since the extent of the functionality which is encompassed within this dashed border can, as explained above, also be realized within the scope of the invention by a single integral functionality 199.2X within the block 199. Reference will additionally be made to this in connection with FIG. 54.

Figure 34:
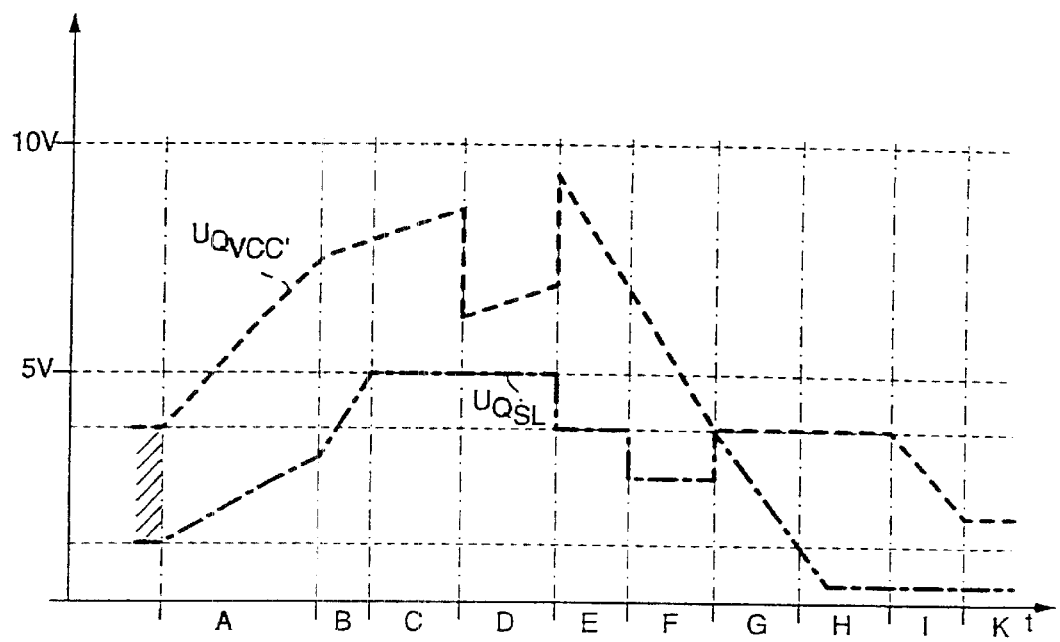
FIG. 34 shows a schematic timing diagram of the source potentials by which signal currents can be dominantly fed onto the bus cores.
Figure 35:
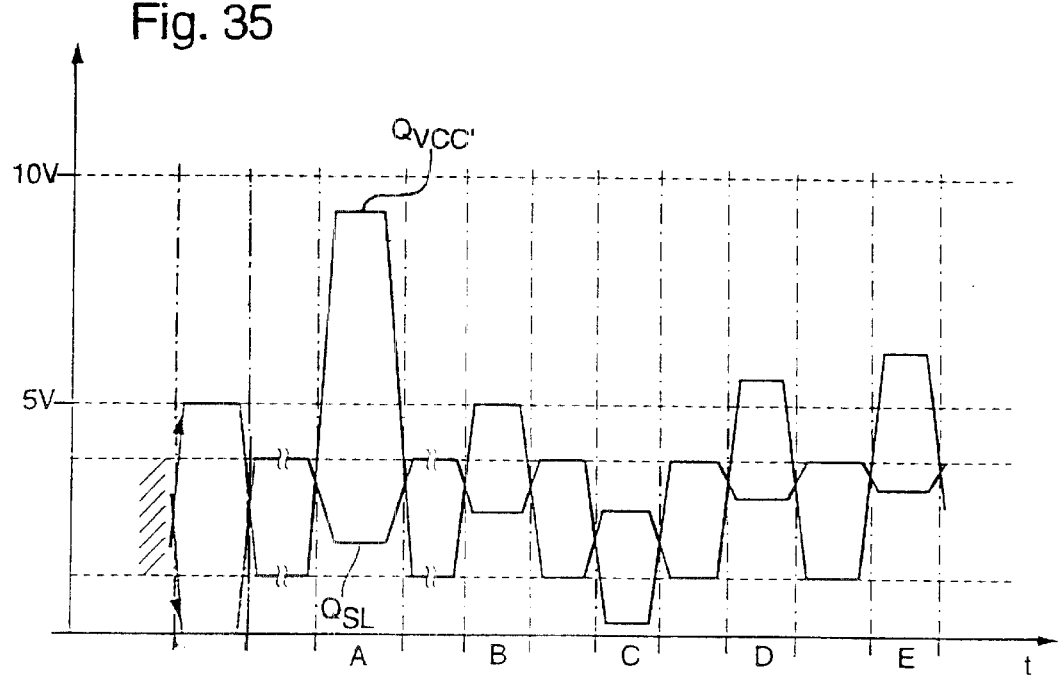
FIG. 35 shows two exemplary signal profiles of the kind generated by the apparatus according to FIG. 31 or 32 at core coupling points at he transmitting end.

An example of the way in which the dominant source levels feeding onto the bus can be altered with the exemplary embodiment of FIG. 32 is plotted in a simplified manner in FIG. 34 in the form of an envelope diagram. FIG. 35 illustrates an enlargement at the bit plane when the abovementioned feature of enabling a changeover of the current reference of the output stage 133H between the offset sources $Q_{SH}$ and $Q_{SHH}$ is possible within a time shorter than the bus bit period. It is evident from this that current feeding into a bus core is not possible under certain preconditions, something which can be utilized for discrimination purposes.

Depending on the application spectrum of the circuit 200, the degree to which the abovementioned features are constructed can vary to a great extent. In every case, features of one example can be combined, without any restriction, with features of another example, without thereby departing from the scope of the invention. Without limiting the invention, FIGS. 36–38 convey a number of practical examples in this sense, using simplified circuit diagrams, in order to make the different functionalities plausible. Depending on the realization technology, it is also possible to realize circuit diagrams which are very different from these, in order to achieve in practice the functionality which is illustrated.

In this sense, FIG. 36 shows an exemplary circuit diagram in which are assembled elements which can be assigned both to the block 199 and to the bus transceiver 100, 100'—in particular to the output stage 133 thereof. With the exception of optionally provided interlinking of the offset source influencing with the data signal TxD, this exemplary embodiment approximately conveys the functionality of what is illustrated in the block diagram in FIG. 31.

1303 is the L switch of the L output stage 133L, which L switch (normally) switches with respect to GND, and 1304 is the H switch of the H output stage 133H, which H switch (normally) switches with respect to $VCC_A$. The transistors, which in this example are bipolar, complementary transistors, have the respective data signal Tx_L and Tx_H applied to their bases by means of impressed current paths 1307A and 1306A, respectively. The collectors of the transistors 1303 and 1304 feed the bus cores BUS_L and BUS_H, respectively, in a manner known per se, via protective diodes DL and DH, respectively and, if appropriate, small protective resistors RL and RH, respectively.

The transistors 1301 and 1302 alternate in performing an overall triple function. For this purpose, they can be driven, on the input side, via analog changeover switches $S_1$ and $S_2$, which can be controlled by digital signals $S_1$ and $S_2$.

In the exemplary switch position 1 of the analog changeover switch $S_1$, the transistor 1301 is firstly held at saturation by the current source 1994 feeding from the potential $V_T$, as a result of which the emitter of the transistor 1303 is almost at ground potential GND. The transistor 1301 as it were "deactivates" the corresponding offset source $Q_{SL}$.

By virtue of this measure, the resistor $R_2$ of the voltage divider formed by $R_1$ and $R_2$ is, secondly, also connected to GND, with the result that the said voltage divider has the division ratio $R_2/(R_1+R_2)$ Thirdly, via the analog changeover switch $S_2$ in position 2, the base of the transistor 1302 is connected to the output of the regulator 1991. As a result, the transistor 1302, in conjunction with the regulator 1991, functions as the output stage of an offset source $Q_{SH}$.

The regulator 1991 can be constructed in a known manner. Under certain conditions, it may also be based on a comparator 1992, as assumed in the example. The capacitor $C_4$, indicated by way of example, in conjunction with $R_5$ and $R_6$ are then to be matched, if appropriate, in accordance with technical regulation requirements, to a non-ideal phase-shifting behavior of the transistors 1301 and 1302. Other compensation means may also be expedient, depending on the properties of the comparator. The capacitors 1308 and 1309 which can be used for EMC protection purposes may in turn be advantageous in a differently configured regulator.

An analog desired value specification of the D/A converter 199.2 is fed to the regulator 1991. Since the regulating circuit is closed via the transistor 1302 and the abovementioned voltage divider formed by $R_1$ and $R_2$, the DC voltage present at the emitter of the transistor 1304 can be regulated as offset voltage which decreases the potential $VCC_A$ (source $Q_{SH}$).

Obviously, when the driving of the two analog changeover switches $S_1$ and $S_2$ is reversed, the opposite conditions prevail: the transistor 1302 is then held at saturation by the current source 1993, while the transistor 1301, functioning as regulating output stage, closes the regulating circuit. The abovementioned voltage divider formed by $R_1$ and $R_2$ is then virtually connected to $VCC_A$ and then has the translation ratio $R_1/(R_1+R_2)$. When $R_1=R_2$, the voltage divider acts identically both in the case of an L shift and in the case of an H shift and effects a curved regulating characteristic curve which may be advantageous, under certain preconditions, with regard to recharging the D/A converter 199.2 for the purpose of tests which alternate in a single-wire manner.

The selection logic arrangement $L_3$ drives a further analog changeover switch $S_3$ with a signal S3. By means of this changeover switch, it is possible to change over the output of the regulator 1991, given truth of the high bit HB, from the transistor 1302 to the transistor 1996 which is fed from the more positive supply busbar $V_T$; in this case, the transistor 1302 is then inactive. The diode 1998 is expedient depending on the technology. A zener breakdown of the transistor 1302 when the transistor 1996 is near saturation can be ruled out in the case of realization using high-voltage technology in the event of relevant differences between $V_T$ and $VCC_A$.

For its part, the D/A converter 199.2 is driven by a logic arrangement 199.1, which is in turn driven via the digital path 166.5. In this case, the logic arrangement 199.1 has the function of an interface to the digital path 166.5. For this purpose, it may comprise at least one register in which at least part of a data telegram that is received serially can be held temporarily. The flip-flop illustrated in FIG. 31 is contained therein as storage cell. For example, a bit line HB (for High Bit) leading to the D/A converter and also two further bit lines N (for Normal or Override) and SS (for Shift Select) are routed to the selection logic arrangement $L_3$. An exemplary realization of the same is reproduced in FIG. 37; it is configured in dependence on the truth evaluation of its input signals.

Given truth of the signal N, the operating state of the output stage is activated for normal bus communication, irrespective of whether HB driving is simultaneously effected or which of the two dominant source potentials GND and $VCC_A$ is selected for "manipulation" by offset shifting in accordance with the D/A converter (override function).

Another driving path leads from the logic arrangement 199.1 to a further analog changeover switch $S_4$, via which the ground terminal of the D/A converter 199.2 and of the regulator 1991 can be connected optionally to, for example, the potential Chip GND or the terminal 13.2 for the external reference-ground potential REM GND, depending on a control signal $S_4$ (ReFerence) from the logic arrangement 199.1.

Without restricting the invention, a functionality in accordance with this exemplary embodiment covers a large number of potential tests which can be executed in a single-wire manner and require, at an instant, in each case offset influencing only of one feeding dominant source level.

The exemplary embodiment according to FIG. 38 constitutes an expansion for applications in which simultaneous offset influencing of both feeding dominant source levels is necessary. In this case, by way of example, two separate regulators 1991H and 1991L are provided and an undivided acquisition (enabled by auxiliary current sources 1312 and 1313) of the actual offsets at the collectors of the transistors 1301 and 1302. The corresponding logic arrangement 199.1 is provided with an additional output WM (Wire Mode).

The corresponding logic arrangement L4 may be designed similarly to the logic arrangement L3. Connected downstream of the D/A converter 199.2 in this case, for example, is a two-channel hold device 2001 with signal supports 2002 and 2003 which is driven by the interface logic arrangement 199.1 via two additional connections (Channel and Strobe) and, with its two outputs 2004 and 2005, feeds the desired value inputs of the regulators 1991L and 1991H. As a special feature, a separate emitter pitch 2000L of the transistor 1301 and a sampling line 2000H at the diode 1998 are provided. As an additional protective measure for the circuit 200 under test conditions in the event of bus faults, quantities which can be picked off therefrom can be incorporated into the thermal overload disconnection, of the voltage regulators 20U and 20A, already described in connection with FIGS. 14 and 15.

The capability of assigning individual elements unambiguously to the transceiver 100, 100' and/or to the function block 199 is given, in practice, only when the degree to which the feature "offset influencing" is constructed is relatively low. Moreover, it may be expedient, for example, to integrate certain elements which actually ought to be attributed to the function block 199 such that they are embedded in the transceiver function, as, for example, in the case illustrated in FIG. 39 (only for transmission matters).

This example illustrates, in a schematic simplification, the distribution of exemplary elements of a solution in accordance with FIG. 30 for the case of two offset sources $Q_{SL}$ and $Q_{SH}$ which cannot be utilized simultaneously and for the special case where the feeding dominant H potential need not be greater than $VCC_A$.

It can be discerned that in the case of such a solution, the elements which effect potential shifting—namely the transistors 1301 and 1302—can expediently be integrated without difficulty as components of a thermally equilibrated transmission output stage. In terms of identification, therefore, they are also assigned to the transmission output stage in this case. This exemplary embodiment also serves exclusively to illustrate the resolution or distribution in which elements can be constructed, and does not represent any restriction at all to the invention. Accordingly, corresponding solutions using field-effect structures may fulfil the same purpose.

The above-mentioned exemplary embodiments have the common property that they actually realize the offset sources symbolized in FIGS. 29 to 33.

This means that the potential actually effected on the bus core BUS_L and BUS_H always deviates by a certain amount from the regulated terminal voltage of the offset source $Q_{SL}$ and, respectively, $Q_{SH}$ or $Q_{SHH}$ on account of the unavoidable streaming voltage drop across the protective diode DL and DH, respectively, and the protective resistor RL and RH, respectively.

This can be compensated for by a suitable test program in that, on the one hand, this offset can be taken into account in the microcontroller 21 by subtraction or addition of a corresponding fixed, correcting digital value, or in that a list of values, already generally shifted by an average offset voltage drop, for the D/A converter specifications is stored in the microcontroller and utilized for desired value formation for offset sources.

On the other hand, it may be—depending on the test software—that for practicability the resolution of D/A converters used and the absolute accuracy of the core voltages with an increasing number of subscribers in the network become less important if, for the purpose of testing rapidity, the functionalities which are installed on-chip in the circuit 200 allow a high utilization of the circuit in favor of the lowest possible signal throughput via the bus network and in favor of minimum loss times in SPI paths between microcontrollers 21 and circuits 200 in bus subscribers.

The following exemplary embodiments are aimed at applications in which, by contrast, a maximally direct and more accurate definition of a core voltage (that is, voltage impressing) is desirable for the sake of testing.

Figure 40:
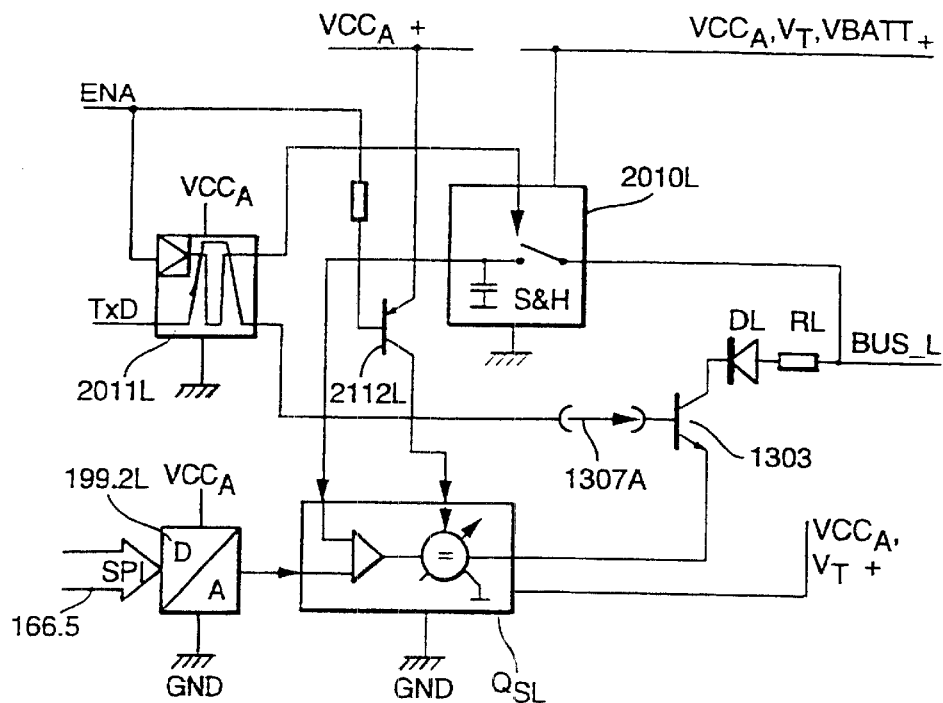
FIG. 40 shows a function circuit diagram of a development which allows, in a simple manner, the direct regulation on the bus core BUS_L of a keying potential to be impressed dominantly thereon.
Figure 41:
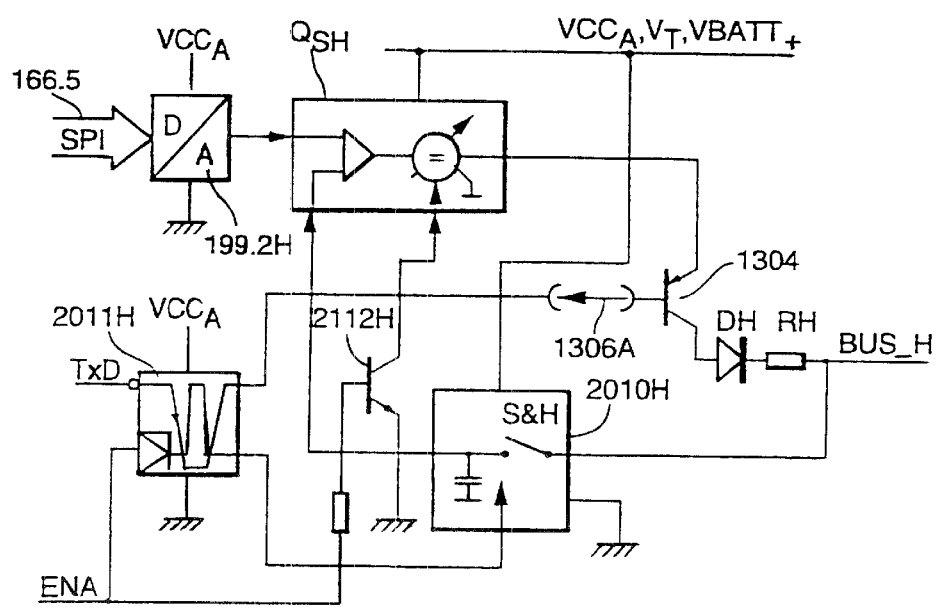
FIG. 41 shows a corresponding function circuit diagram for the bus core BUS_H.

In this case, the example according to FIG. 40 relates to a corresponding potential specification onto the core BUS_L and the example according to FIG. 41 relates to that onto the core BUS_H, in each case only essential elements being illustrated in an implementation which is possible by way of example. In particular, elements are omitted which prevent regulation when, for example, potential conditions are present which do not allow energization of a bus core under an offset. Insofar as mutually corresponding parts of the functionality could be attributed to the block 199, they are distinguished from one another in a core-specific manner by the letters L or H in this case, too.

An essential element common to both examples is a Sample & Hold circuit 2010L and 2010H connected between supply terminals GND and, for example, $V_T$ or VBATT.

The Sample & Hold circuit has an input which, for example, is directly connected to the bus core BUS_L and BUS_H, respectively. Furthermore, a pulse-triggering circuit 2011L and 2011H, respectively, is provided, which circuit is edge-triggered preferably by the data signal TxD. It generates a very short sampling pulse SP, which follows the arrowed clock edge within the data bit period and, by way of example here, goes towards GND in the first case and towards $V_T$ or VBATT in the second case. The expedient polarity depends on the technology of the sampler used.

Besides the sampler on the input side, the Sample & Hold circuit 2010L and 2010H additionally comprises a holding element and, if necessary, also impedance conversion means according to the prior art on the output side.

The respective transistors 1303 and 1304 are already switched on by the respective effective active edges of the data signals TxD when the sampling pulse is triggered (positive masking). By virtue of this measure, the regulating circuit from the output of the controllable offset source QSL, QSH, via the output stage transistor 1301, 1302 and also the diode DL, DH, and the protective resistor DL and DH, respectively, as far as the input of the Sample & Hold circuit, is closed a short time later, at the instant of sampling, via the switched-on transistor 1303, 1304.

The sampled variable outputs by the Sample & Hold circuit 2010L, 2010H, and the desired value specification from the D/A converter 199.2L, 199.2H are fed via connections to the offset source $Q_{SL}$, $Q_{SH}$ for the purpose of setting the latter. By means of an ENA and an NENA signal at the activation input of the pulse-triggering circuit 2011L, 2011H and a deactivation input of the offset source $Q_{SL}$, $Q_{SH}$, the latter can be driven for the purpose of a short circuit with respect to ground GND and with respect to the busbar $V_T$ or VBATT; and the sampling pulse generation in 2011L, 2011H can be inhibited. In this state, the affected offset source $Q_{SL}$ or $Q_{SH}$ is then inactive.

It goes without saying that within the scope of the invention, the example according to FIG. 41 can, as already shown above, also be extended to two corresponding sources $Q_{SH}$ and $Q_{SHH}$. Alternatively, it is possible to provide a backup supply source $Q_{VCC}$, that replaces these. It is also possible to design both examples optionally for alternate or simultaneous operability.

Figure 42:
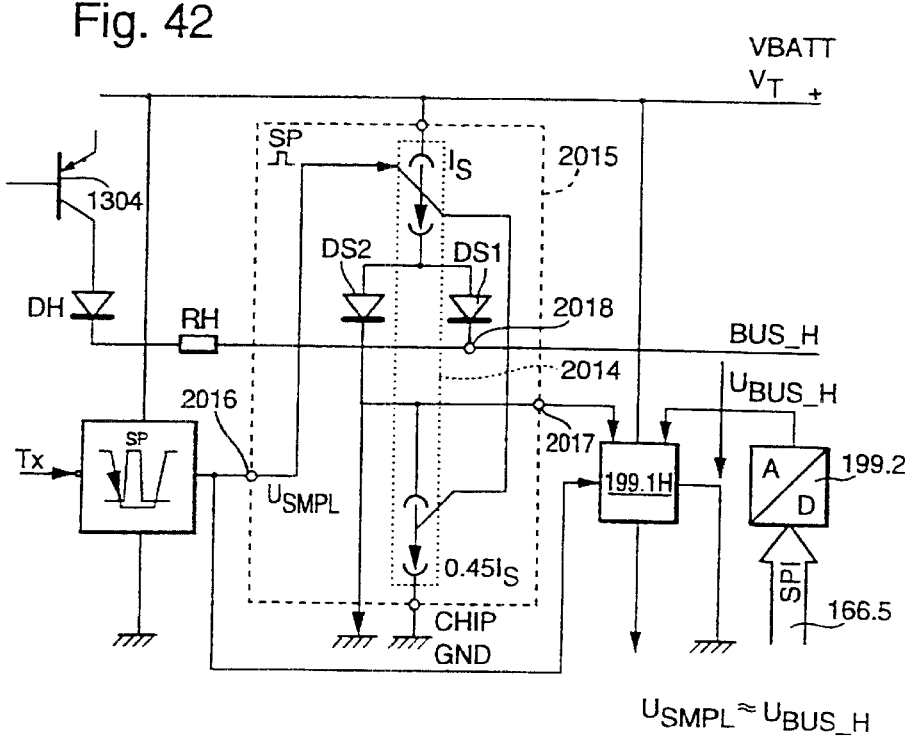
FIG. 42 shows a function circuit diagram of a sampler which can be used in the developments according to FIGS. 40 & 41, requires no fault compensation and can be integrated very easily, with a hdd regulator connected.

FIG. 42 illustrates a sampler 2015 which is suitable for these purposes—in this case, for example, wired up for the bus core BUS_H—which can be realized in a particularly simple and accurate manner monolithically, for example.

The sampler preferably uses a complementary-balanced current source structure 2014, sample-pulsed at the input 2016, in the 20/9 pitch design as well as a sampling diode DS1, connected at node 2018 to the bus core BUS_H. A compensation diode DS2 is connected to the input of a holding regulator 199H, and has an impressed, mandatory forward current ratio of 0.55 to 0.45. Since the required current $I_S$ is very small and is actually sampled only in the test mode (and corresponding controlled current source structures 2015 can be designed monolithically with a low intrinsic current consumption), special driving arrangements and/or current enabling means for power-saving purposes are superfluous.

The sampling diode DS1 fulfils an important protection function for the downstream-connected regulator in the event of a short circuit with respect to the potential UBATT or the application of an even higher interference voltage to the bus core BUS_H. With a suitable monolithic realization of the diodes DS1 and DS2 in accordance with the bus core protective diode DH, the sampling voltage at the output 2017 is near to the actual core voltage $U_{BUS\_H}$ when the output stage transistor 1304 is in the on state. As a result, the residual error smaller than the practical resolution gradation of D/A converters 199.2 of relevance in this case is obviated.

The current source structure 2014, including the two diode paths DS1 and DS2, can be integrated to be small, of low capacitance and balanced with respect to a sampling nucleus 2015 which has only two further terminals 2016 and 2017 in addition to terminals VBATT or $V_T$ and GND for its power supply and the bus core node 2018. In the case of only small sampling currents of the kind that are of interest in the present case, and with appropriate account being taken in the monolithic design, it is possible to realize reciprocal compensation of rectified voltages in the cell 2015. Thus, in spite of a rapid reaction of this sampler (and hence of possible regulation as well) to DC voltage changes at the bus coupling node 2018, it is also possible to achieve a relatively high signal-to-noise ratio with respect to radio-frequency interference on the bus core (EMC).

Although an unavoidable error voltage is produced in this case, too, it is advantageously compensated for at the same location and in the same monolithic structure in which it is necessarily caused, whilst utilizing exactly the same physical principle of action underlying its genesis.

Thermal invariance of the fault compensation also follows from this, which thermal invariance can be realized within wide limits. For these reasons, it is possible to dispense with any compensation assistance from the circuit 200 or even loading the microcontroller 21 for the purpose of computational compensation.

The insulation function (explained in connection with FIG. 7 and FIG. 23) of the circuit 200 for the sensitive microcontroller 21 is not violated in this way. Of course, the sampler described also constitutes no restriction at all to the invention; rather, the invention also incorporates within its scope other solutions for realizing both reverse insulation against overvoltages on a bus core and corresponding offset voltage compensation.

Figure 43:
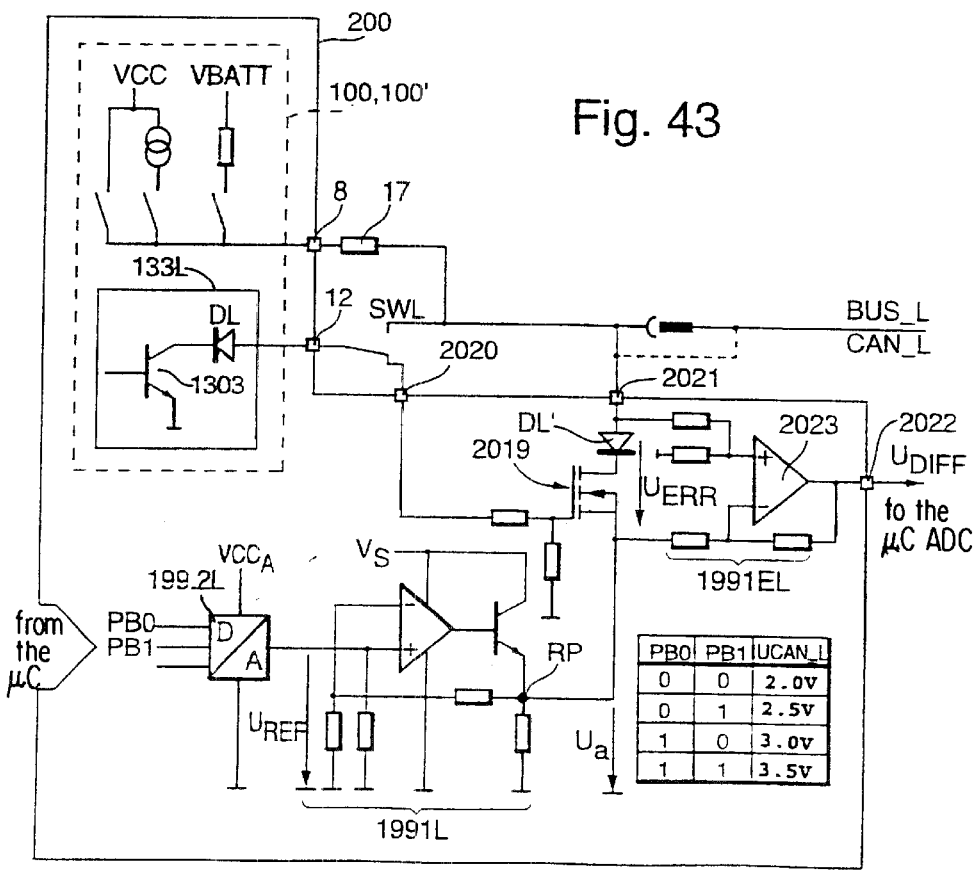
FIG. 43 is a schematic diagram of an alternative circuit which allows direct regulation on the bus core BUS_L of a keying potential to be dominantly impressed thereon and, at the same time, uses the external microcontroller for fault compensation.

The exemplary embodiment according to FIG. 43 fulfils a different application, in which a powerful microcontroller cooperates with the circuit, the utilization of its computing power and corresponding utilization of the digital path 166.5, do not have a disturbing consequence, or it is not possible to integrate a sampler which affords protection in the sense above and has physical fault voltage compensation, as shown in FIG. 42 or the like, in the circuit 200.

In this exemplary embodiment for the bus core BUS_L, the actual core output stage 133L is utilized not for the purpose of feeding in the desired core potential but rather only as a driver stage for driving a backup switch 2019 which affords backup feeding and, for its part, is connected to the bus core BUS_L by a separate protective diode DL'. The current flowing away into the bus from the dominant feeding potential therefore takes an entirely different route in this case, namely from the regulating point RP at the output of the core potential regulator 1991L via the switching path of the transistor 2019 and the protective diode DL'. In order to make this possible, a low-resistance changeover switch SWL is provided which can be activated into the switching state shown for the duration of corresponding potential tests.

A D/A converter 199.2L supplies the regulator 1991L with a desired value for the voltage to be set at the regulating point RP. The fault voltage $U_{ERR}$ dropped across the elements 2019 and DL' due to the flow of current is detected by a further amplifier 2023, which is wired up to form a measurement amplifier 1991EL. The corresponding analog output voltage $U_{Diff}$ is fed to an A/D input of the microcontroller 21 in FIG. 7 and/or 23.

The microcontroller 21 can thus calculate the value of the bus core voltage from the digitally converted fault voltage $U_{Diff}$ and the present digital desired value specification for the D/A converter 199.2, at a resolution which is predetermined by the stepped nature of the D/A converter 199.2L. The regulator 1991L preferably operates in conjunction with the compensation of the fault voltage $U_{ERR}$ with regard to the bus core BUS_L, to provide a current-limited voltage source having a maximum current of 200 mA, the feeding source voltage breaking down when the said maximum current is reached.

Apart from the terminal 2022 for the analog output of the amplifier 2023, further terminals 2020 and 2021 are required on the circuit 200 when the changeover switch SWL is realized outside the circuit 200. The means for corresponding connection to the bus core BUS_H correspond to those described above.

Figure 44:
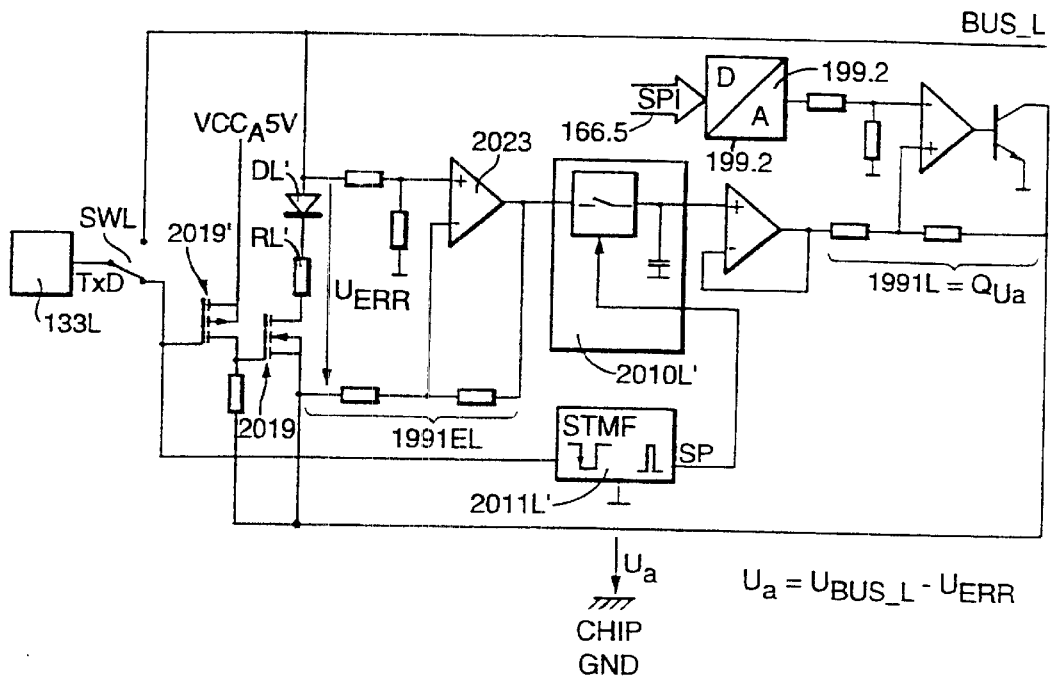
FIG. 44 shows a modification of the circuit according to FIG. 43 which, by means of a sample-&-hold device, makes it possible to dispense with a microcontroller for the purpose of compensation, applicable to the bus core BUS_L.

The exemplary embodiment according to FIG. 44 avoids the first-mentioned terminal and the compensation path via the micro-controller in that, by means of a Sample & Hold circuit 2010L', it samples and holds the abovementioned output voltage of the measurement amplifier 1991EL rather than the core voltage $U_{BUS-L}$. A sampling pulse SP which is interlinked with the data signal TxD, and is generated after the active edge of the latter is applied to the said Sample & Hold circuit by a pulse-triggering circuit 2011L'. Without restricting the generality of the invention, this may be an edge-triggered monostable multivibrator STMF.

The error quantity which corresponds to the error voltage $U_{ERR}$ and is held by 2010L' is fed forward to the core potential regulator 1991L as an interference quantity and accounted in analog form in order, in this way, to obtain, within the scope of the resolution of the D/A converter 1992L, a core voltage $U_{BUS-L}$/corresponding to the quantity which is predetermined on the digital path 166.5, as a sum of the regulator output voltage $U_a$ and the respective fault voltage $U_{ERR}$.

Figure 45:
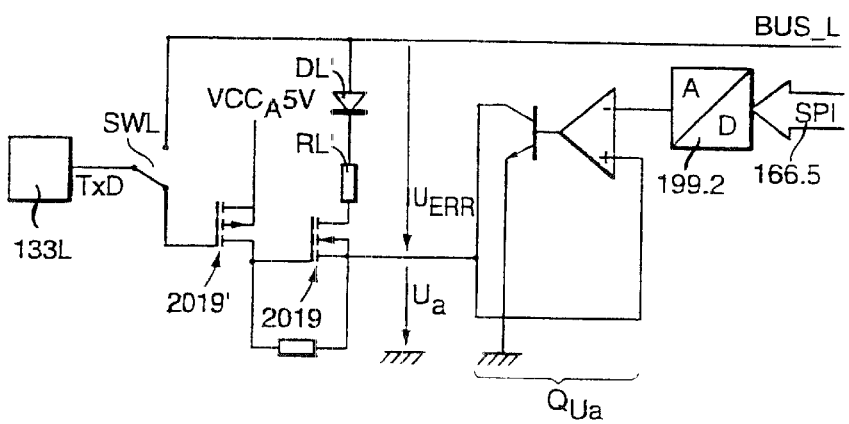
FIG. 45 shows a schematic diagram of alternative for feeding onto the bus core BUS_L a source potential having a variable offset with respect to the normal dominant potential.

The same also applies correspondingly to the exemplary embodiment according to FIG. 45, which entirely dispenses with detection of the fault voltage $U_{ERR}$ and accounts for the latter by taking a fixed additional offset value into consideration in the desired value specification via the digital path 166.5 from the microcontroller 21. In this respect, this exemplary embodiment is based on the principle which is already known from the examples in accordance with FIGS. 29–33 and 36–39.

FIG. 46 illustrates, by way of example, a reception block 120' as part of the transceiver 100/100' not only for reception purposes but also for verification of communications errors; for example, also as a consequence of reference-ground potential faults of the electronic unit containing this reception block, in conjunction with previously described functionalities of the block 199 and cooperative level-shifting features of the output stage 133 in the transceiver 100/100'.

The reception block 120' comprises a front end 121 of analog action, a digital evaluation logic arrangement 128 and a read-out and control logic arrangement 129.

The front end (LEVEL DISCRIMINATING SECTION) comprises three analog level discriminators 121.1 to 121.3. These discriminators are preferably designed as comparators and generate, by analog comparison of the bus line levels with regard to one another and also to a reference potential VREF, signal levels and edges which can be further processed digitally.

The evaluation logic arrangement (PROCESSING & ANALYSING SECTION) contains a circuit function 122' which, on the one hand, recovers the serial bus information RxD as digitally normalized bit stream from the defined signal levels and edges and, on the other hand, can identify bus faults in a line core-dependent manner. For this purpose, the circuit function 122' is also designed for single-wire reception (across GND).

In this context, the evaluation logic arrangement 128 may comprise digital circuit functions 123H and 123L, which permit an error signal, indicative respectively of the assigned bus core BUS_H/CAN_H or BUS_L/CAN_L, to be output when a presettable number of directly or actually successive bit errors is reached or exceeded (bit error depth discriminator or bit fault accumulation discriminator). For this purpose, the circuit functions 123H and 123L are multiply connected to the circuit function 122'.

The read-out and control logic arrangement (READOUT & ONCHIP CONTROL) comprises a functionality which is combined to form a control interface 124 and, at least partially, may also be part of the digital SPI interface 166 in accordance with FIGS. 6, 16 & 26 or be combined therewith, as well as preferably at least two storage cells 127H and 127L with set inputs 127H1 and 127L1, reset inputs 127H2 and 127L2, and state outputs 127H3 and 127L3. Within the overall circuit, these elements may, in terms of circuit topology, also be part of a larger error memory, for instance in connection with an EEPROM 35 in FIGS. 5, 7, 9, 10 and 23.

By way of example, the reset inputs 127H2 and 127L2 and also the state outputs 127H3 and 127L3 of the discrete storage cells 127H and 127L are connected to the control interface 124/166. An error signal can be applied to the set input 127H1 from the circuit function 123H. An error signal can be applied to the set input 127L1 from the circuit function 123L. Connections 126H and 126L enable setting information with regard to the bit error depth to be discriminated and, with regard to the bit error number to be accumulated as well as to the selection of these two methods of discrimination, to be transferred from the control interface 124/166 to the circuit functions 123H and 123L, respectively. Connections 125 enable setting information to be transferred from the control interface 124/166 to the circuit function 122', which may also contain, inter alia, at least one storage or shift and/or counting register.

Optionally, the control interface may furthermore be operatively connected to means 170.2 for slew-rate influencing in the front end 121 and in the evaluation logic arrangement 128. It is then preferably also capable of communication via the SPI bus 166.5 with the surroundings of the reception block 120'.

The slew-rate influencing can assist analyses of core-specific bit faults both in interaction with the previously described functionalities of the offset and bus test manager 199 and the cooperative level-shifting features of the output stage 133 in the transceiver 100/100' and in the event of capacitive disturbances in the bus network, or communications interference on account of electromagnetic interference effects on the bus network or a bus subscriber.

Such a reception block 120' of a transceiver 100' can support error analyses under SPI control, in addition to its normal bus reception function under suitable bus management software, in a bus line-specific manner.

In conjunction with previously described functionalities of the offset and bus test manager 199 and cooperative level-shifting features of the output stage 133, this reception block 120' can expand the overall functionality of the semiconductor circuit 200, namely also in respect of monitoring and diagnosis functions with regard to the determination of bus subscribers with reference-ground-potential-fault-based communications interference. In this context, the said reception block can be understood and operated as part of a test system resolved throughout the bus, which system relies, in terms of hardware, at least on a plurality of correspondingly equipped transceivers in the bus network.

This exemplary embodiment must not, under any circumstances, be understood as a restriction of the invention. Rather, the reception block 120', in particular with regard to its sections 128 and 129, can also be structured differently or at those locations comprise function blocks which differ from the present exemplary embodiment, in order overall to realize the discrimination features described.

Figure 47:
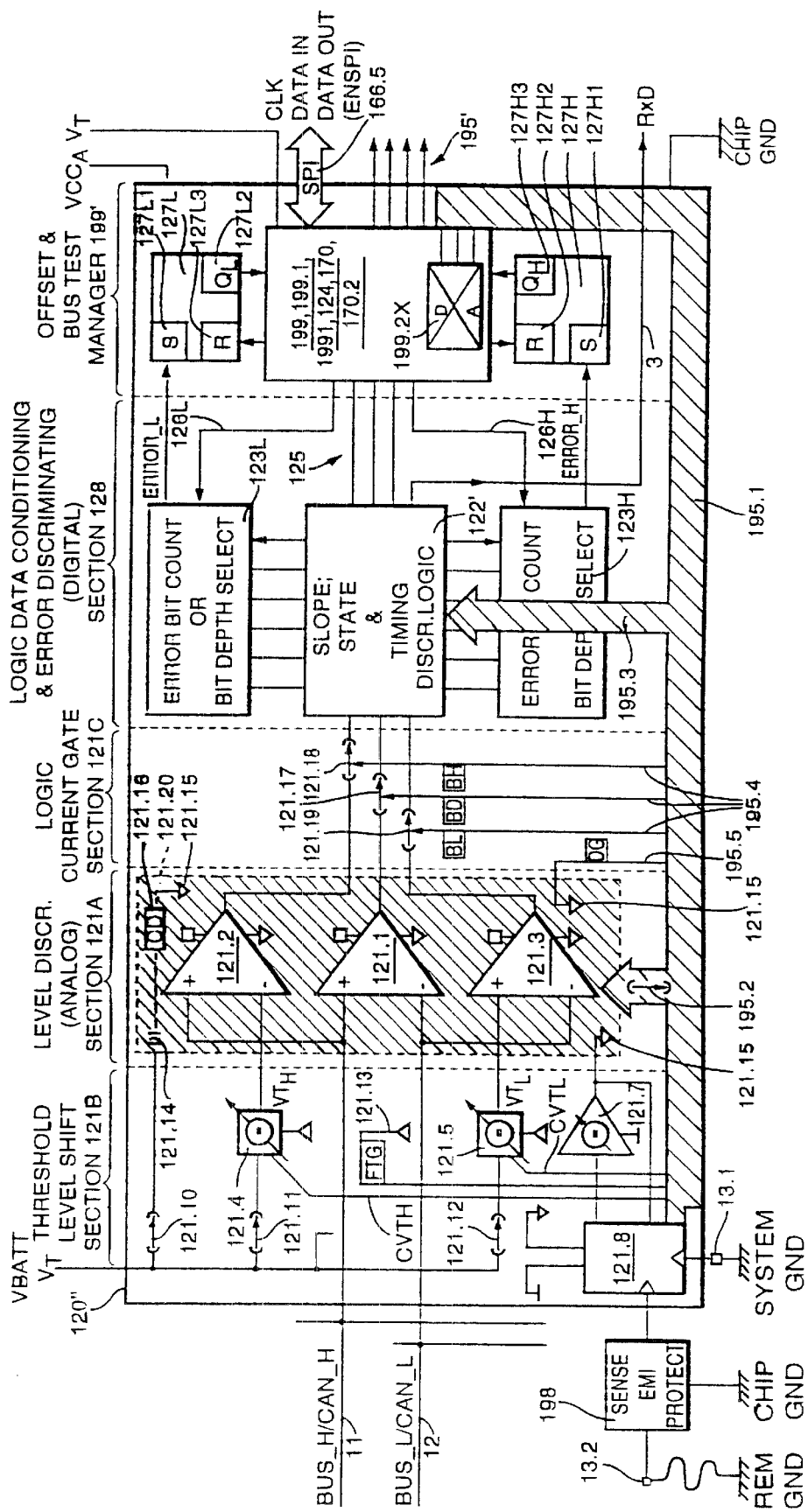
FIG. 47 shows a function block diagram of a developed reception block within a bus transceiver which is equipped with further developed means for the analysis of faults and for the testing of other bus subscribers in cooperation with transmitting means of the circuits.

Even more comprehensive support of error analyses in the presence of inexact bus levels is possible with a reception block 120" which is developed further in accordance with FIG. 47. Like the block described previously, it affords a normal two-wire and single-wire reception function. Under the control of suitable diagnostic software, it cooperates with functionalities of an offset and bus test manager 199', (in this case assigned to the block 120", by way of example), and the above-described level-shifting features of the output stage 133, to support analyses of reference-ground potential faults, bus levels and bus windows, in an active manner.

In this case, the reception block 120" likewise comprises an analog level detection section 121A, a threshold value specification and shift section 121B, a logic current coupling section 121C, a digital evaluation logic arrangement 128A and the said offset and bus test manager 199' (which in this case has a functionality which is pitched further than in the case of offset influencing only at the transmitting end).

The level detection section (LEVEL DISCRIMINATING SECTION) comprises three analog level discriminators 121.1 to 121.3, which are preferably designed as comparators.

The comparator 121.1 generates a first digital output signal by comparing the two bus-line levels with reference to one another. The comparator 121.2 generates a second digital output signal by comparing the level of the bus core BUS_H/CAN_H with a first threshold value voltage $VT_H$ of a first threshold value source 121.4. The comparator 121.3 generates a third digital output signal by comparing the level of the bus core BUS_L/CAN_L with a second threshold value voltage $VT_L$ of a second threshold value source 121.5. All three comparators generate signal levels and edges which can be further processed digitally.

In contrast to FIG. 46, the discriminators 121.1 to 121.3 are electrically "raised" together with their respective supply terminals of lower and higher potential relative to the chip substrate. (That is, they can "float".) This is ensured by a particular monolithic construction and insulation in the structure of the semiconductor chip and also by the fact that their respective supply terminals of lower potential (indicated by triangles with the vertex facing downwards in the figure) and of higher potential (indicated by squares in the figure) are directly electrically interconnected. This unit has a hatched underlay in the figure and is designated by 121.20. The terminals marked by squares are thus connected to a supply terminal 121.14 (assumed to be more positive in this case) and the terminals marked by a triangle with the vertex pointing downwards are connected to, by way of example, three supply terminals 121.15 (which are in this case assumed to be more negative and are interconnected). In order to ensure that the comparators have a constant supply voltage, the structure 121.20 in this case also comprises, by way of example, a voltage clamp or a regulator 121.16, which is connected between the supply terminals 121.14 and 121.15 and, by way of example, can be supplied from one of the potentials VBATT or $V_T$ via a current source 121.10.

The threshold value specification and shift section (THRESHOLD LEVEL SHIFT SECTION) comprises, by way of example, a first adjustable threshold voltage source 121.4 for a threshold potential $VT_H$ and a second adjustable threshold voltage source 121.5 for a threshold potential $VT_L$. These threshold potentials can be adjusted via corresponding control paths CVTH and CVTL and, in the most general case, similarly to the above-mentioned comparators, can be referred to a dedicated negative reference-ground potential busbar 121.13 (symbolized by triangles with the vertex facing upwards) which can also be raised, if necessary. By way of example, the threshold voltage sources 121.4 and 121.5 are supplied from current sources 121.11 and 121.12. For the purpose of feeding of the latter, feeding of the section 121B from one of the potentials VBATT or $V_T$ can be provided.

Furthermore, this section is assigned an offset source 121.7 which can be correspondingly adjusted by driving and, with its output, feeds preferably the negative supply terminal 121.15 in the section 121A. Hence, given that the supply voltage of the comparators 121.1 to 121.3 is kept constant by the element 121.16, the offset source 121.7 permits the negative supply potential of the said comparators to be raised by a defined offset. For this purpose, this source can be designed as a regulating amplifier whose input is driven by a special block 121.8, to which the output of the regulating amplifier is also fed back. From the circuit terminal 13.1 and/or 13.2, the function block 121.8 can be fed ground potential from the unit in which the circuit is used and/or from a reference-ground potential in the application environment.

The function block 121.8 is connected to the offset and bus test manager 199' via the control path 195.1. From the block 121.8, the offset source 121.7 can be switched on and off, if required can also be short-circuited via the path 195.5 and can be driven with a desired value specification which is obtained from the function block 199' via the control path 195.1.

Figure 48:
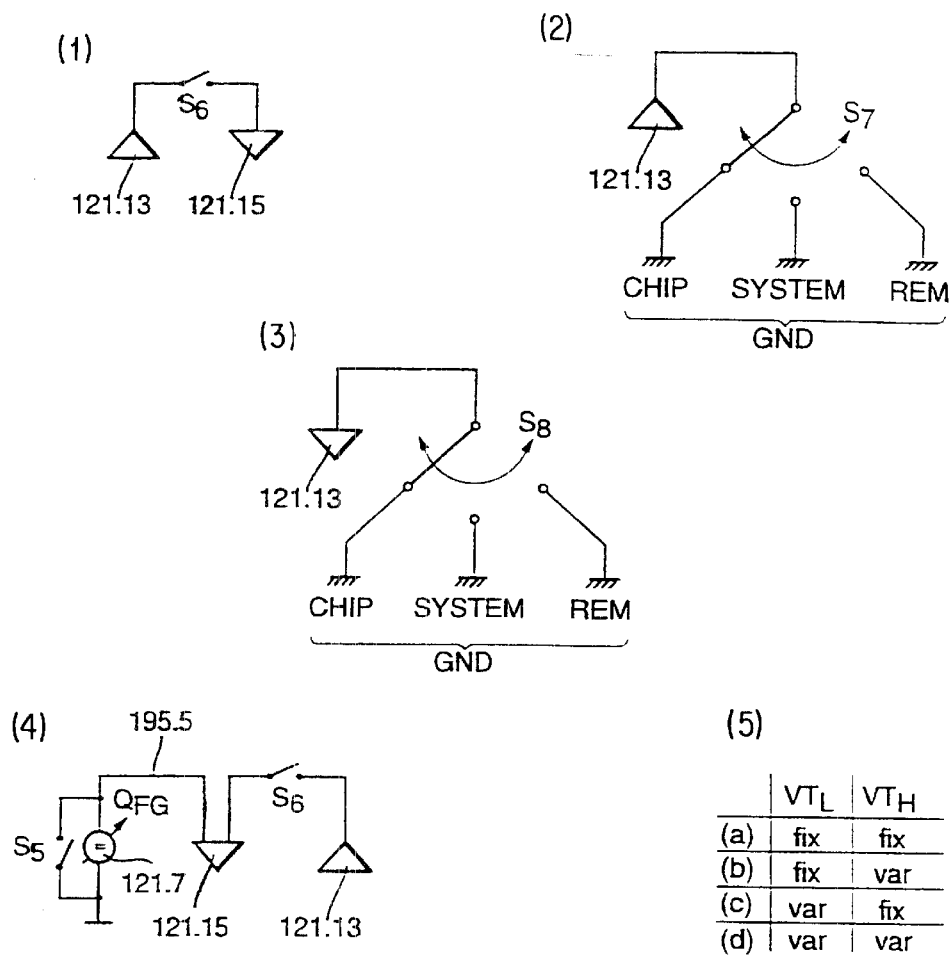
FIG. 48 is a schematic diagram of part of FIG. 47.

A further function of the block 121.8 consists in the selection of ground and reference-ground potentials. Without restricting the generality of the invention, an exemplary functionality of the block is illustrated in FIG. 48. Depending on the degree of construction of the features in a practical circuit, not all the selection possibilities need be constructed at the same time. In addition, only a few of them can be available selected by one-time programming, which will be discussed further below. In this respect, therefore, the block 121.8 comprises means which, in accordance with their driving via the path 195.1, in effect can enable the potential references illustrated in the figure for the reception block 120". In this context, the block 121.8 may comprise controllable analog switching and selector paths $S_5$ to $S_8$. Furthermore, there may be means enabling these paths to be switched off and on or changed over, as required, from the block 199' by means of software by the microcontroller for calibration purposes.

The outputs of the comparators 121.1 to 121.3 are preferably connected via logic current paths 121.17, 121.18 and 121.19 to an evaluation logic arrangement 128. In this case, the current paths may be able to be connected via status lines 121.17 (BD), 121.18 (BH) and 121.19 (BL) in the sense of a signal interruption, in order to enable selective signal interruptions.

The evaluation logic arrangement (LOGIC DATA CONDITIONING & ERROR DISCRIMINATING SECTION) contains a circuit function 122' which may essentially correspond to the circuit function 122 in FIG. 46 and fulfil the functions already described in that case and is designed for two-wire and single-wire reception (across GND). Here, too, the elements 123L and 123H may also be especially designed in particular for fault analyses in the two-wire mode.

Integrated in the offset and bus test manager 199' which is connected thereto, by way of example, are functions of the corresponding block 199 which have already been described in accordance with FIG. 28, by way of example, together with circuit functions 124, 170 and 170.2 from FIGS. 4 and 46. The storage cells 127H and 127L may in this case be constructed as part of a larger register contained in the block 199' for buffer-storage of SPI data. It may also equally well be a component of at least part of an fault memory in connection with an EEPROM 35 according to FIGS. 5, 7, 9, 10 and 23, which may be assigned to the block 199'.

The control path 195.1 is a multiple control path and, as such, in a practical circuit, may also comprise analog and digital functional elements distributed to a greater or lesser extent, which match the block 199' to different driving requirements. By way of example, it may be necessary to drive the fixed voltage logic arrangement (supplied from the potential $VCC_A$) of the section 128 via the control path 195.3 differently from the logic current paths 121.17 to 121.19 via current paths 195.4, the threshold value offset sources 121.4 and 121.5 or (for the purpose of slew-rate influencing via the path 195.2) the "floating" level discrimination section 121.20.

Furthermore, switching and control paths 195' lead from the block 199' to the transmission output stage 133 or to offset sources $Q_{SL}$, $Q_{SH}$ and/or $Q_{SHH}$ which are effective in the case of transmission. As central element, the block 199' having communications capability via the digital path 166.5 comprises conversion means 199.2X for converting digital signals into analog signals. In that case, however, the invention also includes the opposite conversion direction. In the latter case, depending on the design of the control path 195.1, parts of such a conversion path may also be displaced upstream into the block 121.8, cf. FIG. 53.

Without restricting the invention, the block 199' can thus unite in itself functionalities which are concerned with both i) the acquisition of faults signals (as a result of faults checks under offset conditions which are caused by faults or generated for the sake of testing), and ii) with the influencing of the receiving and/or transmitting means, in order thereby either to search for, find and set correspondingly "abnormal" transmission and reception conditions in an observational subscriber (in which a semiconductor circuit 200 configured in this way is situated) for the purpose of reestablishing communications capability with another bus subscriber that has been lost beforehand due to a potential fault, or to operate the receiving and/or transmitting means under diagnostic software after the manner of a "test receiver" and/or "test transmitter".

Such a reception block 120", as part of the transceiver 100' can, in conjunction with previously described functionalities of an offset and bus test manager 199' and cooperative level-shifting features of the output stage 133, support far reaching error analyses under SPI control by means of a microcontroller. In this case, depending on the test objective, it may suffice to construct only entirely specific apparatus features or—if constructed—to be able to activate such features. A number of possibilities are set forth by way of example in FIGS. 49–52.

Figure 49:
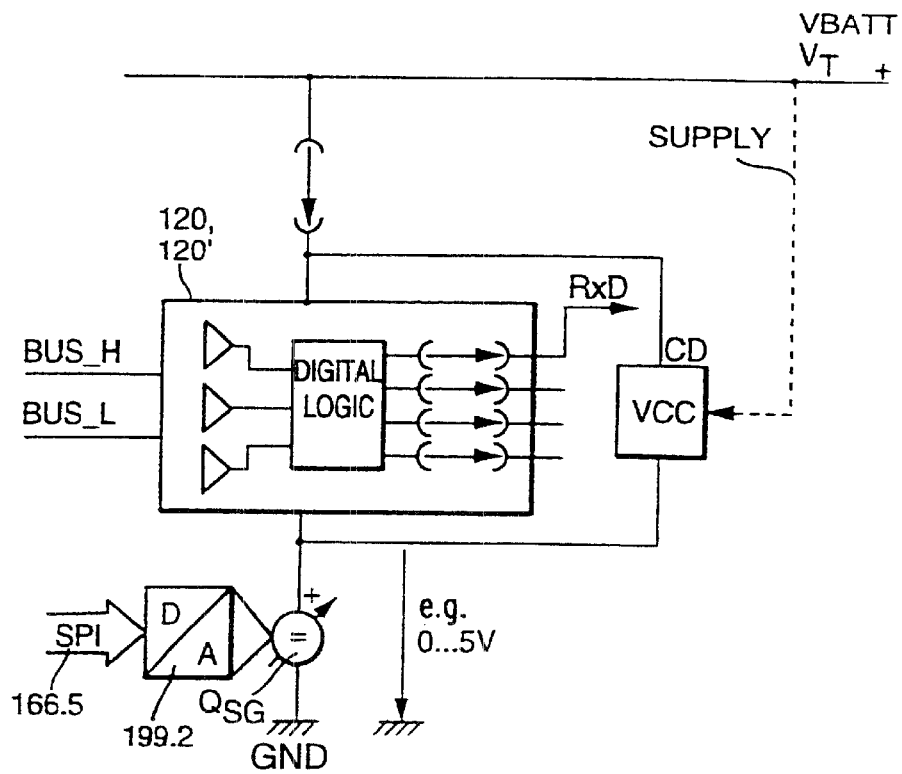
FIG. 49 shows a first block circuit diagram, reduced for a particular application, of additional means in accordance with FIG. 28 and FIG. 47, relating to the receiving end of a bus transceiver.

In accordance with FIG. 49, the entire reception block 120', 120", which is constantly supplied with a voltage VCC by dint of a voltage clamp or regulator CD, can be raised by 0 ... 5 volts, according to an offset source $Q_{SG}$. In this case, the threshold voltages $VT_H$ and $VT_L$ within the reception block may be fixed, switchable to network-specifically defined, fixed "deviation values", or variable, which corresponds, for example, to case (4) in FIG. 48 with switch $S_6$ closed. The corresponding setting signals CVTH and CVTL can then also be realized by current signals, for example. This example constitutes a modification of the example according to FIG. 47 insofar as in this case a digital evaluation arrangement which concomitantly floats together with the input comparators is taken as a basis and, for its part, is then connected, in terms of signal flow, on the output side via logic current paths to the circuit surroundings.

Figure 50:
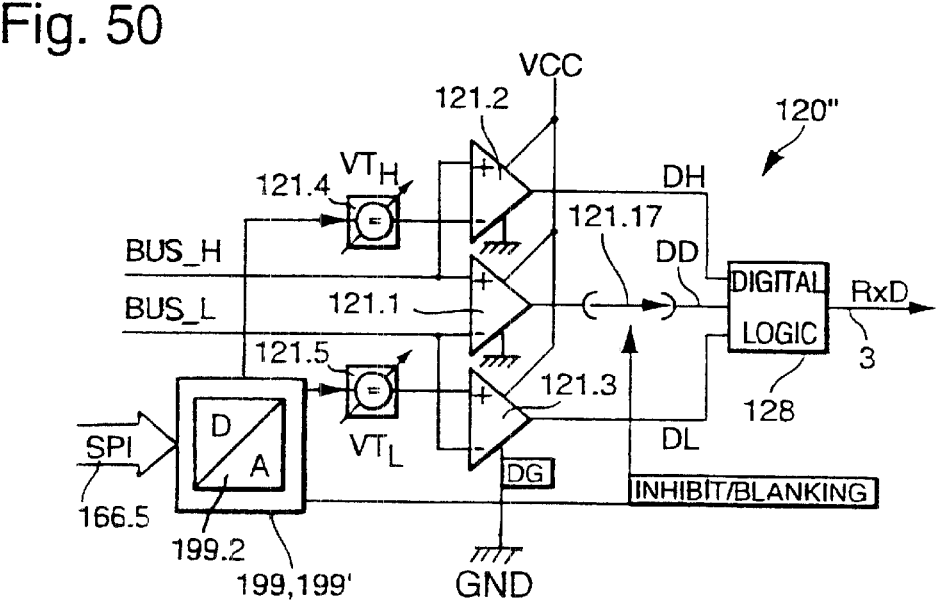
FIG. 50 shows a second block circuit diagram, reduced for particular application purposes, of additional means in accordance with FIG. 28 and FIG. 47, relating to the receiving end of a bus transceiver.

According to FIG. 50, the negative supply terminal DG is connected to ground GND. In other words, it has, for example, potential of the chip GND. Only the threshold voltage sources for the comparators 121.2 and 121.3 are set in accordance with test requirements or given an underlying offset. For this purpose, the digital path 121.17 between the comparator 121.1 and the evaluation logic arrangement 128 can be interrupted, as required, corresponding to 121.17 and BD 195.4 in FIG. 47.

Figure 51:
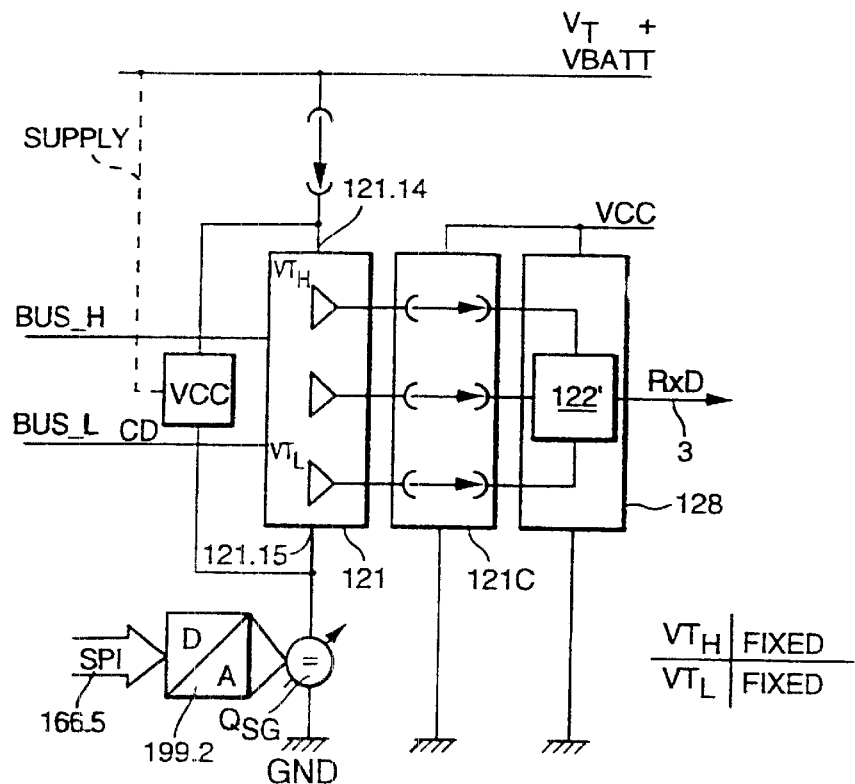
FIG. 51 shows a third block circuit diagram, reduced for particular application purposes, of additional means in accordance with FIG. 28 and FIG. 47, relating to the receiving end of a bus transceiver.

The example according to FIG. 51 corresponds to the example according to FIG. 47 for the specific case according to FIG. 48 (1) and (5) (a), where the threshold voltages $VT_H$ and $VT_L$ are invariable predetermined quantities, and can thus be shifted jointly with respect to ground potential by overall raising of the discrimination section 121.20, of analog action, by means of a reference point offset source $Q_{SG}$.

FIG. 52 reveals a configuration which suffices for ground potential fault analyses. In this configuration, the supply terminals both of the discrimination section 121.20 of analog action and of the transmission output stage 133 are supplied from one and the same voltage clamp or voltage regulator, and can be raised together by means of a reference point offset source $Q_{SG}$ above a potential GND. Current paths affording, both at the transmitting and at the receiving end, a correspondingly flexible potential connection of the digital signals TxD and DH, DD and DL are likewise indicated, as is the abovementioned store 142' for making possible inhibiting of the output stage 133 (no bus access).

Figure 53:
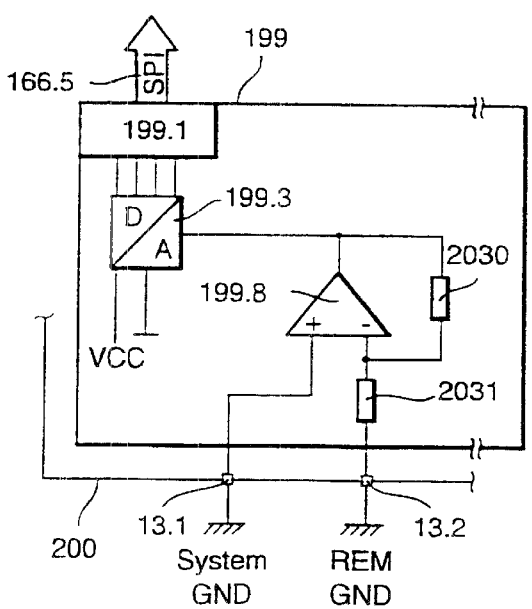
FIG. 53 shows a schematic circuit diagram of a development detail for the acquisition and transmission of a reference-ground potential difference to an external microcontroller.

The exemplary embodiment according to FIG. 53 illustrates a circuit diagram for optimally furnishing the function block 199' as already mentioned in connection with FIGS. 32 and 47. What is involved in this case is a measurement amplifier 199.8, which is wired up for a defined gain with resistors 2030 and 2031 and whose output feeds means 199.3 for analog/digital conversion. These means are connected to the logic arrangement 199.1, which acts as an interface to the SPI path 166.5, and thus allow for the difference for example between System GND and REM GND (acquired in analog form) to be communicated digitally to the microcontroller. As already mentioned, these elements can equally well be assigned to the block 121.8 in FIG. 47.

All of the exemplary embodiments which have been explained up to this point rely on at least one D/A converter which provides an analog desired value in accordance with data received via the digital path 166.5.

Figure 54:
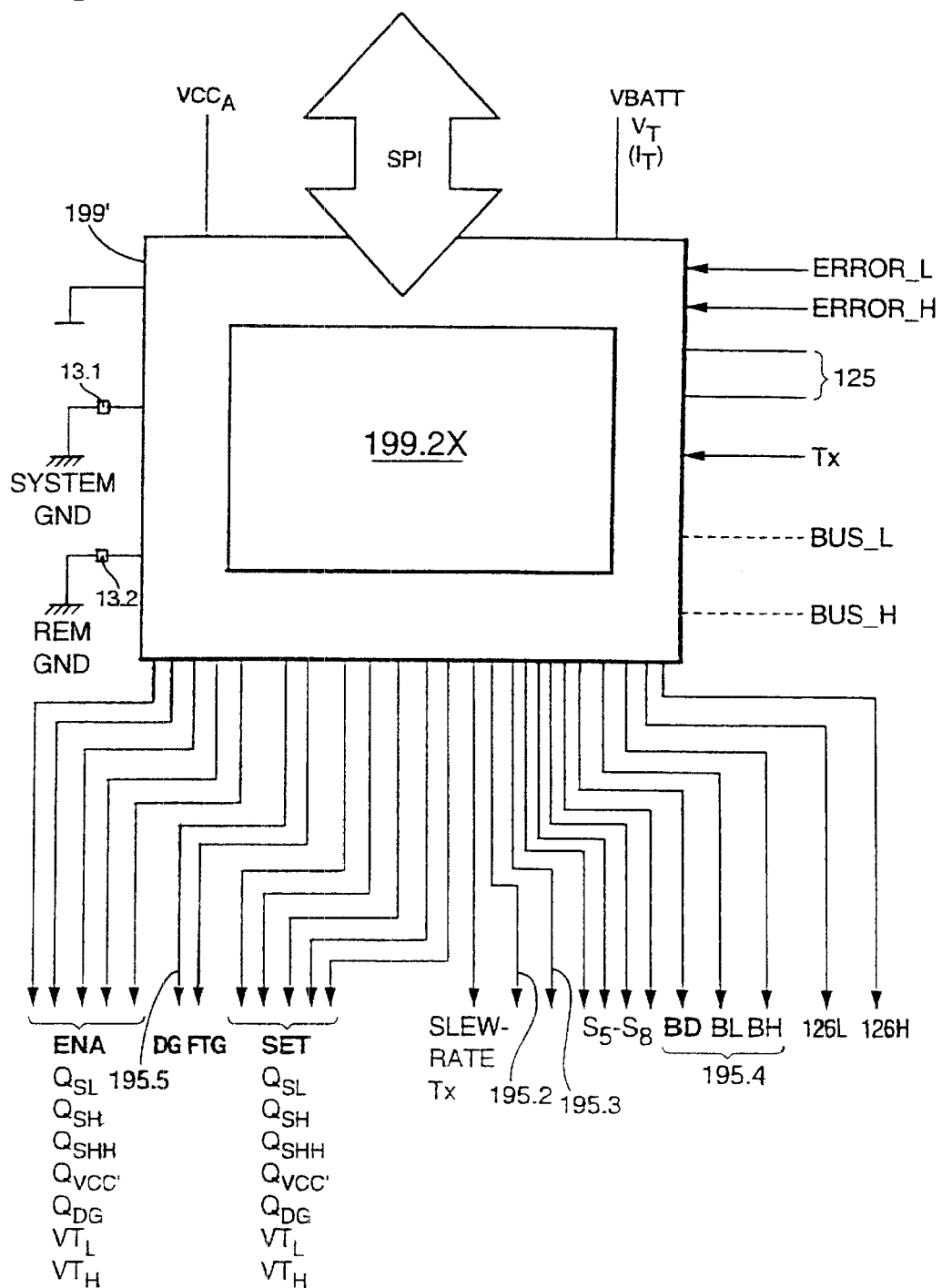
FIG. 54 shows a schematic illustration of a central element within the block function 199 in FIG. 28 or 199' in FIG. 47 which generates all the control signals and value specifications for the potential-specific influencing of the transmitting and receiving means of the transceiver.

According to FIG. 54, the scope of the invention furthermore encompasses the following: all the desired value specifications and activation commands f or offset sources as are required for practical bus test routines are generated in the semiconductor circuit 200 itself, by a central circuit function 199.2X which is an essential part of a correspondingly expanded functionality 199', as already indicated in FIG. 47. Within the scope of this functionality, it is optionally possible also to take account of a voltage difference between the terminals Chip or System GND 13 or 13.1 and REM GND 13.2. Furthermore, the capability of measuring the bus core voltages may be intrinsic to this functionality. Within the scope of the invention, therefore, it is provided that a corresponding function block 199.2X (resolved to a greater or lesser extent in a practical circuit) substitutes, in particular, for all the D/A converters in the exemplary embodiments which have been described up to this point. In this manner, it is possible, under specific software for auto-diagnosis of a bus network having many subscribers, to satisfy all the requirements of ramping and squeezing of communications level windows in terms of transmission and reception.

Figure 29:
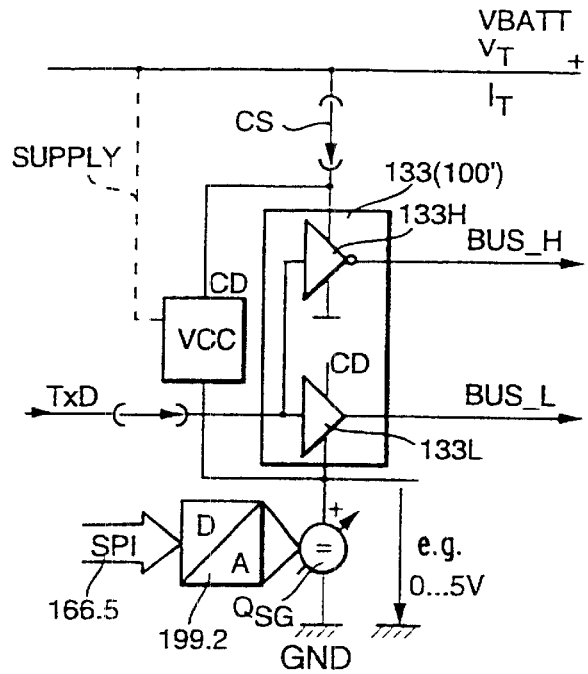
FIG. 29 shows a first simplified block circuit diagram of additional means according to FIG. 28, relating to the transmitting end of the transceiver function.

This function block may therefore be configured in such a way that, as illustrated in FIG. 54, it can provide, inter alia, (1) at least one of the ENAble signals for activating and inhibiting offset sources (effective in terms of transmission and reception) $Q_{SG}$ in accordance with FIG. 29; $Q_{SL}$, $Q_{SH}$, $Q_{SHH}$, $Q_{VCC}$, in accordance with FIGS. 30 & 31 & 32 & 33; 121.7/$Q_{DG}$, 121.4/$VT_H$ and 121.5/$VT_L$ in accordance with FIG. 47, (2) at least one of the desired value specifications or setting values, deviating from bus-specific standard values, for $Q_{SG}$ in accordance with FIG. 29; $Q_{SL}$, $Q_{SH}$, $Q_{SHH}$, $Q_{VCC}$ in accordance with FIGS. 30 & 31 & 32 & 33; 121.7/$Q_{DG}$, 121.4/$VT_H$ and 121.5/$VT_L$ in accordance with FIG. 47, (3) at least one setting or switching signal for influencing the slew rate at the transmitting end (170.3 in accordance with FIG. 4) and/or for influencing the receiver-end evaluation of bus core-specific reference signals for controllable logic paths (121.17 [Blanking Differential BD], 121.18 [Blanking High BH], 121.19 [Blanking Low BL] in accordance with FIG. 47) and/or reception fault discrimination (126L [L_Error Detection Format], 126H [H_Error Detection Format]) and/or slew-rate adaptation (195.2 in conjunction with 170.2 [Set Slew Rate], 195.3 [Slope and/or Timing to Slew Rate Match] in accordance with FIGS. 4 and 47), (4) at least one setting or switching signal for realizing the switching and/or selector functions $S_5$ to $S_8$ in accordance with FIG. 48.

Such a development of the invention makes it possible to influence, without any restrictions, the bus levels which can be discriminated by the bus receiver, either alternatively or simultaneously. Furthermore, this functionality covers all influencings at the transmitting end, at the receiving end or at the transmitting and receiving ends in combination, as described.

In any case, a practically realized functionality of the block 199, 199' can comprise both linear amplifier means and digital/analog or analog/digital converters, and also a dedicated reference voltage source, which can be supplied either by the output 20.2.2 or from the potential $V_T$ or the potential VBATT (197 or 194). In this case, it is possible to realize the digital/analog and/or analog/digital converters such that they are connected via the interface logic arrangement 199.1 (having the function of an interface—more or less closely to, for example, the interface 166).

Network management or diagnostic software can utilize these hardware details, on the one hand, to bring about deliberate faulty communication (that is to say within an actually defective level window) of a control unit equipped with the chip 200 with an individual bus subscriber (namely one with a ground fault as described above) and to identify it in this way; and on the other hand, for the purpose of verification, to successively preclude bus subscribers not having a ground fault from normal communication. In this context, the capability, mentioned above in connection with FIGS. 25 & 26 & 52, of interrupting the transmission access in the RECEIVE ONLY mode can, in all the bus subscribers not afflicted by a fault, be advantageously utilized to blank bus level influencing due to the flowing in of potential onto the bus from other bus subscribers (in the case of a CAN, for example, due to the broadcasting of acknowledge bits or error frames).

The voltage monitoring function (mentioned above in connection with FIG. 3) of the block 110 of the transceiver 100/110' is also realized here, by way of example, to its full extent by the reset/watchdog function 164. In this case as well (depending on the degree to which the individual functions are resolved in a chip design) the output voltages $VCC_U$ and $VCC_A$ can equally well be monitored by a correspondingly expanded block 110, which can also fulfil still other functions for the transceiver 100/100' and be assigned thereto, that is to say also additionally, depending on the requirement.

It is additionally noted at this point with regard to FIGS. 16, 23 and 28 that the optional non-volatile memory area 35' can be utilized in any case, as already detailed in connection with FIG. 7.

Furthermore, this optional memory area can alternatively hold, where applicable, programming data for the overall configuration setting of the circuit 200, which, as explained in the context of the description, then defines in detail the function and effect of the blocks 110, 170.1, 120, 120', 123H, 123L, 170.2, 130, 170.3, 140, 170; 164, 165, 165', 199 and/or the characteristics and effect of the signals ENA/NINH, PWROR; EN, STB, SR, TEST/SRC/SWM, RESET, RESET1, RESET2, INIF, INIF1, INIF2, BUSY, INT to 24.1, INT to 24.2, WUPPH, WUPPL, $t_w$, $t_s$, N, as well as limit value(s), time response(s) and/or truth condition(s) thereof.

Furthermore, there may also be stored in this memory area configurations of the reception block 120" for instance in accordance with FIG. 48 or entirely specific selections of effective circuit functions and/or elements for instance in accordance with FIGS. 29–33 and FIGS. 49–52 in the form of corresponding data.

Corresponding data may also be stored as a closed data record in such a memory. In this context, the circuit may furthermore comprise particular means for memory control which allow the abovementioned data record to be read into the semiconductor circuit 200, after the latter has been installed in a control unit, from another control unit with an already programmed semiconductor circuit 200, and the characteristic function of the circuit to be clonable in this way. For this purpose, the non-volatile memory area 35' can be read and/or overwritten by the microcontroller 21 (which cooperates with the circuit) via the interface 166.

For the programming of the output voltages $VCC_U$, $VCC_A$ and, if appropriate, optionally $V_T$ as well, or for the configuration of the reception block 120" in accordance with one of the possibilities illustrated in FIG. 48, or for the definition for the operation of an entirely specific selection of operable circuit sections for instance in accordance with FIGS. 29–33 and FIGS. 49–52, the semiconductor circuit may equally well comprise means which permit such programming only once.

Such one-time programming can be provided for only one or a plurality of the abovementioned blocks, functions and signals, depending on the specific use of a corresponding electronic unit as circuit carrier. If, for example, the bus system for which such a semiconductor circuit is to be used is fixed in an application-specific manner or wake-up sensors of previously known configuration are to be used, one-time programmings may be very expedient in the region of the expanded transceiver 100.11 (100' & 165'). Optionally, such programming may also be provided such that it can be initiated via the bus 201 and the interface 166.

Figure 55:
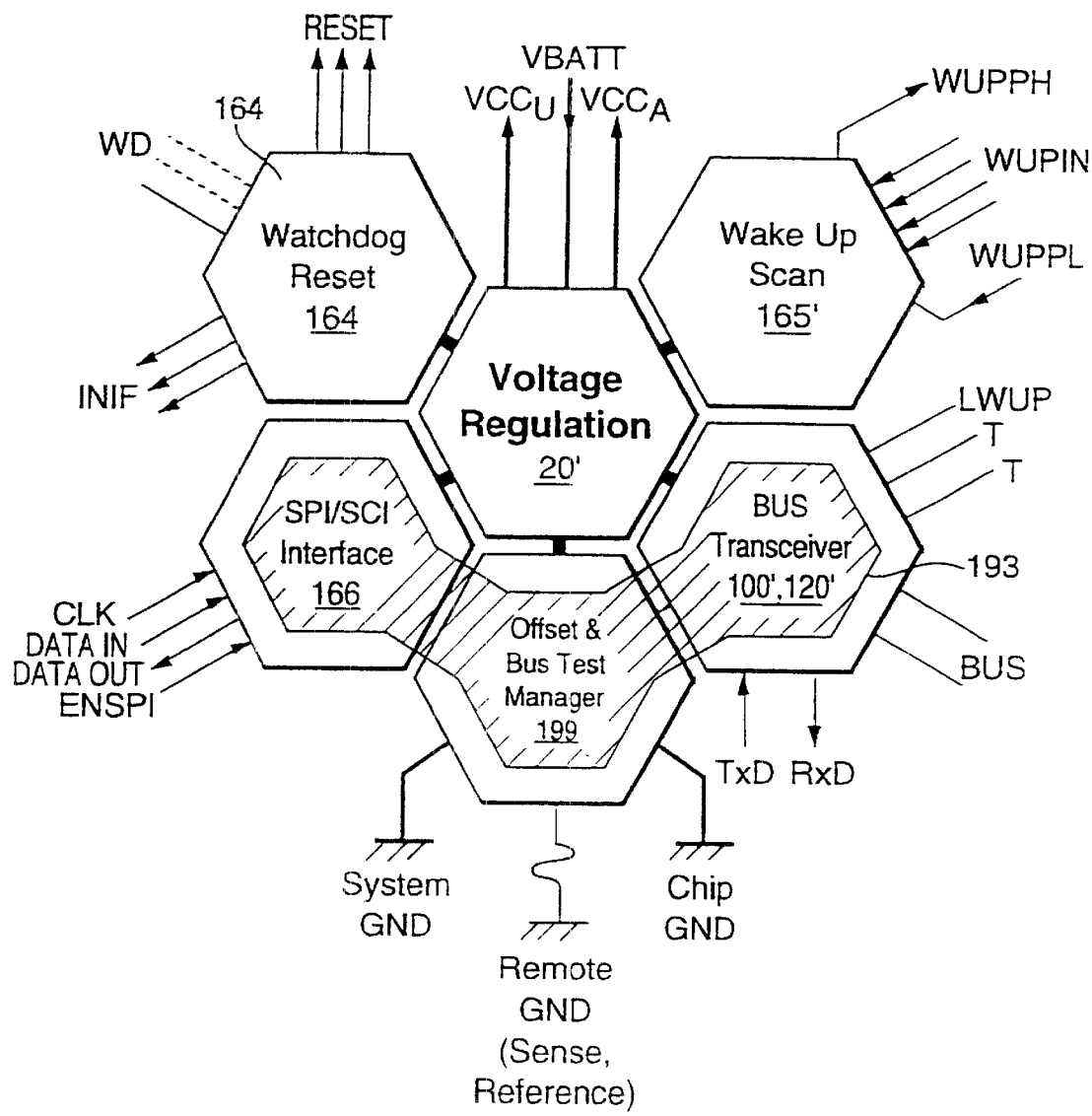
FIG. 55 shows the functional allocation of a semiconductor substrate which integrates all of the functionalities described.

The functional allocation of the semiconductor substrate of a semiconductor circuit 200 which integrates all of the developments according to FIGS. 28–54 is illustrated in FIG. 55, in which a direct operative connection between bus transceiver 100/100' and offset and bus test manager 199 is also indicated. The hatched area 193 symbolizes the allocation of functions which, from bus diagnosis standpoints, interact with one another in the course of the testing possibilities described.

In this context, it is additionally noted here that the function block structure as described here cannot and is not intended in any way to restrict the invention. Rather, the scope of the invention is demarcated on the one hand by the disclosed functionalities individually by themselves and also by all of the functionalities in their disclosed entirety. It has already been clarified on several occasions above that in a practical realization of the circuit, functions may overlap to a greater or lesser extent or be displaced. For example, the voltage monitoring function in the block 110 may be incorporated into a watchdog function 164, and the like.

In view of the (deliberate) double arrowing of 164a, it can be inferred, for example, that a central time-determining means, for instance a pilot oscillator or a clock generator, both for the wake-up expander 165 or 165' and for the watchdog function 164 (which requires 169.1 and/or 169.2), can equally well be placed in the circuit layout of a wake-up expander 165' if realization technology and chip design advantageously permit this.

This also applies in particular to interface subfunctions, near the transceiver, between the interface 166 and, for example, the transmitting and receiving means in the transceiver 100' and the offset and bus test manager 199.

Thus, for example, the control interface 124 for the reception block 120' and the selection means 123H and 123L thereof can comprise, on-chip, not only the control block 170 for influencing the slew rate together with the setting means 170.2 (provided for this) both for the receiver front end 121 and the digital evaluation logic arrangement 128 and also storage means 127H and 127L of the reception block 120'. Rather, it can also comprise, for example, the corresponding setting functions 170.1 and 170.3 for the transmitting means.

As already mentioned, the functionality of the offset and bus test manager 199, 199' may equally well be either connected to a greater or lesser extent with such a control interface 124 to be assigned to the transceiver, or be entirely resolved in it, and vice versa. On the other hand, on account of the analog/digital and/or digital/analog conversion means in 199, 199', the functionality 199, 199' may also be to a greater or lesser extent part of or even identical to the actual serial control interface 166. This may depend, for example, on whether and to what extent a circuit design falls back upon library functions or whether corresponding conversion means are also utilized for other settings, for instance in connection with the slew rate setting or the limit value monitoring of voltages.

The hatched region 193 in FIG. 28 is also intended to illustrate in this context that practical realization details of the transceiver function (100, 100') can interact, and be interwoven, very closely with realization details of the offset and bus test manager 199, 199' and of the function block 198 in order to protect the above-mentioned two.

Moreover, the drawings of the figures do not signify any restriction at all to the invention. It goes without saying that all of the individual features disclosed with regard to an exemplary embodiment can be transferred to all of the remaining exemplary embodiments, in particular can be combined with individual features thereof, without thereby leaving the scope of the invention.

In the above description of exemplary embodiments with reference to the figures, an implementation of the invention for a CAN bus was described as one possibility and, therefore, designations introduced in this field were also used. Nevertheless, the invention also encompasses differently standardized two-wire buses. It can therefore be used just as advantageously in correspondingly equipped control units—for example according to J1850 or similar standards.

This general applicability is taken into account in the drawing by the fact that, for the bus lines, there is both a neutral designation of the bus lines by BUS_H and BUS_L and a designation by CAN_H and CAN_L which applies to the selected exemplary embodiments according to CAN. This is taken into account in the claims, too.

Finally, it is also pointed out that with regard to the supplementing of transmitting means and receiving means of a two-wire bus transceiver by the functionality of the block 199 or 199', as described extensively above, such supplementing in the broadest sense is not bound to integration together with a voltage regulator, but rather is also highly advantageous and useful taken by itself.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A semiconductor circuit for an electronic control unit having at least one microcontroller, comprising:
    first means for providing, from a first supply voltage, at least one second, fixed supply voltage for the least one microcontroller and for circuits of the control unit which cooperate with the at least one microcontroller; and
    a transceiver unit having transmitting and receiving means for coupling the at least one microcontroller, which cooperates with the semiconductor circuit, to a two-wire bus;
        and further comprising in monolithic form, means for realizing a watchdog function at least for
        resetting the microcontroller which cooperates with the transceiver unit of the circuit; and
        monitoring the proper functioning of the microcontroller which cooperates with the transceiver unit, for the purpose of monitoring a variable which is significant for the proper functioning or program execution of the said microcontroller;
    wherein the means for realizing a watchdog function is directly connected to the first means.

2. The semiconductor circuit according to claim 1, further comprising in monolithic form:
    means for generating and communicating, after the at least one supply voltage which feeds the at least one microcontroller is built up, a reset signal to the at least one microcontroller.

3. The semiconductor circuit according to claim 1, further comprising in monolithic form:
    means for monitoring at least one of the first supply voltage and the at least one second supply voltage with regard to at least one limit value; and
    means for outputting an INTERRUPT signal or RESET signal to at least the microcontroller which cooperates with the transceiver unit, when the limit value is undershot or exceeded.

4. A semiconductor circuit for an electronic control unit having at least one microcontroller, comprising:
    first means for providing, from a first supply voltage, at least one second, fixed supply voltage for the at least one microcontroller and for circuits of the control unit which cooperate with the at least one microcontroller; and
    a transceiver unit having transmitting and receiving means for coupling the at least one microcontroller, which cooperates with the semiconductor circuit, to a two-wire bus; wherein,
    the first means can be operated both by a regulating transistor which is circuit-internal, and is connected with a regulating transistor, which is external to the circuit; and
    the semiconductor circuit has a terminal for driving the control electrode of an external regulating transistor which cooperates with the semiconductor circuit.

5. The semiconductor circuit according to claim 4, wherein operability of the first means by a circuit-internal regulating transistor or by a circuit-external regulating transistor can be selected by one of driving and programming.

6. A semiconductor circuit for an electronic control unit having at least one microcontroller, comprising:
    first means for providing, from a first supply voltage, at least one second, fixed supply voltage for the at least one microcontroller and for circuits of the control unit which cooperate with the at least one microcontroller; and
    a transceiver unit having transmitting and receiving means for coupling the at least one microcontroller, which cooperates with the semiconductor circuit, to a two-wire bus;
    and further comprising in monolithic form, an interface for serial exchange of data and control signals between the semiconductor circuit and at least the microcontroller which cooperates with the transceiver function thereof; wherein
        driving or programming of at least one characteristic circuit function is possible via the interface;
        the first means can be operated both by a regulating transistor which is circuit-internal, and is connected to with a regulating transistor, which is external to the circuit; and
        the semiconductor circuit has a terminal for driving a control electrode of the external regulating transistor which cooperates with the semiconductor circuit.

7. A semiconductor circuit for an electronic control unit having at least one microcontroller, comprising:
    first means for providing, from a first supply voltage, at least one second, fixed supply voltage for the at least one microcontroller and for circuits of the control unit which cooperate with the at least one microcontroller; and
    a transceiver unit having transmitting and receiving means for coupling the at least one microcontroller, which cooperates with the semiconductor circuit, to a two-wire bus; wherein,
said first means comprises a first voltage regulator connected to supply a second supply voltage for the at least one microcontroller, and a second voltage regulator connected to provide a third supply voltage for the circuits of the control unit which cooperate with the microcontroller;
said voltage regulators are configured to be activated and deactivated by means of a control signal; and
said first means further comprises control means, which cause the second and third supply voltages to be built up and/or reduced non-simultaneously in a defined manner, in dependence on a control signal.

8. The semiconductor circuit according to claim 7, wherein said control means are configured, so that upon activation, the second supply voltage for the at least one microcontroller can be built up before the third supply voltage for the circuits which cooperate with said at least one microcontroller.

9. The semiconductor circuit according to claim 7, wherein said control means are configured so that upon deactivation, the second supply voltage for the at least one microcontroller can be reduced after the third supply voltage for the circuits which cooperate with said at least one microcontroller.

10. The semiconductor circuit according to claim 7, wherein:
the first and second voltage regulators are independent of one another except that they are thermally coupled to one another;
the semiconductor circuit further comprises means which are operative when a semiconductor substrate of the semiconductor circuit is heated, due to overloading, up to a critical temperature;
the second voltage regulator is always deactivated before the critical temperature is reached; and
the first voltage regulator is deactivated only after the critical temperature is reached.

11. A semiconductor circuit for an electronic control unit having at least one microcontroller, comprising:
first means for providing, from a first supply voltage, at least one second, fixed supply voltage for the at least one microcontroller and for circuits of the control unit which cooperate with the at least one microcontroller; and
a transceiver unit having transmitting and receiving means for coupling the at least one microcontroller, which cooperates with the semiconductor circuit, to a two-wire bus; wherein,
the receiving means comprise means for detecting faults in the bus network, which means are configured to enable faults to be detected, and an error signal to be output in the event of an fault, in a bus core-specific manner;
the means for detecting faults in the bus network comprise adjustable selection means which enable at least one indicative error signal to be output; and
the means for detecting faults in the bus network can be set to a freely preselectable number of successive bit signal faults as a criterion for the outputting of an error signal.

12. The semiconductor circuit according to claim 11, further comprising a control path, for setting a selection means by the microcontroller which cooperates with the transceiver function.

13. The semiconductor circuit according to claim 12, wherein the receiving means further comprises a control interface, through which runs the control path for setting up the selection means.

14. A semiconductor circuit for an electronic control unit having at least one microcontroller, comprising:
first means for providing, from a first supply voltage, at least one second, fixed supply voltage for the at least one microcontroller and for circuits of the control unit which cooperate with the at least one microcontroller;
a transceiver unit having transmitting and receiving means for coupling the at least one microcontroller, which cooperates with the semiconductor circuit, to a two-wire bus;
potential influencing means, connected to the transceiver, for influencing at least one source level which is dominant in the case of transmission and/or of at least one signal level which is discriminant in the case of reception; and
means for providing a further, circuit-internal supply voltage or a circuit-internal supply current for supplying the potential influencing means.

15. The semiconductor circuit according to claim 14, further comprising a terminal for external monitoring or capacitive filtering of the circuit-internal supply voltage or of the circuit-internal supply current.

16. The semiconductor circuit according to claim 14, further comprising a particular terminal as reference-ground potential busbar at least of the means for setting or altering in the event of transmission of at least one of the two dominant source levels.

17. A semiconductor circuit for an electronic control unit having at least one microcontroller, comprising:
first means for providing, from a first supply voltage, at least one second, fixed supply voltage for the at least one microcontroller and for circuits of the control unit which cooperate with the at least one microcontroller; and
a transceiver unit having transmitting and receiving means for coupling the at least one microcontroller, which cooperates with the semiconductor circuit, to a two-wire bus; wherein
said semiconductor circuit has at least one operating state, in which the transmitting means of the transceiver unit has no influence on the bus and the first means is deactivated or switched off; and
said semiconductor circuit further comprises control means which enable the microcontroller that cooperates with the transceiver unit, to put the circuit back into the SLEEP state.

18. A semiconductor circuit for an electronic control unit having at least one microcontroller, comprising:
first means for providing, from a first supply voltage, at least one second, fixed supply voltage for the at least one microcontroller and for circuits of the control unit which cooperate with the at least one microcontroller; and
a transceiver unit having transmitting and receiving means for coupling the at least one microcontroller, which cooperates with the semiconductor circuit, to a two-wire bus;
and further comprising, in monolithic form, autonomous means which is independent of the transceiver unit, for detecting at least one wake-up signal in time periods at least of reduced or increased activity of the at least one microcontroller;
wherein the autonomous means has a plurality of inputs for receiving wake-up signals.

19. A semiconductor circuit for an electronic control unit having at least one microcontroller, comprising:

first means for providing, from a first supply voltage, at least one second, fixed supply voltage for the at least one microcontroller and for circuits of the control unit which cooperate with the at least one microcontroller; and a transceiver unit having transmitting and receiving means for coupling the at least one microcontroller, which cooperates with the semiconductor circuit, to a two-wire bus;

wherein said semiconductor circuit is programmable with regard to at least one of functions which is included in addition to the first means and/or the limit value of said function and/or the time response of said function and/or a truth condition of the said function, or can be set to predefined values in this regard.

20. A semiconductor circuit for an electronic control unit having at least one microcontroller, comprising:

first means for providing, from a first supply voltage, at least one second, fixed supply voltage for the at least one microcontroller and for circuits of the control unit which cooperate with the at least one microcontroller;

a transceiver unit having transmitting and receiving means for coupling the at least one microcontroller, which cooperates with the semiconductor circuit, to a two-wire bus;

two terminals for connection of two external terminating elements for the two bus cores; and internal bus fault detection means and internal backup terminating and changeover means to alter the bus termination in the event of a fault.

\* \* \* \* \*